United States Patent
Mu et al.

(10) Patent No.: US 10,904,339 B2
(45) Date of Patent: Jan. 26, 2021

(54) TECHNIQUES FOR STORING AND DISTRIBUTING METADATA AMONG NODES IN A STORAGE CLUSTER SYSTEM

(71) Applicant: NetApp Inc., Sunnyvale, CA (US)

(72) Inventors: Paul Yuedong Mu, Sunnyvale, CA (US); Manoj Sundararajan, Sunnyvale, CA (US); Paul Ngan, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

(21) Appl. No.: 16/751,891

(22) Filed: Jan. 24, 2020

(65) Prior Publication Data
US 2020/0162552 A1     May 21, 2020

Related U.S. Application Data

(63) Continuation of application No. 15/820,678, filed on Nov. 22, 2017, now Pat. No. 10,554,754, which is a continuation of application No. 14/528,166, filed on Oct. 30, 2014, now Pat. No. 9,838,477.

(51) Int. Cl.
*H04L 29/08* (2006.01)

(52) U.S. Cl.
CPC .............................. *H04L 67/1097* (2013.01)

(58) Field of Classification Search
CPC .. G06F 11/2092; G06F 11/2097; G06F 11/20; G06F 11/2005; G06F 11/2023; G06F 11/2058; G06F 11/2094; H04L 67/1097
See application file for complete search history.

(56) References Cited

U.S. PATENT DOCUMENTS

| | | | | |
|---|---|---|---|---|
| 7,478,263 | B1* | 1/2009 | Kownacki | G06F 11/2028 714/10 |
| 8,332,497 | B1* | 12/2012 | Gladish | G06F 16/2308 709/223 |
| 8,484,163 | B1* | 7/2013 | Yucel | G06F 11/1415 707/640 |
| 2014/0047263 | A1* | 2/2014 | Coatney | G06F 11/20 714/4.11 |
| 2014/0325256 | A1* | 10/2014 | Lambert | G06F 11/2094 714/4.11 |
| 2015/0169414 | A1* | 6/2015 | Lalsangi | G06F 11/1479 707/610 |
| 2016/0088082 | A1* | 3/2016 | Sundararajan | H04L 69/22 709/212 |

\* cited by examiner

*Primary Examiner* — Shean Tokuta
(74) *Attorney, Agent, or Firm* — Cooper Legal Group, LLC

(57) ABSTRACT

Various embodiments are generally directed to techniques for reducing the time required for a node to take over for a failed node or to boot. An apparatus includes an access component to retrieve a metadata from a storage device coupled to a first D-module of a first node during boot, the metadata generated from a first mutable metadata portion and an immutable metadata portion, and the first metadata specifying a first address of a second D-module of a second node; a replication component to contact the second data storage module at the first address; and a generation component to, in response to failure of the contact, request a second mutable metadata portion from a N-module of the first node and generate a second metadata from the second mutable metadata portion and the immutable metadata portion, the second mutable metadata portion specifying a second address of the second D-module.

20 Claims, 24 Drawing Sheets

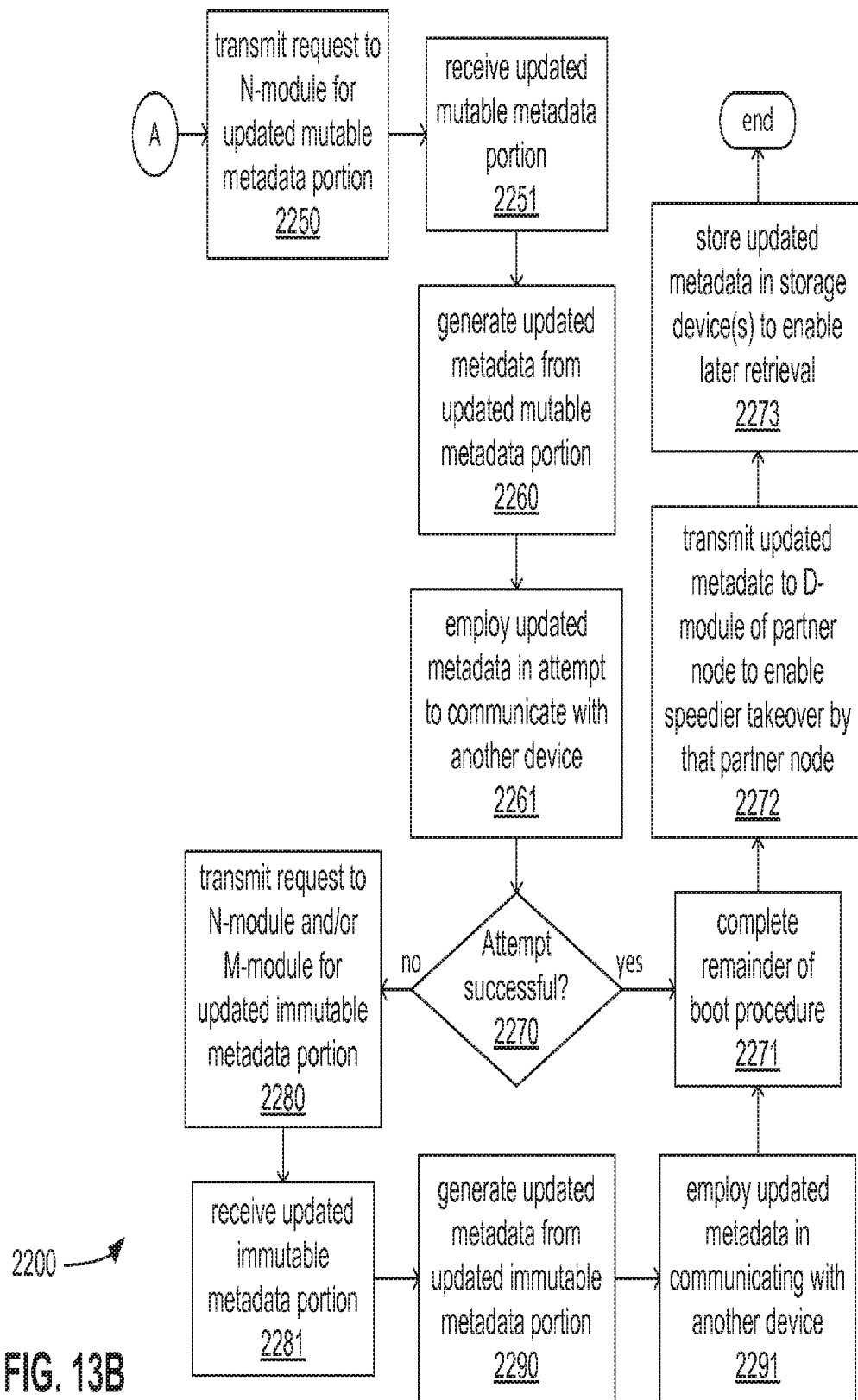

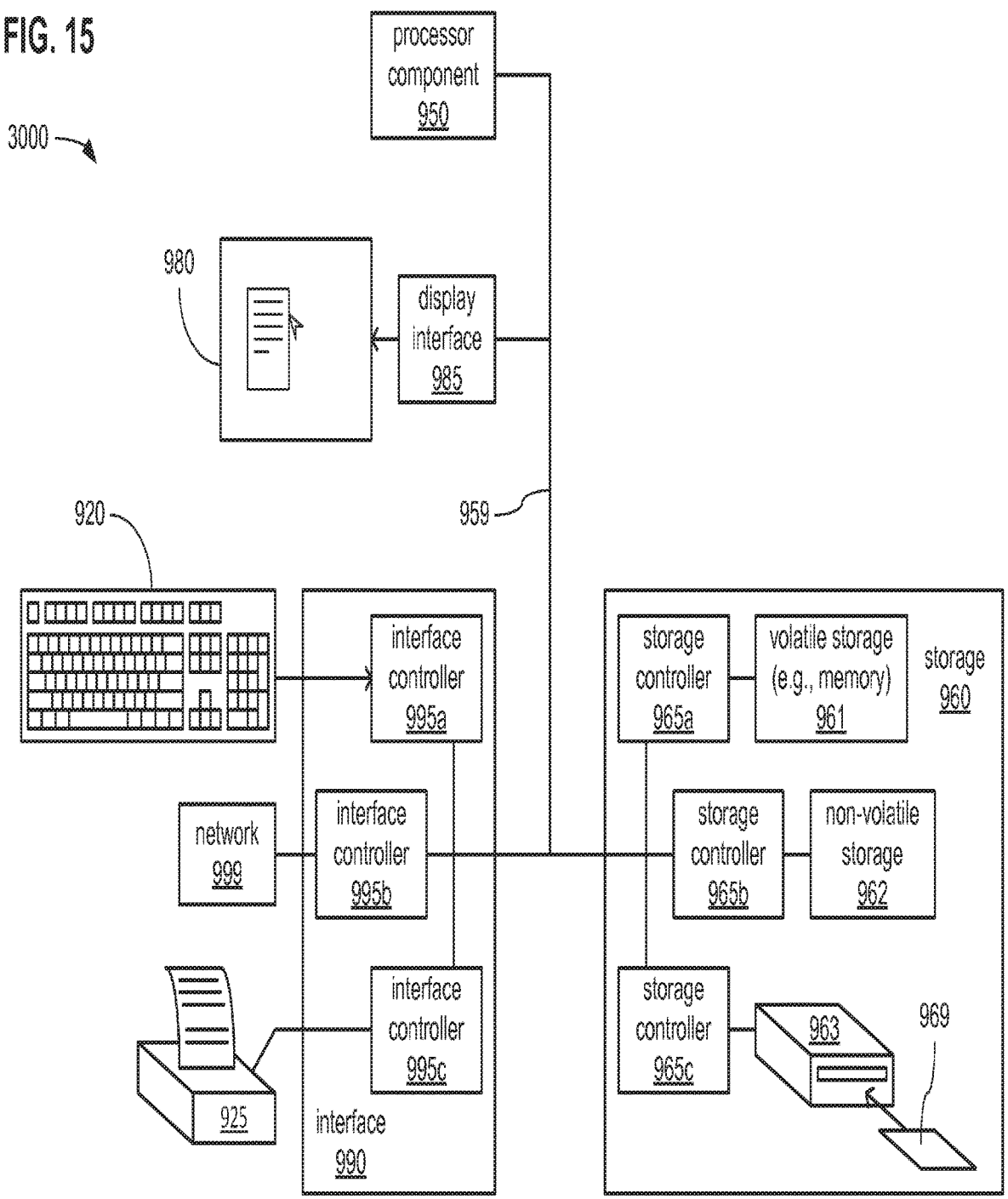

TECHNIQUES FOR STORING AND DISTRIBUTING METADATA AMONG NODES IN A STORAGE CLUSTER SYSTEM

RELATED APPLICATIONS

This application claims priority to and is a continuation of U.S. application Ser. No. 15/820,678, filed on Nov. 22, 2017, now allowed, titled "TECHNIQUES FOR STORING AND DISTRIBUTING METADATA AMONG NODES IN A STORAGE CLUSTER SYSTEM," which claims priority to and is a continuation of U.S. Pat. No. 9,838,477, filed on Oct. 30, 2014 and titled "TECHNIQUES FOR STORING AND DISTRIBUTING METADATA AMONG NODES IN A STORAGE CLUSTER SYSTEM," which are incorporated herein by reference.

BACKGROUND

Remotely accessed storage cluster systems may include multiple interconnected nodes that may be geographically dispersed to perform the storage of client device data in a fault-tolerant manner and to enable the speedy retrieval of that data. Each of such nodes may include multiple interconnected modules, each of which may be specialized to perform a portion of the tasks of storing and retrieving client device data. Metadata defining numerous aspects of performing such tasks may need to be frequently generated, updated and/or distributed among multiple ones of such nodes relatively quickly. Thus, the architectures of such storage cluster systems may be quite complex.

In contrast, client devices may not be configured to monitor and/or control aspects of such complex architectures or the complexities of the manner in which they achieve fault tolerance. Client devices may communicate with storage cluster systems using protocols that are not well suited to addressing the details of such complexities, and client devices may employ operating systems that provide little flexibility in dealing with delays arising from such complexities.

BRIEF DESCRIPTION OF THE DRAWINGS

FIGS. 13A and 13B, together, illustrate a logic flow according to an embodiment.

FIG. 15 illustrates a processing architecture according to an embodiment.

DETAILED DESCRIPTION

Figure 1:
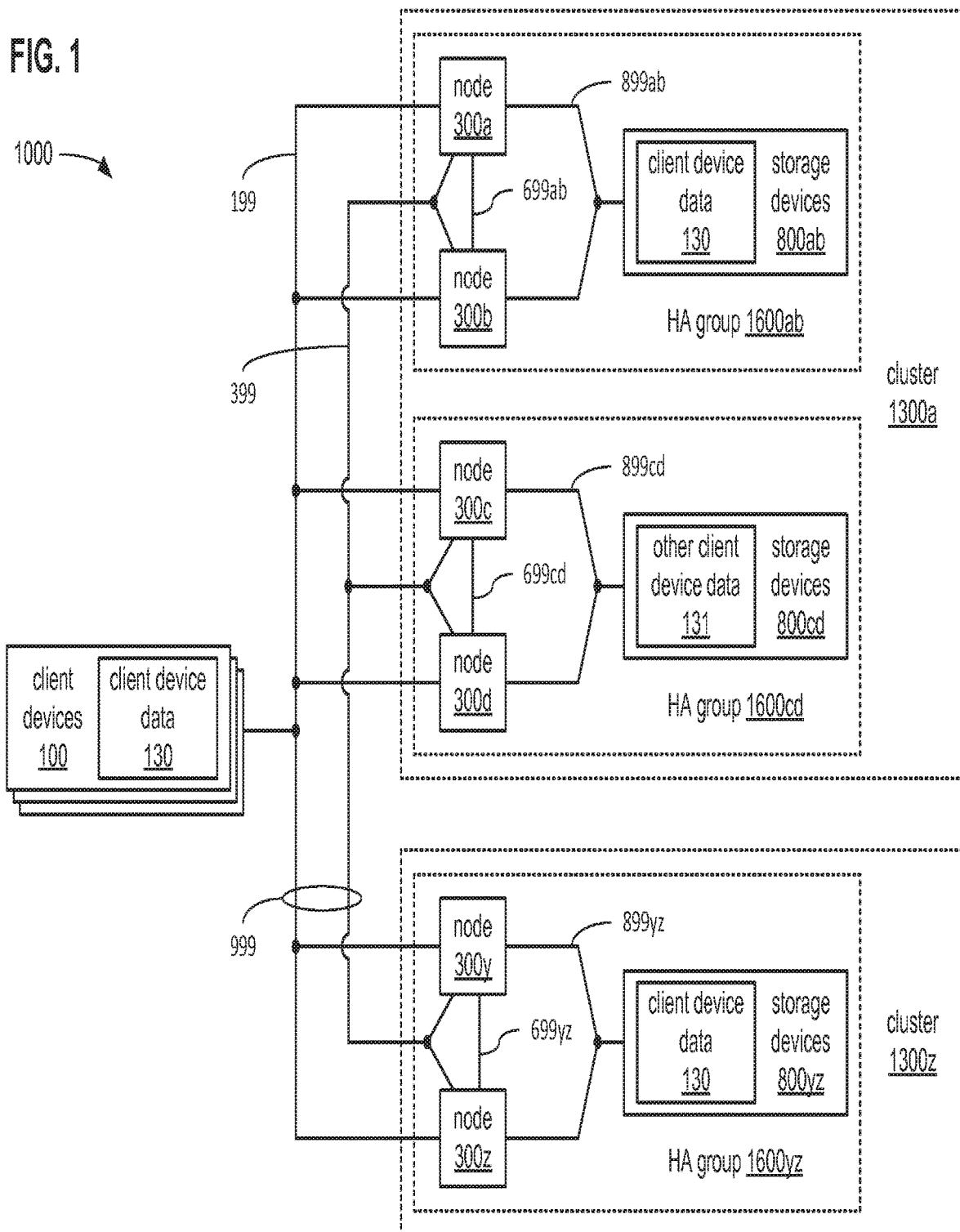
FIG. 1 illustrates an example embodiment of a storage cluster system.

Various embodiments are generally directed to techniques for reducing the time required for a node of a storage cluster system to take over for a failed node and/or to boot following being powered on or reset by reducing the time required to retrieve metadata required to enable interactions by that node with other nodes. Both mutable and immutable metadata may be generated from a combination of configuration data provided by a client device and testing conducted on one or more networks to which the node is coupled. Upon being generated, the mutable and immutable metadata may be distributed to one or more other nodes with which the node is partnered to enable speedier takeover of a failing node by another node. Also upon being generated, the mutable and immutable metadata may be stored within one or more storage devices coupled to and accessible to the node and its one or more partner nodes to enable speedier booting of one or more of these nodes. Upon booting, the node may retrieve the mutable and/or immutable metadata from the one or more storage devices, and may attempt to employ such metadata in commencing interactions with one or more other nodes. If the attempt fails, then the node may attempt to update the mutable metadata before making another attempt commencing interactions with the one or more other nodes. If that attempt fails, then the node may attempt to update the immutable metadata before making yet another attempt at commencing such interactions.

In a storage cluster system, multiple nodes may be grouped into two or more clusters that may each be made up of one or more high availability (HA) groups of nodes. The two or more clusters may be positioned at geographically distant locations and may be coupled via one or more interconnects extending through networks such as the Internet or dedicated leased lines. A single node of a HA group of each cluster may be an active node that communicates with the other(s) via an active communications session to exchange replicas of data access commands to enable at least partially parallel performance of those data access commands to synchronize the state of the client device data between their HA groups. Further, one of those active nodes may additionally communicate with one or more client devices to receive requests for storage services and to translate those requests into the data access commands that are replicated for such at least partially parallel performance. Within each HA group, at least one other node may be an inactive node partnered with the active node and prepared via duplication of metadata among the nodes within the HA group to take over for the active node in response to an error.

Each of the nodes may include one or more of each of a management module (M-module), a network protocol module (N-module) and a data storage module (D-module). The M-module may couple an active node to a client interconnect to provide one or more client devices a mechanism by which at least a portion of the storage cluster system may be remotely configured. The N-module may couple an active node to the client interconnect to receive requests for storage services from the one or more client devices, and may translate a storage services request into at least one data access command. The D-module may be coupled to the N-module to receive the at least one data access command therefrom. The D-module may also couple a node to one or more storage devices to store client device data and from which client device data may be retrieved. Individual ones of those storage devices and/or groups of those storage devices may be designated and treated by the D-module as logical units (LUs). The D-module of an active node may define an aggregate within the storage space provided by a single LU or a group of LUs, and may define one or more volumes within the storage space of that aggregate. The client device data may be stored within one or more volumes so defined within that aggregate.

In addition to performing a data access command received from the N-module, the D-module of one active node of a first HA group may replicate the data access command and transmit the resulting replica of that data access command to another D-module of another active node of a second HA group to enable at least partially parallel performance of the data access command by the D-modules of the two active nodes. Such transmission of a replica data access command may be performed via an inter-cluster interconnect that may extend through the same network through which the client interconnect may extend. The D-module of that other node may reply to the transmission of the replica data access command with an indication of success or failure in the performance of the replica data access command.

Further, the D-module of at least one inactive node of each of the first and second HA groups may monitor the status of at least the D-module of the active node in that HA group for an indication of failure within that active node. Within each of the first and second HA groups, such monitoring may entail an exchange of signals between the active node and the at least one inactive node on a recurring basis in which the lack of receipt of a signal within an expected period of time may be taken as an indication of failure. Alternatively or additionally, such monitoring may entail an exchange of signals providing an explicit indication of status of performance of a data access command and/or status of a component of a node (e.g., the status of a M-module or a N-module). In response to an indication of a failure of the active node of one of the first or second HA groups, an inactive node of that HA group may effect a takeover of that active node in which that inactive node takes over the communications that were performed by that active node and/or takes over participation by that active node in at least partial parallel performance of data access commands.

In support of enabling exchanges of replica data access commands and responses thereto between an active node of the first HA group and an active node of the second HA group, the two active nodes may cooperate to form and maintain an active communications session therebetween through the inter-cluster interconnect. In such an active communications session, information concerning the current state of each of the two active nodes may be recurringly exchanged therebetween. Also, nodes of the first and second HA groups may establish and maintain inactive communications sessions that extend between active and inactive nodes of the first and second HA groups to support a takeover of the active node of either HA group by an inactive node of the same HA group in response to an error occurring within that active node. The two active nodes may exchange information concerning the inactive nodes of the first and second HA groups to enable the formation of those inactive communications sessions, thereby completing the mesh of communications sessions. In the event of an error resulting in the takeover of one of the active nodes by an inactive node, the active communications session between the two active nodes may become inactive while one of the inactive communications sessions may become the active communications session.

In support of forming and maintaining the mesh of communications sessions, the M-module, N-module and/or D-module of each active node may cooperate to derive, store and/or exchange metadata that includes indications of network addresses of multiple ones of the nodes of the first and second HA groups and/or other information pertinent to establishing at least a subset of the communications sessions of the mesh. Within each HA group, a M-module of an active node may receive information making up a portion of metadata and/or a N-module of the active node may perform tests to discover information making up another portion of metadata. One or both of the M-module and the N-module may then provide their portions of metadata to a D-module of the active node, and that D-module may generate the metadata from at least those portions of metadata. The D-module may then transmit a duplicate of the metadata to D-module(s) of one or more inactive nodes of the same HA group and may store a copy of the metadata within a volume and/or aggregate within one or more storage devices to which the D-modules of the active node and the one or more inactive nodes of the same HA group may share access.

As a result, when one of such D-modules reboots following a reset or being powered up, that D-module may be able to retrieve information pertinent to its node establishing communications sessions with nodes of another HA group by retrieving the metadata from the one or more storage devices, and may then employ that information to form one or more of the communications sessions of the mesh more quickly. In embodiments in which different ones of the nodes in each of multiple HA groups may occasionally be rebooted for any of a variety of reasons, faster reestablishment of communications sessions following such a reboot may serve to minimize periods of time in which portions of such a mesh of communications sessions are not in place. Where errors are encountered that result in a change in which nodes and/or communications session(s) are active or inactive, the metadata stored within the one or more storage devices may be updated to enable faster reestablishment of communications sessions with the new configuration of active and inactive communications sessions following a reboot.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a storage cluster system 1000 incorporating one or more client devices 100 and one or more clusters, such as the depicted clusters 1300a and 1300z. As depicted, the cluster 1300a may incorporate one or more of nodes 300a-d and sets of storage devices 800ab and 800cd, and the cluster 1300z may incorporate one or more of nodes 300y-z and a set of storage devices 800yz. As further depicted, the cluster 1300a may include a HA group 1600ab incorporating the nodes 300a-b as partners and the set of storage devices 800ab. The cluster 1300a may also include a HA group 1600cd incorporating the nodes 300c-d as partners and the set of storage devices 800cd. Correspondingly, the cluster 1300z may include a HA group 1600yz incorporating the nodes 300y-z as partners and the set of storage devices 800yz.

In some embodiments, the clusters 1300a and 1300z may be positioned at geographically distant locations to enable a degree of redundancy in storing and retrieving client device data 130 provided by one or more of the client devices 100 for storage. Such positioning may be deemed desirable to enable continued access to the client device data 130 by one or more of the client devices 100 despite a failure or other event that may render one or the other of the clusters 1300a or 1300z inaccessible to one or more of the client devices 100. As depicted, one or both of the clusters 1300a and 1300z may additionally store other client device data 131 that may be entirely unrelated to the client device data 130.

The formation of the HA group 1600ab with at least the two nodes 300a and 300b partnered to share access to the set of storage devices 800ab may enable a degree of fault tolerance in accessing the client device data 130 as stored within the set of storage devices 800ab by enabling one of the nodes 300a-b in an inactive state to take over for its partner in an active state (e.g., the other of the nodes 300a-b) in response to an error condition within that active one of the nodes 300a-b. Correspondingly, the formation of the HA group 1600yz with at least the two nodes 300y and 300z partnered to share access to the set of storage devices 800yz may similarly enable a degree of fault tolerance in accessing the client device data 130 as stored within the set of storage devices 800yz by similarly enabling one of the nodes 300y-z in an inactive state to similarly take over for its partner in active state (e.g., the other of the nodes 300y-z).

As depicted, any active one of the nodes 300a-d and 300y-z may be made accessible to the client devices 100 via a client interconnect 199. As also depicted, the nodes 300a-d and 300y-z may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. The network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 to be positioned at geographically diverse locations, while the inter-cluster interconnect 399 may extend through a leased line between the two geographically distant locations at which each of the clusters 1300a and 1300z are positioned.

As depicted, the partnered nodes within each of the HA groups 1600ab, 1600cd and 1600yz may be additionally coupled via HA interconnects 699ab, 699cd and 699yz, respectively. As also depicted, the nodes within each of the HA groups 1600ab, 1600cd and 1600yz may be coupled to the sets of storage devices 800ab, 800cd and 800yz in a manner enabling shared access via storage interconnects 899ab, 899cd and 899yz, respectively. The partnered nodes and set of storage devices making up each of the HA groups 1600ab, 1600cd and 1600yz may be positioned within relatively close physical proximity to each other such that the interconnects 699ab, 899ab, 699cd, 899cd, 699yz and 899yz may each traverse a relatively short distance (e.g., extending within a room and/or within a cabinet).

More broadly, the network 999 and/or one or more of the interconnects 199, 399, 699ab, 699cd and 699yz may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899ab, 899cd and 899yz may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300a and 1300z, other embodiments are possible that incorporate differing quantities of HA groups and nodes. Further, although each of the HA groups 1600*ab*, 1600*cd* and 1600*yz* is depicted as incorporating a pair of nodes 300*a-b*, 300*c-d* and 300*y-z*, respectively, other embodiments are possible in which one or more of the HA groups 1600*ab*, 1600*cd* and 1600*yz* may incorporate more than two nodes.

Figure 2A:
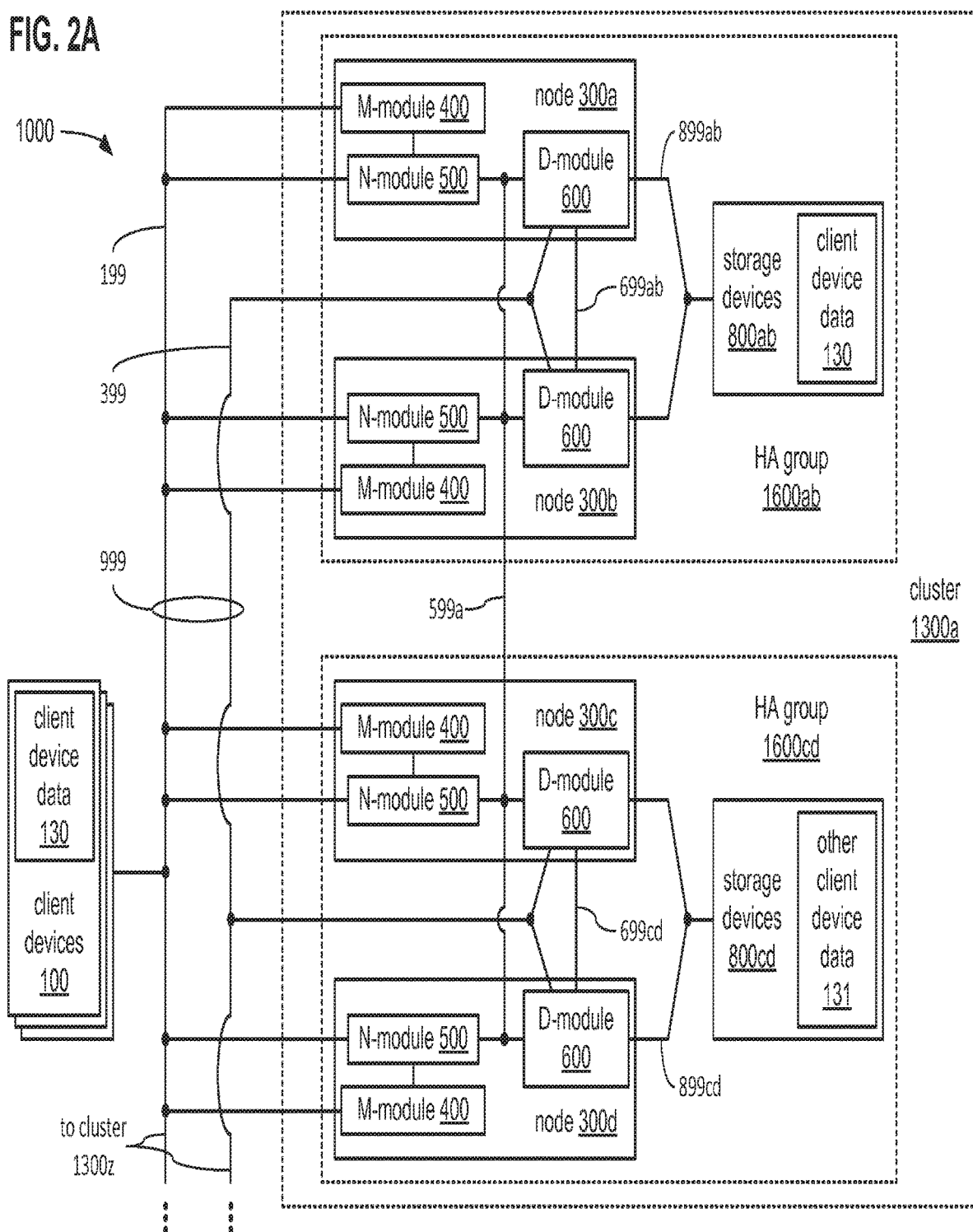
FIG. 2A illustrates an example embodiment of a pair of high availability groups of a cluster.
Figure 2B:
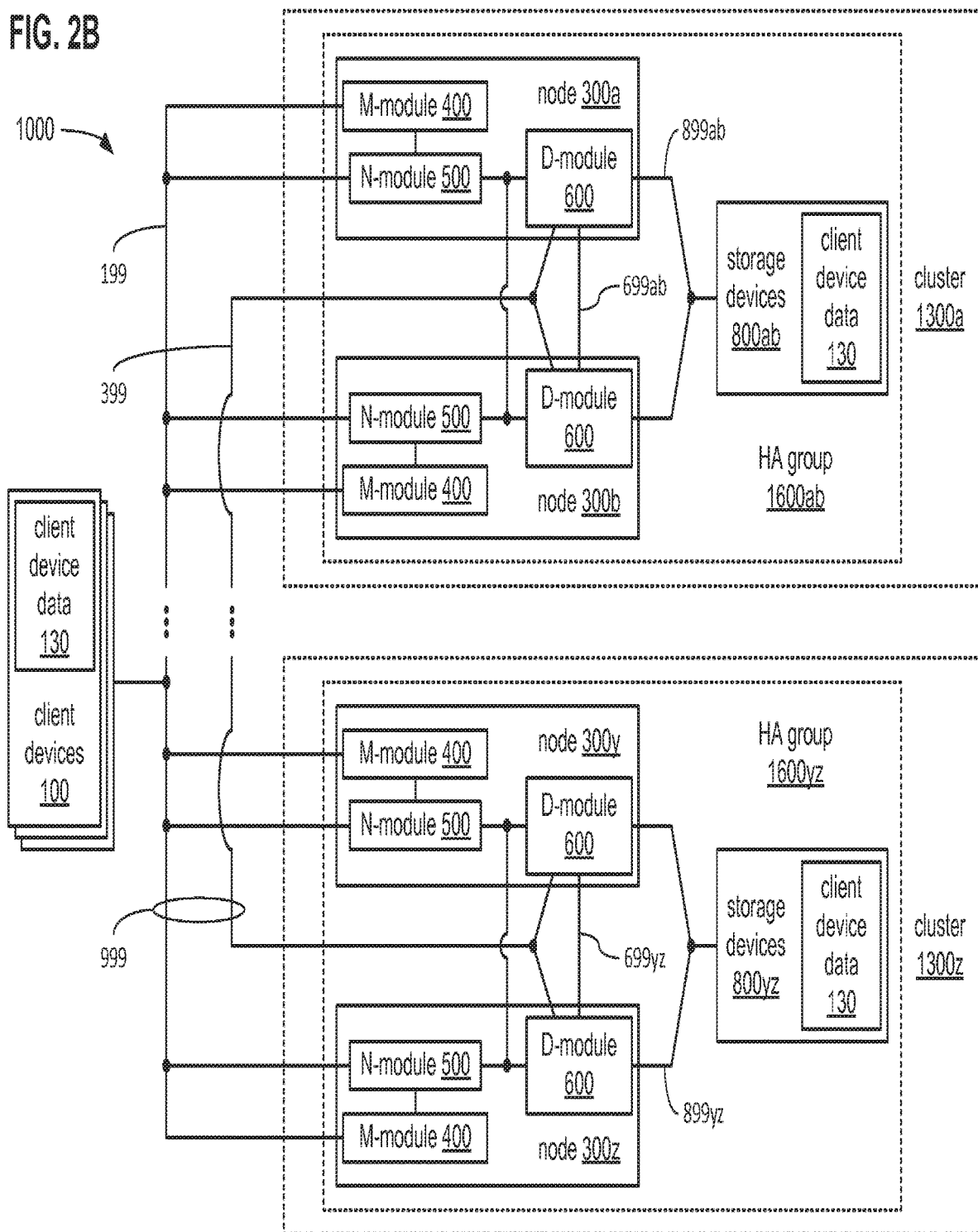
FIG. 2B illustrates an example embodiment of a pair of high availability groups of different clusters.

FIGS. 2A and 2B each illustrate a block diagram of an example portion of the storage cluster system 1000 in greater detail. More specifically, FIG. 2A depicts aspects of the nodes 300*a-d* and interconnections thereamong within the cluster 1300*a* in greater detail. FIG. 2B depicts aspects of the interconnections among the nodes 300*a-b* and 300*y-z*, including interconnections extending between the clusters 1300*a* and 1300*z*, in greater detail.

Referring to both FIGS. 2A and 2B, each of the nodes 300*a-d* and 300*y-z* may incorporate one or more of a M-module 400, a N-module 500 and a D-module 600. As depicted, each of the M-modules 400 and the N-modules 500 may be coupled to the client interconnect 199, by which each may be accessible to one or more of the client devices 100. The M-module 400 of one or more active ones of the nodes 300*a-d* and 300*y-z* may cooperate with one or more of the client devices 100 via the client interconnect 199 to allow an operator of one of the client devices 100 to configure various aspects of the manner in which the storage cluster system 1000 stores and provides access to the client device data 130 provided by one or more of the client devices 100. The N-module 500 of one or more active ones of the nodes 300*a-d* and 300*y-z* may receive and respond to requests for storage services received from one or more of the client devices 100 via the client interconnect 199, and may perform a protocol conversion to translate each storage service request into one or more data access commands.

As depicted, the D-modules 600 of all of the nodes 300*a-d* and 300*y-z* may be coupled to each other via the inter-cluster interconnect 399. Also, within each of the HA groups 1600*ab*, 1600*cd* and 1600*yz*, D-modules 600 of partnered nodes may share couplings to the sets of storage devices 800*ab*, 800*cd* and 800*yz*, respectively. More specifically, the D-modules 600 of the partnered nodes 300*a* and 300*b* may both be coupled to the set of storage devices 800*ab* via the storage interconnect 899*ab*, the D-modules 600 of the partnered nodes 300*c* and 300*d* may both be coupled to the set of storage devices 800*cd* via the storage interconnect 899*cd*, and the D-modules 600 of the nodes partnered 300*y* and 300*z* may both be coupled to the set of storage devices 800*yz* via the storage interconnect 899*yz*. The D-modules 600 of active ones of the nodes 300*a-d* and 300*y-z* may perform the data access commands derived by one or more of the N-modules 500 of these nodes from translating storage service requests received from one or more of the client devices 100.

Thus, the D-modules 600 of active ones of the nodes 300*a-d* and 300*y-z* may access corresponding ones of the sets of storage devices 800*ab*, 800*cd* and 800*yz* via corresponding ones of the storage interconnects 899*ab*, 899*cd* and 899*yz* to store and/or retrieve client device data 130 as part of performing the data access commands.

The data access commands may be accompanied by portions of the client device data 130 to store and/or newer portions of the client device data 130 with which to update the client device data 130 as stored. Alternatively or additionally, the data access commands may specify portions of the client device data 130 to be retrieved from storage for provision back to one or more of the client devices 100.

Further, and referring to FIG. 2B, the D-module 600 of an active one of the nodes 300*a-b* and 300*y-z* of one of the clusters 1300*a* or 1300*z* may replicate the data access commands and transmit the resulting replica data access commands via the inter-cluster interconnect 399 to another active one of the nodes 300*a-b* and 300*y-z* of the other of the clusters 1300*a* or 1300*z* to enable at least partial parallel performance of the data access commands by two of the D-modules 600. In this way, the state of the client device data 130 as stored within one of the sets of storage devices 800*ab* or 800*yz* may be mirrored within the other of the sets of storage devices 800*ab* or 800*yz*, as depicted.

Such mirroring of the state of the client device data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699*ab*, 699*cd* and 699*yz*) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300*a* and 300*b* may render both of the nodes 300*a* and 300*b* inaccessible to the client devices 100 such that the client device data 130 stored within the sets of storage devices 800*ab* becomes inaccessible through either of the nodes 300*a* or 300*b*. With both of the sets of the storage devices 800*ab* and 800*yz* mirroring the state of the client device data 130, the client devices 100 are still able to access the client device data 130 within the set of storage devices 800*yz*, despite the loss of access to the set of storage devices 800*ab*.

Referring again to both FIGS. 2A and 2B, and as previously discussed, the sharing of access via the storage interconnects 899*ab*, 899*cd* and 899*yz* to each of the sets of storage devices 800*ab*, 800*cd* and 800*yz*, respectively, among partnered ones of the nodes 300*a-d* and 300*y-z* may enable continued access to one of the sets of storage devices 800*ab*, 800*cd* and 800*yz* in the event of a failure occurring within one of the nodes 300*a-d* and 300*y-z*. The coupling of D-modules 600 of partnered ones of the nodes 300*a-d* and 300*y-z* within each of the HA groups 1600*ab*, 1600*cd* and 1600*yz* via the HA interconnects 699*ab*, 699*cd* and 699*yz*, respectively, may enable such continued access in spite of such a failure. Through the HA interconnects 699*ab*, 699*cd* or 699*yz*, D-modules 600 of each of these nodes may each monitor the status of the D-modules 600 their partners. More specifically, the D-modules 600 of the partnered nodes 300*a* and 300*b* may monitor each other through the HA interconnect 699*ab*, the D-modules 600 of the partnered nodes 300*c* and 300*d* may monitor each other through the HA interconnect 699*cd*, and the D-modules 600 of the partnered nodes 300*y* and 300*z* may monitor each other through the HA interconnect 699*yz*.

Such monitoring may entail recurring exchanges of "heartbeat" and/or other status signals (e.g., messages conveying the current state of performance of a data access command) via one or more of the HA interconnects 699*ab*, 699*cd* or 699*yz* in which an instance of an absence of receipt of such a signal within a specified recurring interval may be taken as an indication of a failure of the one of the D-modules 600 from which the signal was expected. Alternatively or additionally, such monitoring may entail awaiting an indication from a monitored one of the D-modules 600 that a failure of another component of one of the nodes 300a-d or 300y-z has occurred, such as a failure of a M-module 400 and/or of a N-module 500 of that one of the nodes 300a-d or 300y-z. In response to such an indication of failure of an active one of the nodes 300a-d or 300y-z belonging to one of the HA groups 1600ab, 1600cd or 1600yz, an inactive partner among the nodes 300a-d or 300y-z of the same one of the HA groups 1600ab, 1600cd or 1600yz may take over. Such a "takeover" between partnered ones of the nodes 300a-d or 300y-z may be a complete takeover inasmuch as the partner that is taking over may take over performance of all of the functions that were performed by the failing one of these nodes.

However, in some embodiments, at least the N-modules 500 and the D-modules 600 of multiple ones of the nodes 300a-d and/or 300y-z may be interconnected in a manner enabling a partial takeover in response to the failure of a portion of one of the nodes 300a-d or 300y-z. Referring more specifically to FIG. 2A, the N-modules 500 of each of the nodes 300a-d may be coupled to the D-modules 600 of each of the nodes 300a-d via an intra-cluster interconnect 599a. In other words, within the cluster 1300a, all of the N-modules 500 and all of the D-modules 600 may be coupled to enable data access commands to be exchanged between N-modules 500 and D-modules 600 of different ones of the nodes 300a-d. Thus, by way of example, where the N-module 500 of the node 300a has failed, but the D-module 600 of the node 300a is still operable, the N-module 500 of its partner node 300b (or of one of the nodes 300c or 300d with which the node 300a is not partnered in a HA group) may take over for the N-module 500 of the node 300a.

Although the clusters 1300a and 1300z may be geographically distant from each other, within each of the clusters 1300a and 1300z, nodes and/or components of nodes may be positioned within relatively close physical proximity to each other such that the intra-cluster interconnects 599a and 599z may each traverse a relatively short distance (e.g., extending within a room and/or within a single cabinet). More broadly, one or more of the intra-cluster interconnects 599a and 599z may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599a may be made up of a mesh of point-to-point interconnects coupling each N-module 500 of each of the nodes 300a-d to each D-module 600 of each of the nodes 300a-d. Alternatively, by way of another example, the intra-cluster interconnect 599a may include a network switch (not shown) to which each of the N-modules 500 and each of the D-modules 600 of the nodes 300a-d may be coupled.

It should be noted, however, that it may be deemed desirable to disallow (or at least limit instances of) such partial takeovers in favor of complete takeovers in which one node takes over all functions of another node in which a failure has occurred. This may be the result of portions of the intra-cluster interconnects 599a and/or 599z that extend between N-modules 500 and D-modules 600 within one or more of the nodes 300a-d and/or 300y-z having the capability to transfer commands and/or data significantly more quickly than portions of the intra-cluster interconnects 599a and/or 599z that extend between N-modules 500 and D-modules 600 of different nodes. Thus, in some embodiments, portions of the intra-cluster interconnects 599a and/or 599z that extend between different ones of the nodes 300a-d or 300y-z, respectively, may not be used such that remain inactive.

It should also be noted that despite the depiction of only a single one of each of the M-module 400, the N-module 500 and the D-module 600 within each of the nodes 300a-d and 300y-z, other embodiments are possible that may incorporate different quantities of one or more of the M-module 400, the N-module 500 and the D-module 600 within one or more of these nodes. By way of example, embodiments are possible in which one or more of the nodes 300a-d and/or 300y-z incorporate more than one N-module 500 to provide a degree of fault-tolerance within a node for communications with one or more of the client devices 100, and/or incorporate more than one D-module 600 to provide a degree of fault-tolerance within a node for accessing a corresponding one of the sets of storage devices 800ab, 800cd or 800yz.

Figure 3:
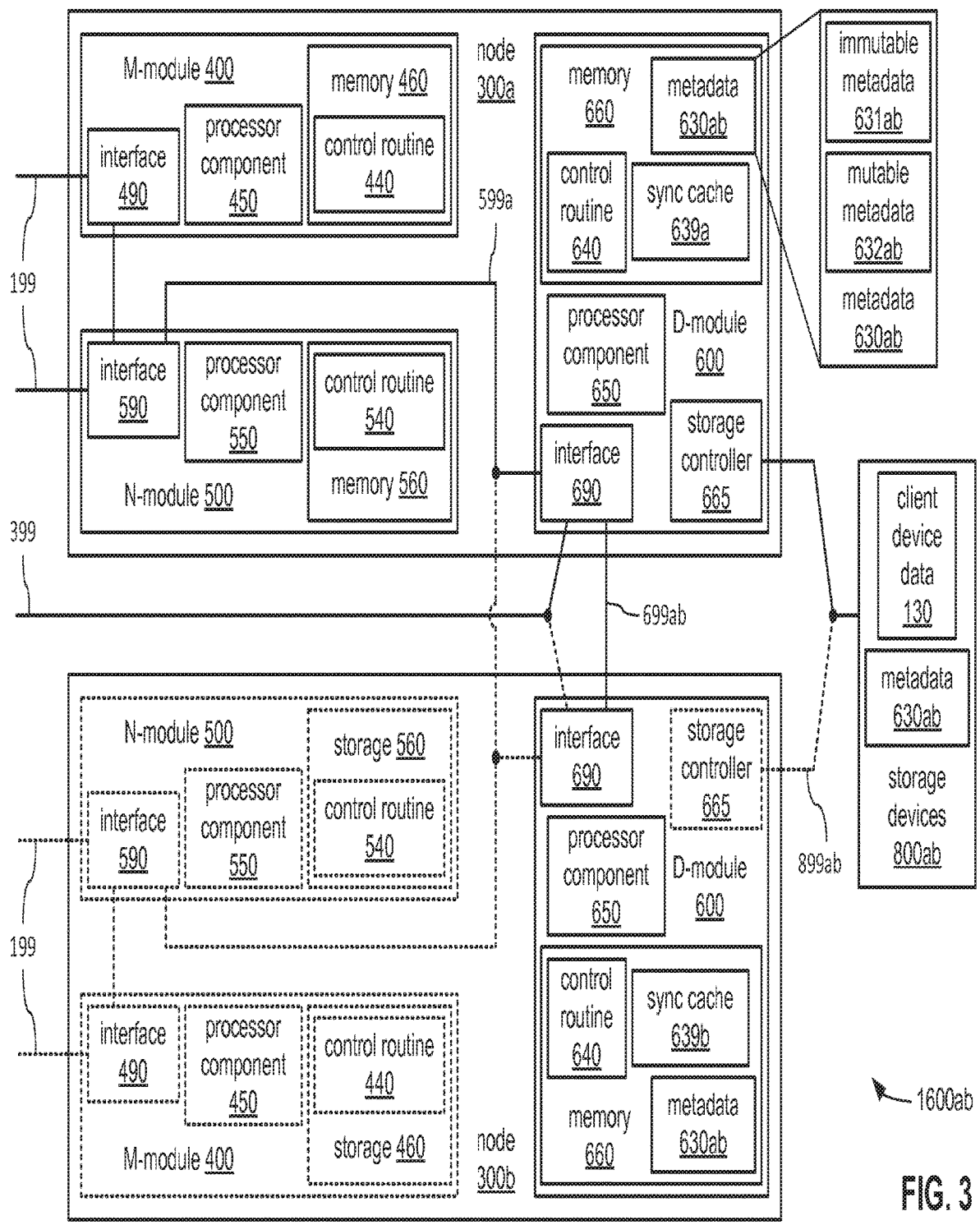
FIG. 3 illustrates an example embodiment of a HA group of partnered nodes.

FIG. 3 illustrates a block diagram of an example embodiment of the HA group 1600ab of the cluster 1300a of the storage cluster system 1000 in greater detail. As depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. More specifically, the M-module 400 and the N-module 500 of the node 300a may engage in communications with the client devices 100 (as indicated with the M-module 400 and the N-module 500 of the node 300a being drawn with solid lines), while the M-module 400 and the N-module 500 of the node 300b may not (as indicated with the M-module 400 and the N-module 500 being drawn with dotted lines). As also depicted, each of the nodes 300a-b may incorporate one or more than one of each of a M-module 400, a N-module 500 and a D-module 600.

In various embodiments, the M-module 400 of each of the nodes 300a-b incorporates one or more of a processor component 450, a memory 460 and an interface 490 to couple the M-module 400 to at least the client interconnect 199. The memory 460 may store a control routine 440. The control routine 440 may incorporate a sequence of instructions operative on the processor component 450 in its role as a main processor component of the M-module 400 to implement logic to perform various functions. As a result of the node 300a being active to engage in communications with one or more of the client devices 100 and to perform data access commands, the processor component 450 of the M-module 400 of the node 300a may be active to execute the control routine 440. However, as a result of the node 300b being inactive, the processor component 450 may not be active to execute the control routine 440 within the M-module 400 of the node 300b. However, if the node 300b takes over for the node 300a, then the control routine 440 within the node 300b may begin to be executed, while the control routine 440 within the node 300a may cease to be executed.

In executing the control routine 440, the processor component 450 of the M-module 400 of the active node 300a may operate the interface 490 to accept remotely supplied configuration information. Specifically, the processor component 450 may provide a web server, telnet access, instant messaging and/or other communications service(s) by which aspects of the operation of the node 300a, the HA group 1600ab, the cluster 1300a and/or other components of the storage cluster system 1000 may be remotely configured. In some embodiments, such remote configuration may emanate from one or more of the client devices 100. By way of example, security protocols by which each of the client devices 100 may be authenticated to allow access to the client device data 130 stored within the set of storage devices 800ab may be remotely configured, as well as what protocols may be employed in communications via the client interconnect 199, what file system may be employed in storing client device data 130 within the set of storage devices 800ab, what other one(s) of the nodes 300b-d or 300y-z may be partnered with the node 300a to form the HA group 1600ab, what other node and/or HA group may cooperate with the node 300a and/or the HA group 1600ab to provide further fault tolerance, what network addresses may be allocated to others of the nodes 300a-d and/or 300y-z on various interconnects, etc. As the processor component 450 receives such configuration information and/or subsequent to receiving such information, the processor component 450 may operate the interface 490 to relay it and/or updates thereto to the N-module 500 and/or the D-module 600 as a portion of metadata.

In various embodiments, the N-module 500 of each of the nodes 300a-b incorporates one or more of a processor component 550, a memory 560 and an interface 590 to couple the N-module 500 to one or both of the client interconnect 199 and the intra-cluster interconnect 599a. The memory 560 may store a control routine 540. The control routine 540 may incorporate a sequence of instructions operative on the processor component 550 in its role as a main processor component of the N-module 500 to implement logic to perform various functions. As a result of the node 300a being active to engage in communications with one or more of the client devices 100 and to perform data access commands, the processor component 550 of the N-module 500 of the node 300a may be active to execute the control routine 540. However, as a result of the node 300b being inactive, the processor component 550 may not be active to execute the control routine 540 within the N-module of the node 300b. However, if the node 300b takes over for the node 300a, then the control routine 540 within the node 300b may begin to be executed, while the control routine 540 within the node 300a may cease to be executed.

In executing the control routine 540, the processor component 550 of the N-module 500 of the active node 300a may operate the interface 590 to perform various tests to detect other devices with which to communicate and/or assign network addresses by which other devices may be contacted for communication. At least as part of rebooting following being reset or powered on, the processor component 550 may perform various tests on the client interconnect 199 and/or the intra-cluster interconnect 599a to determine addresses and/or communications protocols for communicating with one or more components (e.g., M-modules 400, N-modules 500 and/or D-modules 600) of one or more of the nodes 300a-d and/or 300y-z. Alternatively or additionally, in embodiments in which at least a portion of the intra-cluster interconnect 599a supports internet protocol (IP) addressing, the processor component 550 may function in the role of a dynamic host control protocol (DHCP) server to assign such addresses. Also alternatively or additionally, the processor component 550 may receive configuration information from the M-module 400.

In some embodiments, configuration information received from the M-module 400 may be employed by the processor component 550 in performing such tests on the client interconnect 199 and/or the intra-cluster interconnect 599a (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the D-module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the D-module 600 as portions of updated metadata.

In further executing the control routine 540, the processor component 550 may operate the interface 590 to exchange storage service requests, responses thereto and/or client device data 130 with one or more of the client devices 100 via the client interconnect 199. The client devices 100 and the N-module(s) 500 of one or more active ones of the nodes 300a-d and 300y-z may interact with each other via the client interconnect 199 in accordance with a client/server model for the handling of client device data 130. Stated differently, each of the client devices 100 may issue requests for storage services related to the storage of client device data 130 to one or more of the nodes 300a-d and 300y-z that are active to engage in communications with the client devices 100. In so doing, the client devices 100 and the N-module 500 may exchange packets over the client interconnect 199 in which storage service requests may be transmitted to the N-module 500, responses (e.g., indications of status of handling of the requests) may be transmitted to the client devices 100, and client device data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client device data 130, with the D-module 600 via the intra-cluster interconnect 599a. Such exchanges of commands and/or data may or may not employ a protocol in which packets are used. In some embodiments, data access commands to effect exchanges of client device data 130 may be exchanged through the intra-cluster interconnect 599a in a manner that may be agnostic of any particular file system that may be selected for use in storing the client device data 130 within the set of storage devices 800ab. More specifically, the manner in which portions of client device data 130 may be referred to in data access commands to store and/or retrieve client device data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the D-module 600 via the intra-cluster interconnect 599a. Alternatively or additionally, one or more of the protocols employed in communications via the client interconnect 199 may employ file and/or block identification in a manner enabling a minimal degree of protocol translation between such communications and communications via the intra-cluster interconnect 599a.

In performing such protocol translations, the processor component 550 may be caused to relay a storage service request from one of the client devices 100 to the D-module 600 as one or more data access commands to store and/or retrieve client device data 130. More specifically, a request received via the client interconnect 199 for storage services to retrieve client device data 130 may be converted into one or more data access commands conveyed to the D-module 600 via the intra-cluster interconnect 599a to retrieve client device data 130 from the set of storage devices 800ab and to provide the client device data 130 to the N-module 500 to be relayed by the N-module 500 back to the requesting one of the client devices 100. Also, a request received via the client interconnect 199 for storage services to store client device data 130 may be converted into one or more data access commands conveyed to the D-module 600 via the intra-cluster interconnect 599a to store the client device data 130 within the set of storage devices 800ab.

In various embodiments, the D-module 600 of each of the nodes 300a-b incorporates one or more of a processor component 650, a memory 660, a storage controller 665 to couple the D-module 600 to the set of storage devices 800ab via the storage interconnect 899ab, and an interface 690 to couple the D-module 600 to one or more of the intra-cluster interconnect 599a, the inter-cluster interconnect 399 and the HA interconnect 699ab. The memory 660 stores one or more of a control routine 640 and metadata 630ab. Also, and as will be explained in greater detail, in the D-module 600 of the node 300a, a portion of the memory 660 may be allocated to serve as a synchronization cache (sync cache) 639a, while a portion of the memory 660 may be similarly allocated to serve as a sync cache 639b in the D-module of the node 300b. The control routine 640 incorporates a sequence of instructions operative on the processor component 650 in its role as a main processor component of the D-module 600 to implement logic to perform various functions. However, as a result of the node 300a being active to engage in communications with one or more of the client devices 100 and to perform data access commands, a different portion of the control routine 640 may be executed by the processor component 650 of the D-module 600 of the node 300a from a portion of the control routine 640 that may be executed by the processor component 650 of the D-module of the node 300b. As a result, different logic may be implemented by the executions of different portions of the control routine 640 within each of these D-modules 600.

In executing the control routine 640, the processor component 650 of the D-module 600 of the active node 300a may operate the interface 690 to receive portions of metadata and/or updates thereto from the M-module 400 and/or the N-module 500 via the intra-cluster interconnect 599a. Regardless of whether aspects of the operation of at least the node 300a are remotely configured via the M-module 400 and/or are configured based on the results of tests performed by the N-module 500, the processor component 650 may generate the metadata 630ab from those received metadata portions indicating the resulting configuration of those aspects, and may store the metadata 630ab within the memory 660 for subsequent use by the processor component 650. The processor component 650 may repeat the generation of the metadata 630ab in response to receiving updated portion(s) of metadata from the M-module 400, the N-module 500 and/or other possible sources of updated metadata portions, thereby creating an updated version of the metadata 630ab which the processor component 650 may store within the memory 660 in place of earlier version(s).

Following generation of the metadata 630ab and/or each updated version thereof, the processor component 650 may store the metadata 630ab within the set of storage devices 800ab for later retrieval. During subsequent rebooting of the D-module 600 of the node 300a, the processor component 650 may be caused by its execution of the control routine 640 to access the set of storage devices 800ab to retrieve the metadata 630ab. In this way, the processor component 650 retrieves indications of the manner in which various aspects of the operation of at least the node 300a are to be configured, including aspects of the manner in which the D-module 600 is to operate the set of storage devices 800ab and/or the manner in which the D-module 600 is to interact with other devices (e.g., the M-module 400 or the N-module 500 of the node 300a, and/or the N-module 500 or the D-module 600 of one or more of the other nodes 300b-d or 300y-z). It may be deemed desirable to enable the D-module 600 of the node 300a to obtain information concerning aspects of operation of at least the node 300a as quickly as possible by doing so independently of the M-module 400 and/or the N-module 500.

There may be occasions where multiple components of the node 300a, including more than one of the M-module 400, the N-module 500 and the D-module 600, are caused to reboot, including and not limited to, implementing updates, upgrades, expansions of storage space, repairs, etc. By storing the metadata 630ab within the set of storage devices 800ab for later retrieval following a rebooting of the D-module 600, the need for the D-module 600 to await completion of rebooting of the M-module 400 and/or the N-module 500 before being provided with metadata portions from which to again derive the metadata 630ab is avoided.

Alternatively or additionally, a situation may arise in which the M-module 400 and/or the N-module 500 may become inoperative. By way of example, where more than one of the M-module 400, the N-module 500 and the D-module 600 are rebooted, the M-module 400 and/or the N-module 500 may fail to successfully reboot such that either of the M-module 400 or N-module 500 remain unresponsive to any request from the D-module 600 to provide metadata portions making up the metadata 630ab for an extended period of time. Thus, the ability of the D-module 600 to independently retrieve the metadata 630ab may allow the D-module 600 to still cooperate with N-modules 500 and/or D-modules 600 of one or more of the other nodes 300b-d and/or 300y-z to provide fault-tolerant storage and retrieval of the client device data 130, despite the loss of at least some functionality of the node 300a.

Also following generation of the metadata 630ab and/or each updated version thereof, the processor component 650 of the D-module 600 of the node 300a may operate the interface 690 to transmit a duplicate of the metadata 630ab to the D-module 600 of the inactive node 300b via the HA interconnect 699ab to enable the node 300b to more speedily take over for the active node 300a in response to a failure within the node 300a. In this way, the node 300b is directly provided with the metadata 630ab and/or updated versions thereof to provide information needed by the node 300b to more readily take over communications with one or more client devices, take over communications with one or more others of the nodes 300c-d and/or 300y-z, and/or take over control of and/or access to the set of storage devices 800ab.

Still further following generation of the metadata 630ab and/or each updated version thereof, the processor component 650 of the D-module 600 of the node 300a may operate the interface 690 to transmit a portion of the metadata 630ab to the D-module 600 of an active one of the nodes 300y-z of the HA group 1600yz of the other cluster 1300z. Alternatively or additionally, the processor component 650 of the D-module 600 of the node 300a may operate the interface 690 to transmit metadata portion(s) received from the M-module 400 and/or the N-module 500 of the node 300a to the active one of the nodes 300y-z. Such metadata portion(s) may include indications of aspects of operation of all of the nodes 300a-b and 300y-z together in storing and/or providing access to the client device data 130, and may be provided to the active one of the nodes 300y-z as an input to other metadata that may be separately generated and/or maintained by the nodes 300y-z.

In further executing the control routine 640, the processor component 650 of the D-module 600 of the node 300a may operate the set of storage devices 800ab through the storage controller 665 to store and retrieve client device data 130 in response to data access commands to do so received via the intra-cluster interconnect 599a, as has been described. The processor component 650 may operate the interface 690 to receive the data access commands from and/or exchange data (including client device data 130) with the N-module 500 via the intra-cluster interconnect 599a. The processor component 650 may be caused to retry the performance of a data access command to store or retrieve client device data 130 at least in response to the occurrence of a short term failure in performance (e.g., a failure that is likely to be resolved relatively quickly). However, if the failure in performance is a longer term failure (e.g., a failure that cannot be resolved quickly and/or requires intervention of personnel), then a takeover may occur in which, for example, the node 300b becomes the new active node of the HA group 1600ab.

In addition to operating the storage controller 665 to execute data access commands to store client device data 130 within the set of storage devices 800ab and/or retrieve client device data 130 therefrom, the processor component 650 of the D-module 600 of the node 300a may also replicate the data access commands and operate the interface 690 to transmit the resulting replica data access commands via the inter-cluster interconnect 399 to a D-module 600 of an active one of the nodes 300y-z of the HA group 1600yz of the other cluster 1300z. As has been discussed, the transmission of such replica data access commands to an active node of another HA group may provide an additional degree of fault tolerance in the storage and/or retrieval of client device data 130 in which the replica data access commands may be performed by an active node of another cluster at least partly in parallel with the performance of the original data access command by the node 300a. The processor component 650 may be caused to retry the transmission of such replica data access commands to either the same active one of the nodes 300y-z within the HA group 1600yz and/or to a different inactive one of the nodes 300y-z within the HA group 1600yz in response to indications of errors in either the receipt or performance of the replica data access commands. Retrying transmission of replica data access commands to an inactive one of the nodes 300y-z may cause or arise from a takeover of the active one of the nodes 300y-z by the inactive one thereof.

In support of such exchanges of replica data access commands and responses thereto between the D-module 600 of the node 300a and a D-module 600 of an active one of the nodes 300y-z, the processor component 650 of the D-module 600 of the node 300a may employ information included within the metadata 630ab to form an active communications session with the D-module 600 of that other active node through the inter-cluster interconnect 399. The processor component 650 may additionally form an inactive communications session with a D-module of the inactive one of the nodes 300y-z through the inter-cluster interconnect 399 in preparation for retrying a transmission of a replica data access command to the D-module 600 of that inactive node. Further, if the processor 650 retries the transmission of a replica data access command to the D-module 600 of that inactive one node, then the processor component 650 may act to change the state of the inactive communications session formed with the D-module 600 of that inactive node from inactive to active.

In executing the control routine 640, the processor component 650 of the D-module 600 of the inactive node 300b may operate the interface 690 to receive the metadata 630ab and/or updates thereto from the D-module 600 of the node 300a via the HA interconnect 699ab. The processor component 650 may then store the received metadata 630ab and/or the received updates thereto within the memory 660 for subsequent use. Again, provision of the metadata 630ab and updates thereto directly to the node 300b by the node 300a may be deemed desirable to enable the node 300b to more quickly take over for the node 300a (thereby transitioning from being an inactive node of the HA group 1600ab to becoming the active node of the HA group 1600ab) in response to a failure occurring within the node 300a. More specifically, with the metadata 630ab already provided to the D-module 600 of the node 300b, the need for the processor component 650 of the D-module 600 of the node 300b to take additional time to retrieve the metadata 630ab from other sources is alleviated. More precisely, the need for the processor component to retrieve the metadata 630ab from the set of storage devices 800ab, or to request portions of metadata from the M-module 400 and/or the N-module 500 of either of the nodes 300a or 300b upon taking over for the node 300a is alleviated.

As depicted, the metadata 630ab may include immutable metadata 631ab and mutable metadata 632ab. What pieces of metadata are included in each of the immutable metadata 631ab and the mutable metadata 632ab may be based on the relative frequency with which each piece of metadata is expected to change. By way of example, aspects of the storage of client device data 130 within the set of storage devices 800ab, such as a selection of file system, a "level" of redundancy of a Redundant Array of Independent Disks (RAID), etc. may be deemed immutable as a result of being deemed less likely to change or likely to change less frequently than other metadata. In contrast, a network address of a M-module, a N-module or a D-module of one of the other nodes 300a-d or 300y-z with which the node 300a may communicate via one of the interconnects 399, 599a or 699ab may be deemed mutable as a result of being deemed more likely to change or likely to change more frequently than other metadata.

Since the mutable metadata 632ab includes indications of aspects of the operation of at least the node 300a that are deemed likely to change with greater frequency than similar indications included in the immutable metadata 631ab, the information included in at least the mutable metadata 632ab may more frequently become out of date. Following rebooting of the D-module 600 of the node 300a, if an attempt by the processor component 650 to employ information in the mutable metadata 632ab obtained from the storage devices 800ab to communicate with other components of the node 300a and/or with components of others of the nodes 300b-d and/or 300y-z is unsuccessful, then the processor component 650 may operate the interface 690 to transmit a request to the M-module 400 and/or the N-module 500 via the intra-cluster interconnect 599a for metadata portions that include updated versions of the information included in the mutable metadata 632ab. Depending on whether the M-module 400 and/or the N-module 500 are also rebooting, the processor component 650 may be caused to await completion of their rebooting and to then retransmit its request for those updated metadata portions. In response to receiving the request, the processor components 450 and/or 550 may be caused by execution of the control routines 440 and/or 540 to operate the interfaces 490 and/or 590, respectively, to transmit such updated metadata portions to the D-module 600 via the intra-cluster interconnect 599a. Upon receiving the updated information, the processor component 650 may then incorporate the updated information into the mutable metadata 632ab, again generate the metadata 630ab incorporating the updated mutable metadata 632ab, store the now updated metadata 630ab within the memory 660 and the set of storage devices 800ab, and employ the now updated metadata 630ab within the memory 660 to operate the interface 690 to make another attempt to communicate with other components of the node 300a and/or with components of others of the nodes 300b-d and/or 300y-z.

In some embodiments, if the attempt by the processor component 650 to communicate using the metadata 630ab incorporating the now updated mutable metadata 632ab is also unsuccessful, then the processor component 650 may operate the interface 690 to transmit a request to the M-module 400 and/or the N-module 500 for updated versions of the information making up the immutable metadata 631ab. It may be that an updated version of the immutable metadata 631ab includes indications of aspects of operation that are needed in conjunction with using the information contained within the updated version of the mutable metadata 632ab. Upon receiving the updated information, the processor component 650 may then incorporate the updated information into the immutable metadata 631ab, again generate the metadata 630ab incorporating the updated immutable metadata 631ab, store the now updated metadata 630ab within the memory 660 and the set of storage devices 800ab, and employ the now updated metadata 630ab to make a further attempt to communicate with other components of the node 300a and/or with components of others of the nodes 300b-d and/or 300y-z.

As part of determining whether one of the nodes 300a or 300b needs to take over for the other, the processor components 650 of the D-modules of each of the nodes 300a and 300b may cooperate to recurringly exchange indications of the status of their nodes via the HA interconnect 699ab extending therebetween. As previously discussed such exchanges of status indications may take the form of recurring "heartbeat" signals and/or indications of the current state of performing an operation (e.g., a performing a data access command). Again, an indication that a component of one of the nodes 300a-b has suffered a malfunction may be the lack of receipt of an expected heartbeat signal or other status indication by the other of the nodes 300a-b within a specified period of time (e.g., within a recurring interval of time). Where the D-module 600 of the active node 300a receives an indication of a failure within the inactive node 300b, the processor component 650 of the D-module 600 of the node 300a (or another component of the node 300a) may refrain from taking action to take over the node 300b, since the node 300b is inactive such that the node 300b may not be performing a task that requires a takeover of the node 300b.

However, where the D-module 600 of the inactive node 300b receives an indication of a failure within the active node 300a, the processor component 650 of the D-module 600 of the inactive node 300b (or another component of the inactive node 300b) may take action to take over the node 300a, since the node 300a is active to engage in communications with the client devices 100, to perform data access commands, and to cooperate with another active node to cause at least partial parallel performance of data access commands therebetween. By way of example, the processor component 650 of the D-module 600 of the node 300b may signal the N-module 500 of the node 300b to take over communications with one or more of the client devices 100 and/or may begin performing the data access commands that were performed by the processor component 650 of the D-module 600 of the node 300a. In taking over the performance of those data access commands, the processor component 650 of the D-module 600 of the node 300b may take over access to and control of the set of storage devices 800ab via the coupling that the D-modules 600 of both of the nodes 300a and 300b share to the set of storage devices 800ab through the storage interconnect 899ab.

Where the inactive node 300b does take over for the active node 300a in response to a failure occurring within the node 300a, the active and inactive roles of the nodes 300a and 300b may fully reverse, at least after the failure within the node 300a has been corrected. More specifically, the M-module 400 and the N-module 500 of the node 300b may become active to engage in communications with the client devices 100 via the client interconnect 199 to receive configuration information and storage service requests, and thereby take over for the M-module 400 and the N-module 500 of the node 300a, while the M-module 400 and the N-module 500 of the node 300a become inactive. Similarly, the D-module 600 of the node 300b may become active to perform and replicate data access commands, and to transmit replica data access commands to another active node via the inter-cluster interconnect 399 to cause at least partial parallel performance of the data access commands, and thereby take over for the D-module 600 of the node 300a, while the D-module 600 of the node 300a becomes inactive. However, in becoming active, the processor component 650 of the D-module 600 of the now inactive node 300a may cooperate with the processor component 650 of the D-module 600 of the node 300b to receive new versions of the metadata 630ab generated within the node 300b and to exchange indications of status with the D-module 600 of the node 300b via the HA interconnect 699ab to determine if the node 300a should subsequently take over for the now active node 300b.

The processor components 650 of the D-modules 600 of each of the nodes 300a and 300b may designate or otherwise use a portion of corresponding ones of the memories 660 as the synchronization (sync) caches 639a and 639b, respectively, in communications with D-module(s) 600 of others of the nodes 300a-d and/or 300y-z. More specifically, the processor components 650 of the D-modules 600 of the nodes 300a and 300b may employ the sync caches 639a and 639b, respectively, to buffer versions of the metadata 630ab and/or status indications exchanged therebetween. Alternatively or additionally, the processor component 650 of the D-module 600 of the node 300a may maintain and employ the synchronization cache 639a to buffer replica data access commands transmitted to another active node of another HA pair of another cluster and/or indications of status of performance of those replica data access commands received from that other active node.

Broadly, each of the client devices 100, the nodes 300a-d and 300y-z, the M-modules 400, the N-module 500, the D-modules 600 and/or the storage devices 800ab, 800cd and 800yz may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

In some embodiments, one or more of the nodes 300a-d and 300y-z may be physically implemented as an assembly of one or more M-modules 400, one or more N-modules 500 and one or more D-modules 600 that are each implemented as separate computing devices coupled by a physical implementation of a corresponding one of the intra-cluster interconnect 599a or 599z. However, in other embodiments, more than one of the M-module(s) 400, the N-module(s) 500 and D-module(s) 600 of one or more of the nodes 300a-d and 300y-z may be implemented as sets of instructions that are executed as processes by a shared processor component (e.g., one of the processor components 450, 550 or 650). In such other embodiments, at least a portion of the intra-cluster interconnect 599a or 599z that does not extend between nodes may be implemented as a buffer or other data structure defined within a shared memory (e.g., one of the memories 460, 560 or 660) and employed to exchange data access commands, client device data 130 and metadata 630ab among the control routines 440, 540 and/or 640.

In the examples presented herein, one or more of the client devices 100 may be a computing device directly operated by one or more persons to generate and/or work with client device data 130, and one or more of the nodes 300a-d and 300y-z may be a computing device functioning as a server to remotely store such client device data 130, as well as to provide the client devices 100 with access thereto in a fault-tolerant manner. Alternatively or additionally, in examples presented herein, one or more of the client devices 100 may be a computing device functioning as a server to store and provide access to at least a portion of client device data 130, and one or more of the nodes 300a-d and 300y-z may be a computing device functioning as an additional server to augment the storage provided by one or more of the client devices 100.

Figure 4:
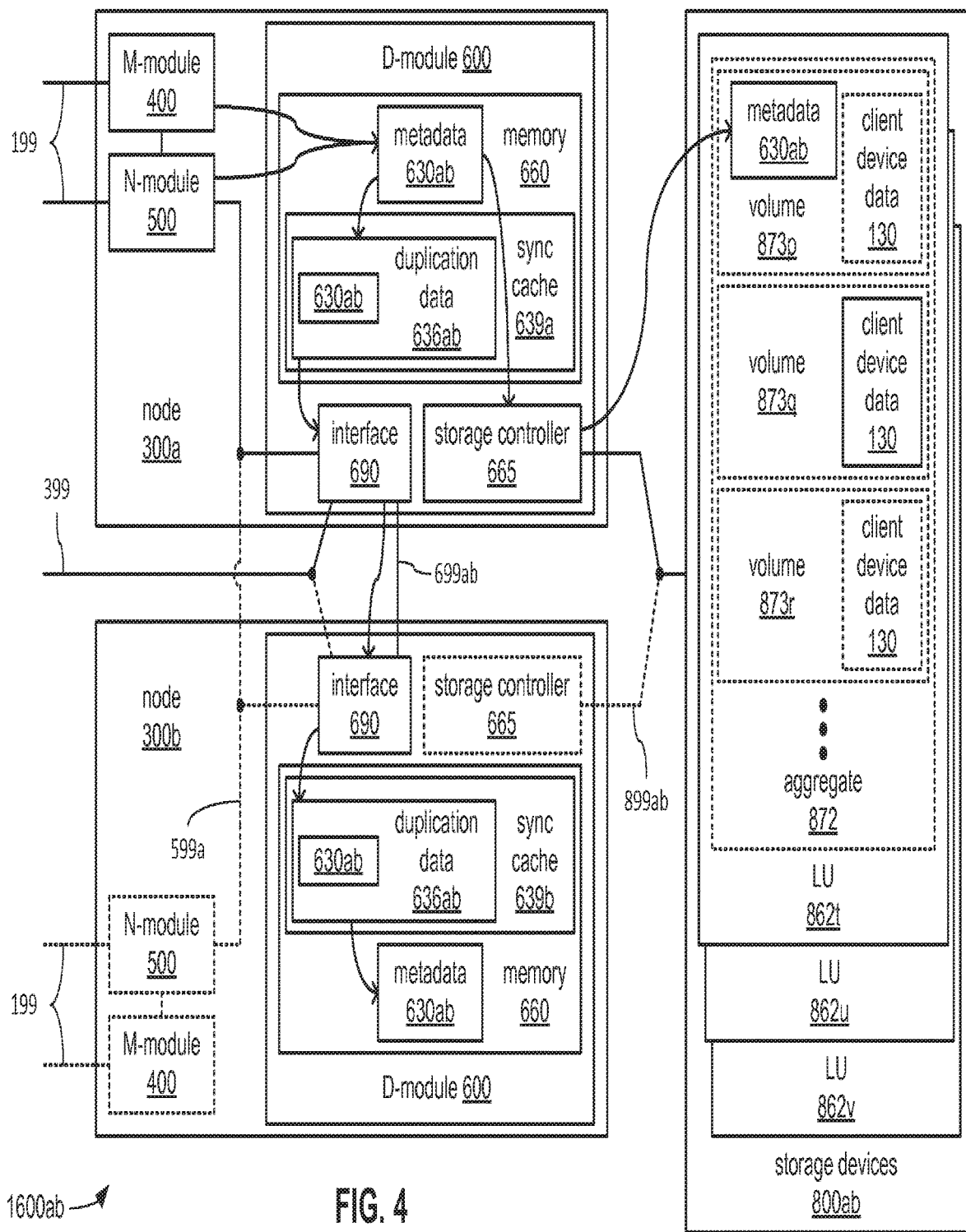
FIG. 4 illustrates an example embodiment of duplication and storage of metadata within a shared set of storage devices.

FIG. 4 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and perform operations altering the client device data 130 within the set of storage devices 800ab, while the node 300b may be inactive and awaiting a need to take over for the node 300a. FIG. 4 also depicts various aspects of the generation, duplication and storage of the metadata 630ab within the set of storage devices 800ab alongside the client device data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. As depicted, the set of storage devices 800ab may include LUs 862t-v that may be operated together to form an array of storage devices. In some embodiments, the processor component 650 of the D-module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client device data 130 into separate categories based on subject, as part of separating client device data 130 into different versions generated over time, as part of implementing differing access policies to different pieces of client device data 130, etc. In some embodiments, and as depicted, the storage space provided by within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630ab.

The client device data 130 may be stored entirely within one of the volumes 873p-r, or may be distributed among multiple ones of the volumes 873p-r (as depicted). As also depicted, the metadata 630ab may also be stored within the set of storage devices 800ab along with client device data 130, at least within the same aggregate 872. In some embodiments, the metadata 630ab may be stored within one or more of the same volumes 873p-r as client device data 130 (as depicted). In other embodiments, the metadata 630ab may be stored within one of the volumes 873p-r that is separate from one or more others of the volumes 873p-r within which client device data 130 may be stored. The manner in which the metadata 630ab and/or the client device data 130 are organized within aggregates and/or values may be specified within the metadata 630ab.

As previously discussed, the M-module 400 of the active node 300a may provide portions of metadata, including updates thereof, to the N-module 500 and/or the D-module 600 in response to receiving configuration information from one of the client devices 100. Also, the N-module 500 of the active node 300a may provide portions of metadata, including updates thereof, to the D-module 600 that indicate results of various tests performed by the N-module 500. The metadata 630ab and/or updated versions thereof may be generated from these portions of metadata received by the D-module 600 of the active node 300a, and may then be stored within the memory 660 for subsequent use by the processor component 650 and/or within the set of storage devices 800ab for subsequent retrieval following rebooting of the D-module 600. Alternatively or additionally, a duplicate of the metadata 630ab may be generated and stored within the sync cache 639a as a portion of duplication data 636ab, by which the duplicate of the metadata 630ab may be transmitted via the interface 690 and the HA interconnect 699ab to the D-module 600 of the inactive node 300b. Upon receipt via the interface 690 of the D-module 600 of the node 300b, the duplication data 636ab may be stored within the sync cache 639b from which the duplicate of the metadata 630ab may be retrieved and stored elsewhere within the memory 660 for subsequent use by the processor component 650 of the D-module 600 of the node 300b.

Figure 5A:
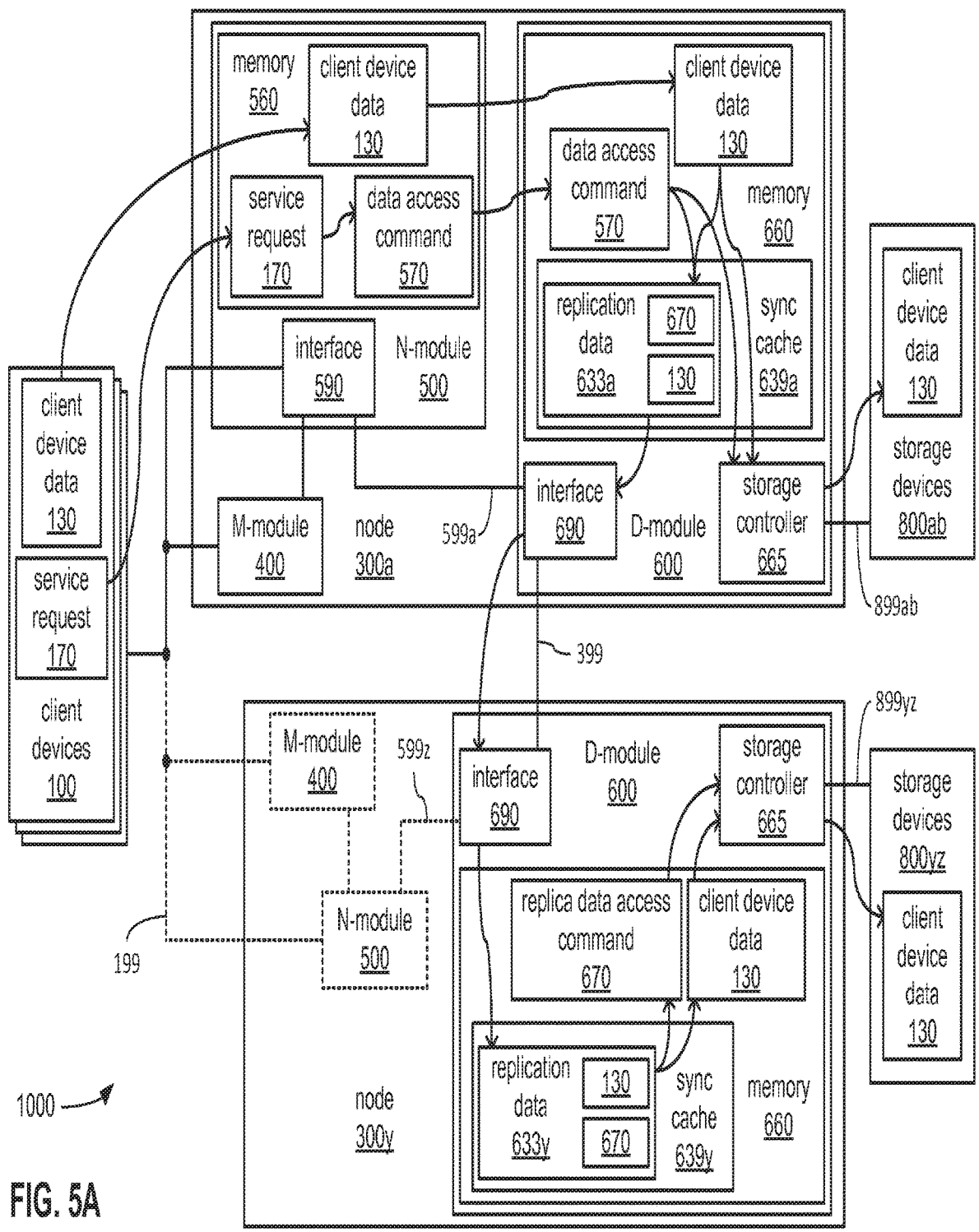
FIG. 5A illustrates an example embodiment of replication of commands between nodes.
Figure 5B:
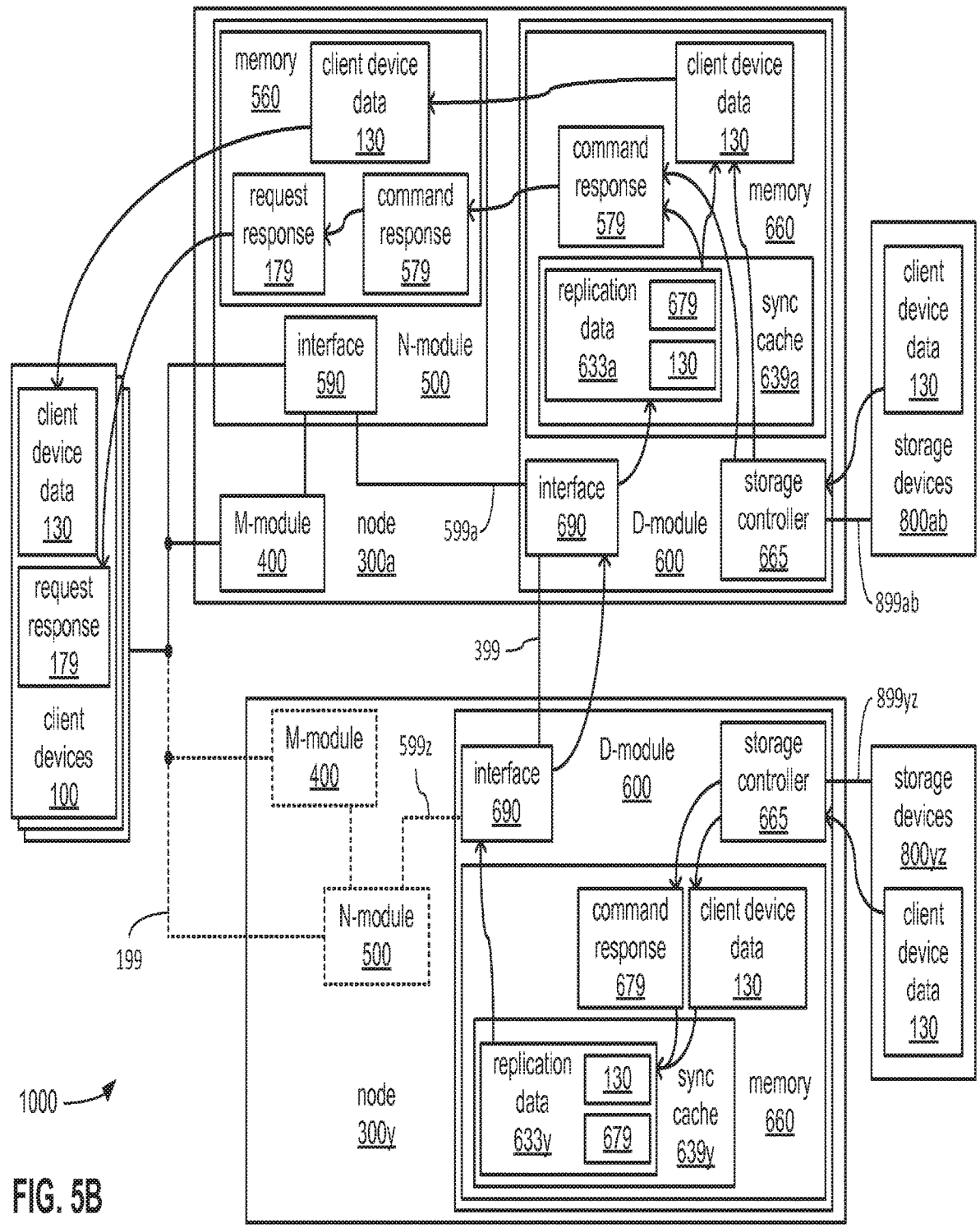
FIG. 5B illustrates an example embodiment of relaying responses to replicated commands between nodes.

FIGS. 5A and 5B both illustrate a block diagram of an example embodiment of the interconnections between active nodes 300a and 300y of the storage cluster system 1000 in greater detail. More specifically, FIG. 5A depicts aspects of replication and at least partial parallel performance of data access commands between the nodes 300a and 300y in greater detail. FIG. 5B depicts aspects of combining and relaying responses generated by such at least partial parallel performance by the nodes 300a and 300y in greater detail. As depicted in both FIGS. 5A and 5B, the node 300a may be active to engage in communications with a client device 100 and to perform data access commands altering the client device data 130 within the set of storage devices 800ab, while the node 300y may be active to engage in communications with the node 300a and to perform replica data access commands altering the client device 130 within the set of storage devices 800yz at least partly in parallel with the node 300a.

Turning to FIG. 5A, as previously discussed, the N-module 500 of the active node 300a may receive client device data 130 and/or storage service requests 170 from one of the client devices 100, which may then be temporarily stored within the memory 560. The storage service requests 170 to store and/or retrieve client device data 130 may then be translated into data access commands 570 to store and/or retrieve client device data 130, respectively. Following such translation and/or as such translation occurs, client device data 130 and/or data access commands 570 may be relayed to the D-module 600 of the active node 300a, where the client device data 130 and/or the data access commands 570 may then be temporarily stored within the memory 660 in preparation for being performed by the D-module 600 of the node 300a. However, in addition to such performance, the data access commands 570 may be replicated to generate corresponding replica data access commands 670 that may be stored within the sync cache 639a as a portion of replication data 633a. The replication data 633a may serve as a buffer of which the contents are transmitted on a recurring basis to the D-module 600 of the active node 300y via the interface 690 and the inter-cluster interconnect 399. Where the replica data access commands 670 include commands to store a piece of the client device data 130, such a piece may be stored within the synchronization cache 639a as another portion of the replication data 633a to be transmitted to the node 300y along with the replica data access commands 670.

Upon receipt via the interface 690 of the D-module 600 of the node 300y, the recurringly transmitted contents of the replication data 633a may be temporarily stored within the sync cache 639y as a portion of the replication data 633y. The received replica data access commands 670 and/or associated pieces of the client device data 130 may then be retrieved from the replication data 633y and temporarily stored elsewhere within the memory 660 in preparation for performance of the replica data access commands 670 by the D-module 600 of the node 300y. The D-module 600 of the node 300y then performs the replica data access commands 670 to store client device data 130 within and/or retrieve client device data 130 from the set of storage devices 800yz at least partly in parallel with the D-module 600 of the node 300a performing the data access commands 570 to similarly store client device data 130 within and/or retrieve client device data 130 from the set of storage devices 800ab.

Turning to FIG. 5B, as the replica data access commands 670 are performed by the D-module 600 of the node 300y, command responses 679 to the performances of those replica data access commands 670 may be generated and may be temporarily stored within the sync cache 639y as a portion of the replication data 633y. The command responses 679 may include one or more of indications of successful commencement and/or completion of performance of replica data access commands 670, and/or indications of failure occurring in attempts to perform replica data access commands 670. The replication data 633y may serve as a buffer of which the contents are transmitted on a recurring basis to the D-module 600 of the active node 300a via the interface 690 and the inter-cluster interconnect 399. Where the replica data access commands 670 include commands to retrieve a piece of the client device data 130, such a piece may be stored within the sync cache 639y as another portion of the replication data 633y to be transmitted back to the node 300a along with the command responses 679.

Upon receipt via the interface 690 of the D-module 600 of the node 300a, the recurringly transmitted contents of the replication data 633y may be temporarily stored within the sync cache 639a as a portion of the replication data 633a. The received command responses 679 and/or associated pieces of the client device data 130 may then be retrieved from the replication data 633a and temporarily stored elsewhere within the memory 660 in preparation for analysis alongside results of performance of the data access commands 570 by the D-module 600 of the node 300a. The D-module 600 of the node 300a then generates command responses 579 from such analysis and relays the command responses 579 and/or associated pieces of data 130 to the N-module 500 of the node 300a where one or both may be temporarily stored within the memory 560. The command responses 579 may then be translated into storage service request responses 179, and then the request responses 179 and/or associated pieces of client device data 130 may be transmitted back to one of the client devices 100.

The storage service request responses 179 may include a portion of the client device data 130 provided to one of the client devices 100 in response to a storage service request 170 to retrieve that portion of the client device data 130. Alternatively or additionally, the storage service request responses 179 may include the earlier described status indications indicating the status of performance of data access command(s) translated from a storage service request 170. Thus, it should be noted that a single storage service request 170 may beget more than one storage service request response 179. By way of example, a single storage service request 170 to retrieve a portion of the client device data 130 may be responded to with a first storage service request response 179 indicating that a retrial of performance is underway due to a short term failure, followed by at least a second storage service request response 179 that may include both a status indication of successful performance and the portion of the client device data 130 that was requested.

Figure 6:
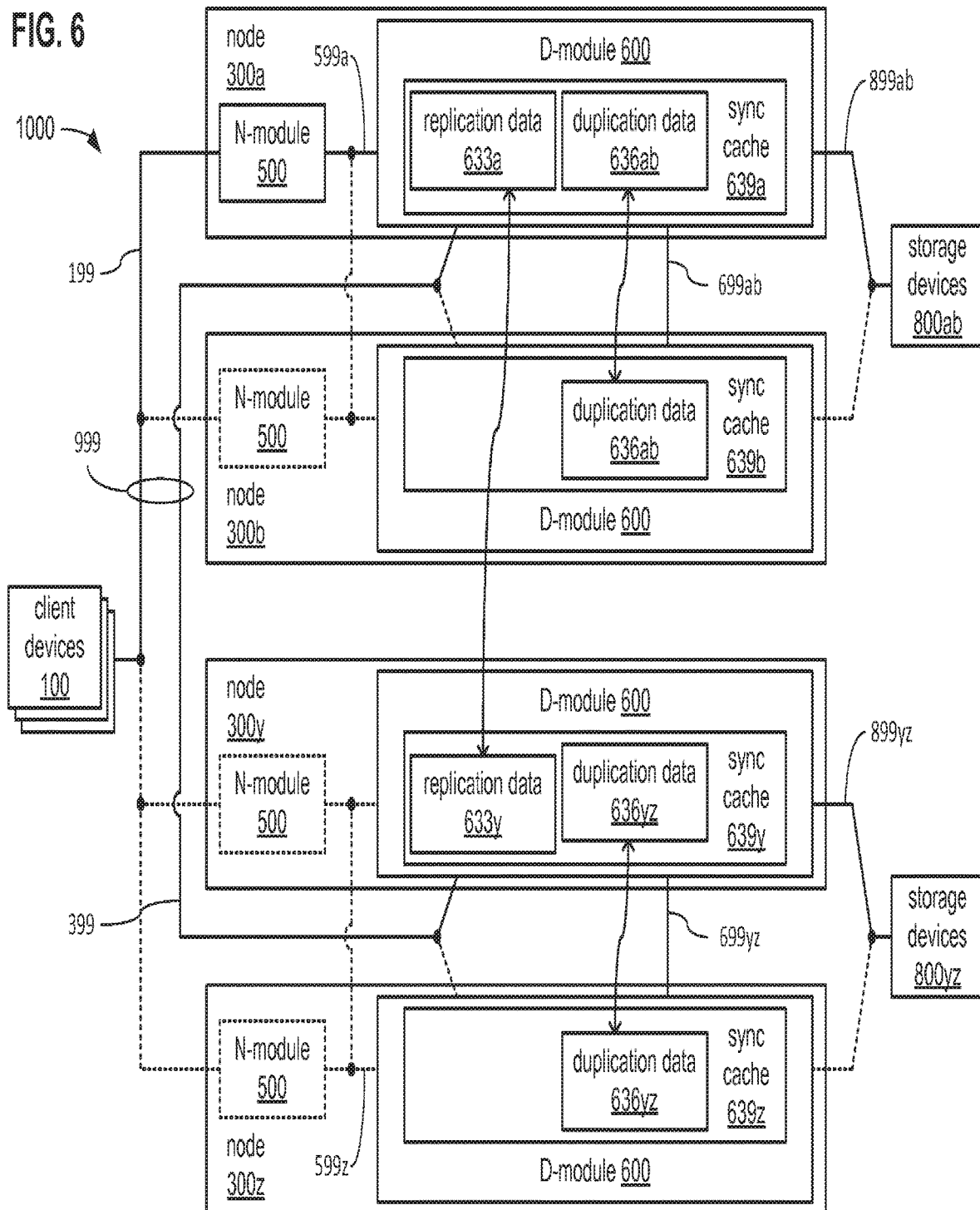
FIG. 6 illustrates an example embodiment of synchronization of commands and metadata among nodes.

FIG. 6 depicts an example embodiment of duplication of metadata within a HA group, and replication of data access commands relating to the client device data 130 between nodes of different HA groups in greater detail. As depicted, the node 300a may be active within the HA group 1600ab to communicate with the client devices 100 via the client interconnect 199 and with node 300y, which may be active within the HA group 1600yz to communicate with the node 300a via the inter-cluster interconnect 399. The nodes 300b and 300z may be inactive as each awaits the need to take over for the nodes 300a or 300y, respectively. The active state of the node 300a for communication with the client devices 100 such that the N-module 500 of the node 300a is in use to do so is indicated by the portions of the client interconnect 199 coupling the node 300a to the client devices 100 being drawn with solid lines, while portions for coupling each of the nodes 300b and 300y-z to the client interconnect 199 are drawn with dotted lines. The active states of both the nodes 300a and 300y for communication with each other are indicated by the portions of the inter-cluster interconnect 399 coupling the nodes 300a and 300y being drawn with solid lines, while portions for coupling each of the nodes 300b and 300z to the inter-cluster interconnect 399 are drawn with dotted lines.

As depicted and as has been described, the sync caches 639a-b and 639y-z may be formed within the memories 660 of the D-modules 600 of each of the nodes 300a-b and 300y-z, respectively, to enable the duplication of metadata and/or the replication of data access commands. As also previously discussed, the sync caches 639a and 639b may both include the duplication data 636ab as part of enabling cooperation between the D-modules 600 of the partnered nodes 300a and 300b to exchange the metadata 630ab. However, the sync caches 639a-b and/or the duplication data 636ab may also be employed in exchanges of status occurring between the D-modules 600 of the nodes 300a and 300b as part of each monitoring the other for indications of failure that may necessitate a takeover of one of the nodes 300a-b by the other. The sync caches 639a and 639b may be operated in a manner in which they are functionally linked to provide a portal between the D-modules 600 of the nodes 300a and 300b that may be buffered at both ends of the HA interconnect 699ab. Indications of current status of these D-modules 600 and/or duplicates of versions of the metadata 630ab may be exchanged by writing such indications and/or metadata into the duplication data 636ab of one of the sync caches 639a or 639b, and retrieving such indications and/or pieces of metadata from the duplication data 636ab of the other of the sync caches 639a or 639b. Stated differently, the contents of the duplication data 636ab may be recurringly "synchronized" between the sync caches 639a and 639b.

As also previously discussed, the sync cache 639y may include replication data 633y as a counterpart to the replication data 633a within the sync cache 639a as part of cooperation between the D-modules 600 of the nodes 300a and 300y to perform data access commands and replicas thereof at least partially in parallel. The replication data 633a and 633y may buffer information conveyed between the D-modules 600 of the nodes 300a and 300y via the inter-cluster interconnect 399. More specifically, indications of current status of the replication of data access commands by the D-module 600 of the node 300a, current status of at least partial parallel performance of the replica data access commands by the D-module 600 of at least the node 300y, and/or current status of communications therebetween concerning the replica data access commands may be maintained as part of the replication data 633a. Alternatively or additionally, replica data access commands transmitted to the D-module 600 of the node 300y, portions of client device data 130 conveyed with those replica data access commands and/or in response to those replica data access commands may also be maintained as part of the replication data 633a. Correspondingly, the replica data access commands received by the D-module 600 of the node 300y via the inter-cluster interconnect 399 from the D-module 600 of the node 300a may be buffered within the replication data 633y, along with any client device data 130 that accompanies those replica data access commands and/or responses thereto. Indications of the current status of performance of those replica data access commands by the D-module 600 of the node 300y may also be buffered within the replication data 633y before being transmitted to the D-module 600 of the node 300a.

As further depicted, the sync caches 639y and 639z may include duplication data 636yz as part of enabling cooperation between the D-modules 600 of the partnered nodes 300y and 300z to exchange status indications and duplicates of metadata therebetween in much the same manner as described above between the D-modules 600 of the nodes 300a and 300b. Stated differently, the D-modules 600 of the nodes 300y and 300z may cooperate to recurringly exchange status indications (e.g., "heartbeat" signals and/or status of performing various operations) therebetween via the HA interconnect 699yz as part of each monitoring the other for indications of failure in a manner not unlike that in which the partnered nodes 300a and 300b exchange signals via the HA interconnect 699ab to monitor each other. Further, the D-module 600 of the active node 300y may transmit versions of metadata to the D-module of the inactive node 300z via the HA interconnect 699yz in a manner not unlike that in which the partnered nodes 300a and 300b exchange versions of metadata, in addition to storing such versions within the set of storage devices 800yz. It should be noted that the metadata used by and exchanged between the nodes 300y and 300z may be at least partly different from the metadata 630ab used by and exchanged between the nodes 300a and 300b. This may arise at least partly due to the nodes 300a-b and the nodes 300y-z belonging to different HA groups and/or belonging to different clusters.

Figure 7:
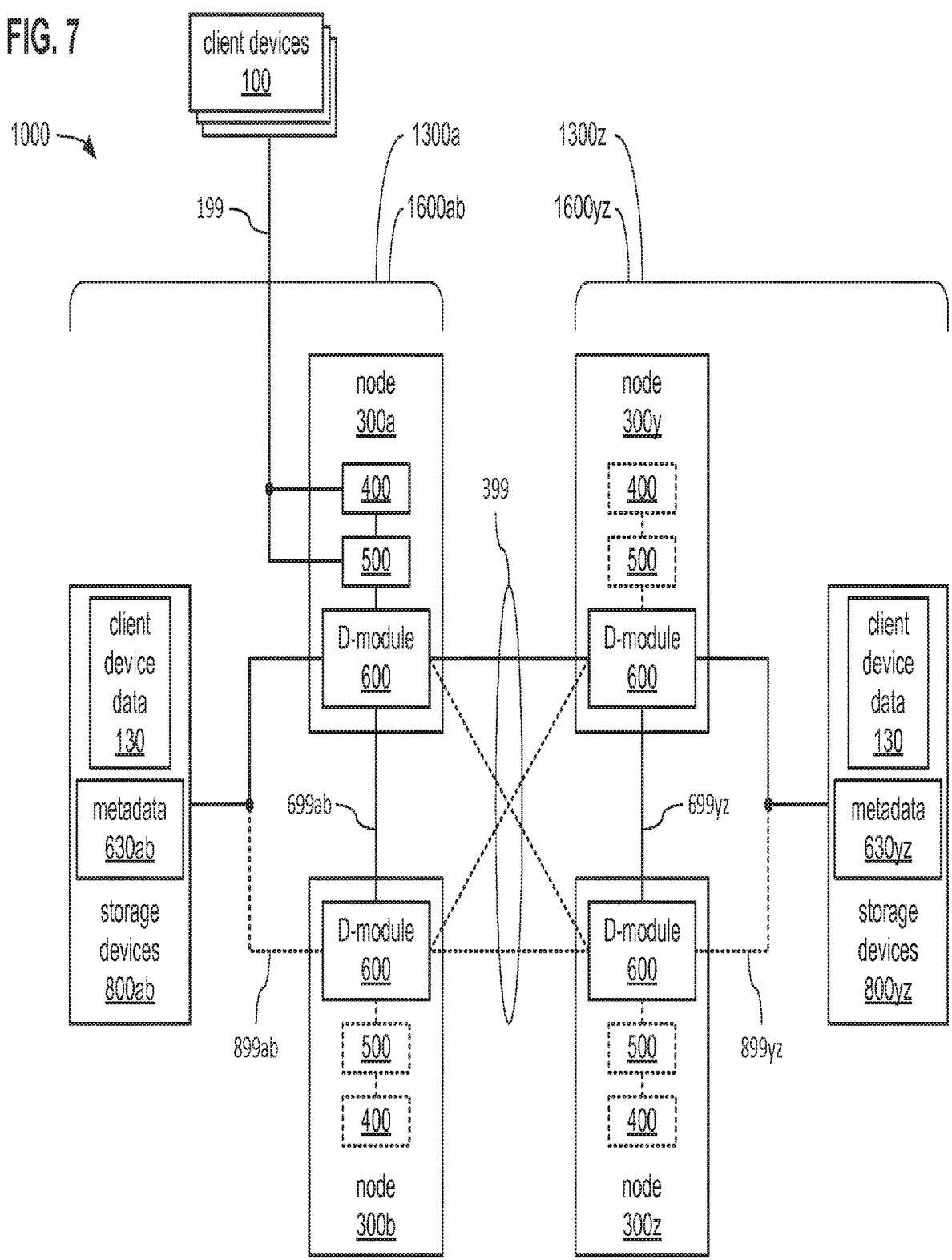
FIG. 7 illustrates an example embodiment of a mesh of communications sessions among nodes.

FIG. 7 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the N-module 500 of the node 300a, the D-module 600 of the node 300a may both begin performance of the data access command and transmit a replica of that data access command to the node 300y via the active communications session formed through inter-cluster interconnect 399 between the nodes 300a and 300y. The D-module 600 of the node 300y may then perform the replica data access command at least partly in parallel with the performance of the data access command by the D-module 600 of the node 300a.

In preparation for such a transmission, the D-module 600 of the node 300a may cooperate with the D-module 600 of the node 300y to form the depicted active communications session between the nodes 300a to 300y through an exchange of messages requesting and accepting formation of the active communications session. Following its formation, the D-modules 600 of the nodes 300a and 300y may cooperate to maintain the active communications session by recurring exchanges of test signals (e.g., test messages) therethrough to monitor the state of the active communications session.

In addition to the D-modules 600 of the nodes 300a and 300y cooperating to form and maintain the depicted active communications session through the inter-cluster interconnect 399 to support such exchanges of replica data access commands, the D-modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, test signals (e.g., test messages) may be exchanged through one or more of the inactive communications sessions to monitor their state.

In the event of a failure of at least a portion of the node 300a, the node 300b may take over for the node 300a, and in so doing, may change the state of the inactive communications session extending between the D-modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the D-modules 600 of the nodes 300a and 300z into an active communications session. By doing so, the node 300z becomes able to receive and perform replica data access commands from the node 300a in place of the node 300y. In either of these events, the active communications session extending between the D-modules of the nodes 300a and 300y may become inactive.

In various embodiments, each of the processor components 450, 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the control routines 440, 540 and 640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, each of the memories 460, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, the interfaces 490, 590 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

As has been discussed in detail, redundancy in storing and accessing the client device data 130 may be provided by effecting at least partly parallel performance of data access operations between at least two nodes that belong to different HA groups of different clusters that may be geographically dispersed. As familiar to those skilled in the art, various challenges are presented in coordinating such performances occurring at geographically distant locations, including delays imposed in transmitting commands across a long distance. Further challenges may be imposed by the use of a network in such long distance transmissions, including receiving duplicates of the commands and/or receiving the commands in an order that differs from the order in which they were transmitted and/or from the order in which they are to be executed.

Figure 8A:
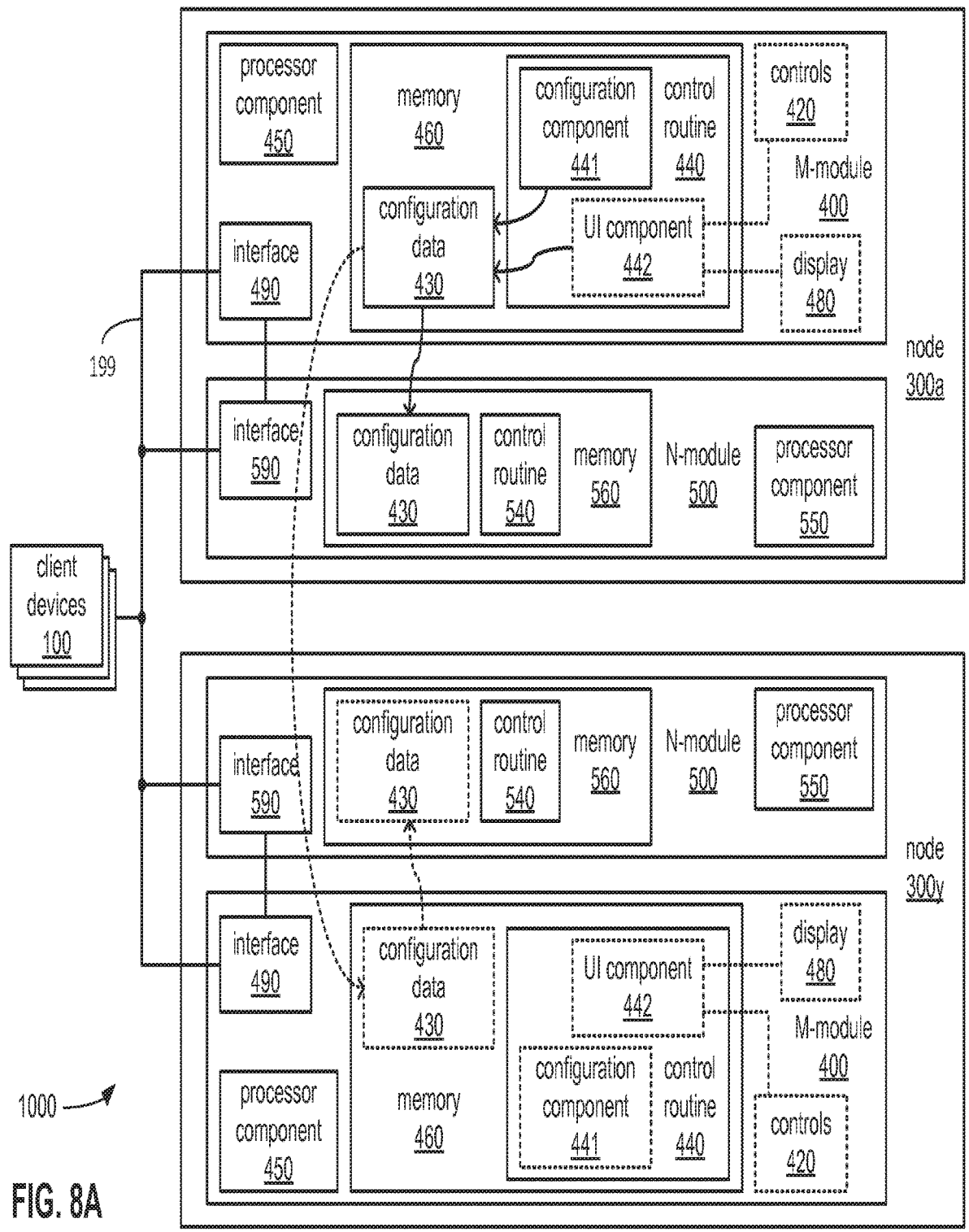
FIGS. 8A, 8B, 8C and 8D, together, illustrate an example embodiment of components of active and inactive nodes of different HA groups generating and storing metadata.
Figure 8B:
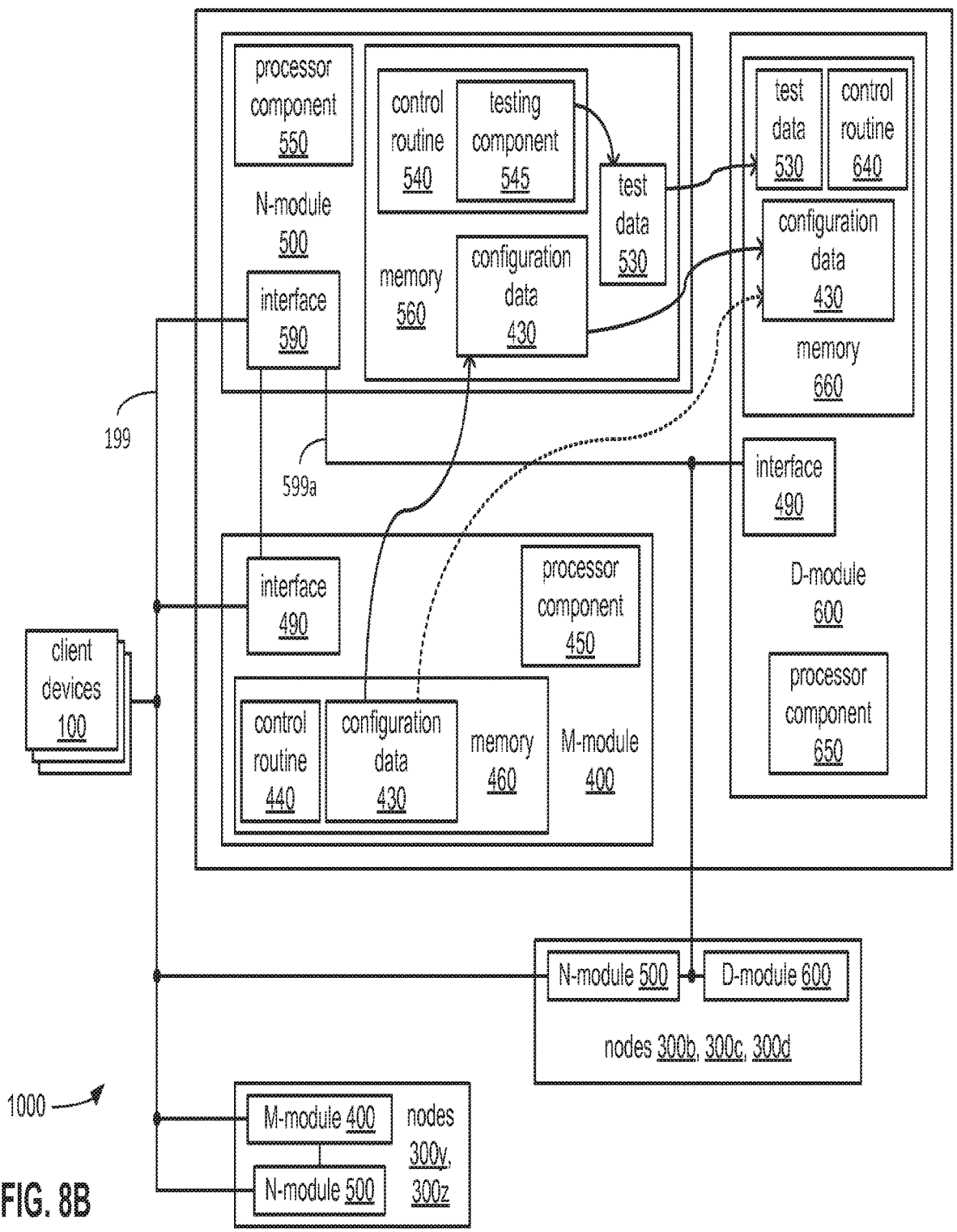
Figure 8C:
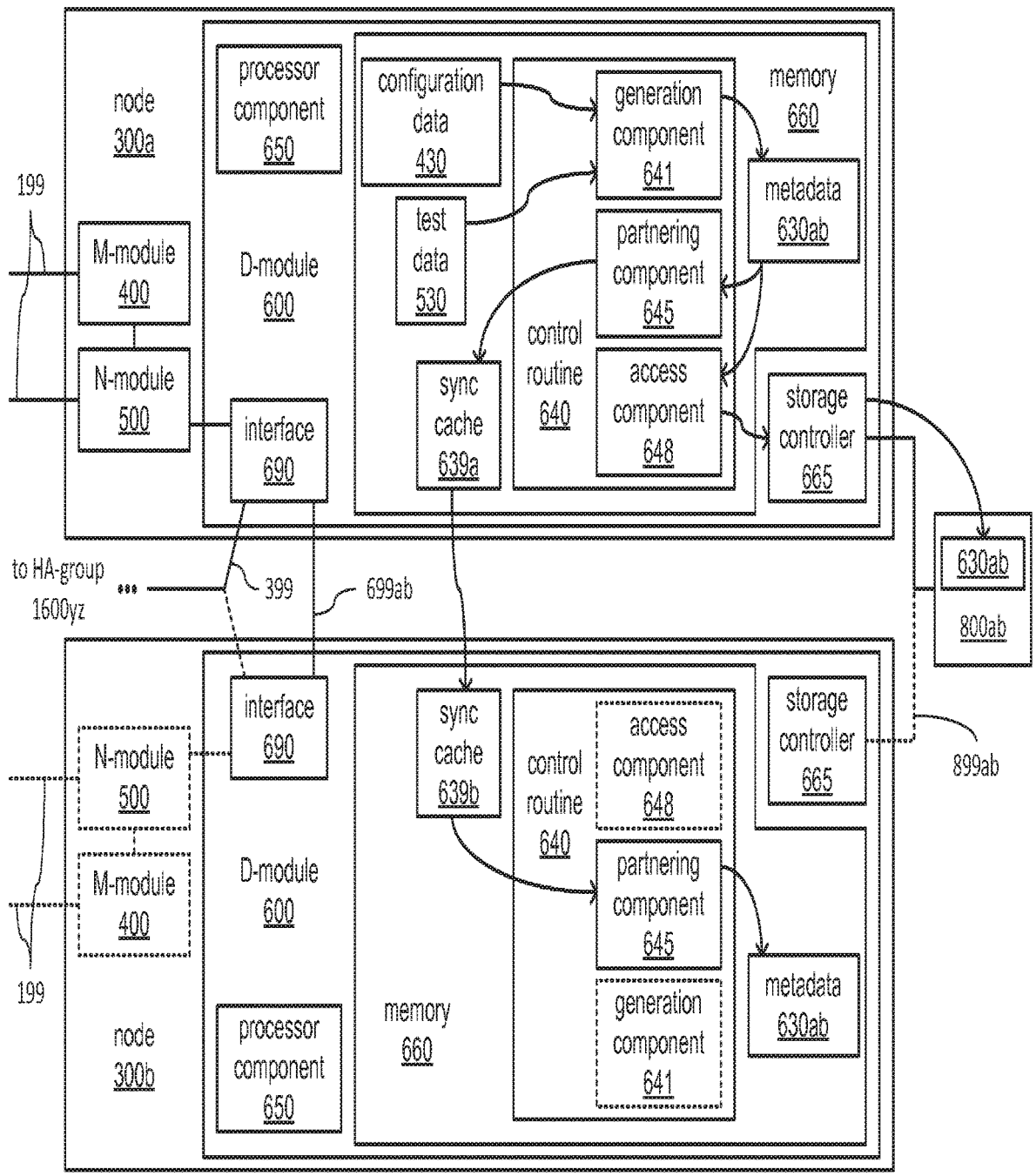
Figure 8D:
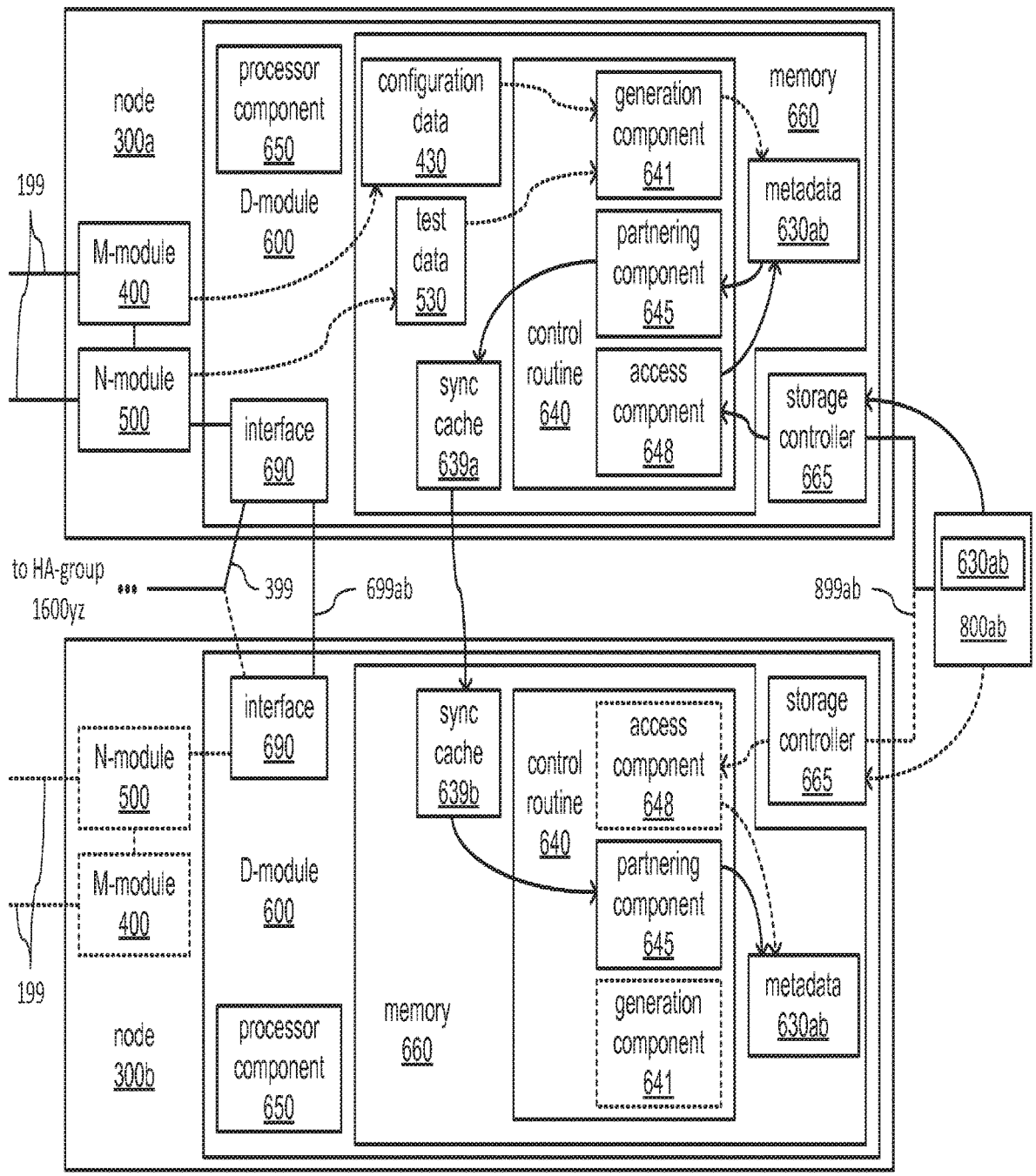

FIGS. 8A through 8D, together, illustrate example embodiments of the nodes 300a-b and 300y-z of the storage cluster system 1000 in greater detail. More specifically, FIG. 8A depicts components of M-modules 400 of the nodes 300a and 300y in greater detail, along with aspects of obtaining configuration information concerning aspects of operation of at least the node 300a within the storage cluster system 1000. FIG. 8B depicts components of a N-module 500 of the node 300a in greater detail, along with aspects of performing tests to determine various aspects of operation of at least the node 300a within the storage cluster system 1000. FIG. 8C depicts components of D-modules 600 of the nodes 300a-b in greater detail, along with aspects of generating, storing and/or distributing metadata. FIG. 8D depicts components of D-modules 600 of the nodes 300a-b in greater detail, along with aspects of either retrieving metadata from storage or regenerating metadata as an alternative. As depicted, the node 300a may be active within the HA group 1600ab to communicate with the client devices 100 via the client interconnect 199 and with node 300y, which may be active within the HA group 1600yz to exchange replica data access commands with the node 300a via the inter-cluster interconnect 399. Again, the nodes 300b and 300z may be inactive as each awaits an indication of a need to take over for the nodes 300a or 300y, respectively.

Turning to FIG. 8A, as depicted, the control routine 440 within the M-module 400 of each of the nodes 300a and 300y may incorporate a configuration component 441 and/or a user interface (UI) component 442. Also, and though not specifically shown, the M-modules 400 of the nodes 300b and 300z may also each incorporate a control routine 440 that incorporates the configuration component 441 and/or the UI component 442. As previously discussed, as a result of each of the nodes 300a and 300y being active to engage in communications with one or more of the client devices 100, the processor component 450 of the M-module 400 of the node 300a may be active to execute at least a portion of the control routine 440 (as indicated with the M-module 400 of the node 300a being drawn with solid lines). In so executing the control routine 440, the processor component 450 of the M-module 400 of at least the node 300a may execute the configuration component 441 and/or the UI component 442 of the control routine 440. However, as a result of the node 300y not being active to engage in communications with any of the client devices 100, the processor component 450 may not be active to execute either or both of the configuration component 441 or the UI component 442 of the control routine 440 within the M-module 400 of the node 300y (as indicated with the M-module 400 of the node 300b being drawn with dotted lines).

Within the M-module 400 of at least the node 300a, the configuration component 441 may be executable by the processor component 450 to accept remotely supplied configuration information concerning aspects of operation of at least the node 300a within the storage cluster system 1000. More specifically, the configuration component 441 may operate the interface 490 to accept remotely supplied configuration information from one or more of the client devices 100 via the client interconnect 199, and may store such configuration information within the memory 460 as at least a portion of configuration data 430. In so doing, the configuration component 441 may provide a web page interface, telnet access, instant messaging and/or other communications service(s) by which aspects of the operation of the node 300a, the HA group 1600ab, the cluster 1300a and/or other components of the storage cluster system 1000 may be remotely configured from one or more of the client devices 100, as has been previously discussed.

Among aspects of such operations that may be so configured may be one or more of security protocols by which each of the client devices 100 may be authenticated, protocols by which requests for storage services may be received from and/or by which client device data 130 may be exchanged with one or more of the client devices 100, what file system may be employed in storing client device data 130 within at least the set of storage devices 800ab, what other one(s) of the nodes 300b-d or 300y-z may be partnered with the node 300a to form the HA group 1600ab, what other node and/or HA group may cooperate with the node 300a and/or the HA group 1600ab to provide further fault tolerance, etc. By way of example, in embodiments in which one of the widely known and used versions or "levels" of RAID is employed in storing client device data 130 within one or more of the sets of storage devices 800ab, 800cd or 800yz, the type or level of RAID may be specified in the configuration information stored as the configuration data 430, as well as one or features of typical RAID configurations, such as stripe size, block size and/or aspects of the redundancy calculations used.

Also among aspects of such operations that may be so configured may be individual network addresses that may be allocated to others of the nodes 300a-d and/or 300y-z, network address that may be allocated to components of one or more nodes, and/or ranges of network addresses that may be allocated to one or more of those nodes and/or to components of one or more of those nodes on various interconnects, etc. By way of example, in embodiments in which one or more of the interconnects 199, 399, 599a, 599z, 699ab, 699cd, 699yz, 899ab, 899cd and 899yz employ IP addressing, individual IP addresses or ranges of IP addresses may be specified in the configuration information that is stored as the configuration data 430.

Within the M-module 400 of at least the node 300a in embodiments in which the M-module 400 (or another portion of at least the node 300a) incorporates one or both of manually operable controls 420 or a display 480, the UI component 442 may be executable by the processor component 450 to monitor the controls 420 and/or operate the display 480 to provide a user interface by which configuration information may be accepted from manual input. The provision of such a user interface may be in lieu of or in addition to accepting configuration information that is provided remotely, as described. The UI component 442 may operate the controls 420 and/or the display 480 to present configuration options to be selected and/or to accept text entry of configuration choices in a manner that may resemble a webpage that may be remotely provided by the configuration component 441 to personnel operating one of the client devices 100. The UI component 442 may then store indications of configuration information accepted through such a user interface within the memory 460 as at least a portion of the configuration data 430. Thus, configuration information may be directly entered by personnel involved in the operation of at least a portion of the storage cluster system 1000 who may be physically located in the vicinity of at least the node 300a.

As the processor component 450 receives such configuration information and/or subsequent to receiving such configuration information through the configuration component 441 or the UI component 442 (or through another portion of the control routine 440), the processor component 450 may operate the interface 490 to relay at least a portion of the configuration data 430 as a portion of metadata. As will shortly be explained in greater detail, the configuration data 430 (or portions thereof) may be employed as a portion of metadata to be combined with one or more other portions of metadata to generate the metadata 630ab. As depicted, the processor component 450 may additionally operate the interface 490 to transmit at least a portion of the configuration data 430 to the M-module 400 of the node 300y. This may be deemed desirable as a mechanism to convey indications of aspects of operation of at least the node 300y that may also be included in the configuration information accepted by the M-module 400 of the node 300a and stored as part of the configuration data 430. This may obviate the need to separately provide the same or substantially similar configuration information to the M-module 400 of the node 300y as was provided to the M-module 400 of the node 300a. By way of example, it may be desired to apply details of the manner in which client device data 130 is to be stored within the set of storage devices 800ab to the manner in which the same client device data 130 is also stored within the set of storage devices 800yz. In embodiments in which at least a portion of the configuration data 430 is transmitted to the M-module 400 of the node 300y, an indication of a network address or other mechanism to reach the M-module 400 of the node 300y may be included in the configuration information that is stored as part of the configuration data 430.

Turning to FIG. 8B, as depicted, the control routine 540 within the N-module 500 of at least the node 300a may incorporate a testing component 545. Though not specifically shown, the N-modules 500 of the nodes 300b-d and/or 300y-z may each also incorporate a control routine 540 that incorporates the testing component 545. As previously discussed, as a result of the node 300a being active to engage in communications with one or more of the client devices 100, the processor component 550 of the N-module 500 of the node 300a may be active to execute the control routine 540 (as indicated with the N-module 500 of the node 300a being drawn with solid lines). In executing the control routine 540, the processor component 550 of the N-module 500 of at least the node 300a may execute the testing component 545 of the control routine 540. However, if the node 300b takes over for the node 300a, then at least the testing routine 545 within the control routine 540 of the node 300b may begin to be executed, while the testing routine 545 within the control routine 540 of the node 300a may cease to be executed.

Within the N-module 500 of at least the node 300a, the testing component 545 may be executable by the processor component 450 to perform various tests to detect other devices on one or more interconnects with which to communicate, and/or may be executable to assign network addresses by which other devices may be contacted for communication on one or more interconnects. More specifically, the testing component 545 may operate the interface 590 to perform various tests on one or both of the interconnects 199 and 599a to which the N-module 500 of the node 300a is coupled through the interface 590.

As previously discussed, in preparation for performing one or more of such tests, the M-module 400 of the node 300a may provide the configuration data 430 as a portion of metadata specifying various aspects of operation of at least the node 300a to the N-module 500 of the node 300a. The testing component 545 may operate the interface 590 to receive the configuration data 430, which the testing component 545 may store within the memory 560. As previously discussed, the configuration data 430 may specify network addresses and/or ranges of network addresses (e.g., IP addresses) at which various ones of the nodes 300a-d and/or 300y-z may be made addressable on one or more interconnects including one or both of the interconnects 199 and 599a. Alternatively or additionally, the configuration data 430 may include one or more identifiers that identify one or more of the nodes 300b-d and/or 300y-z, and/or that identify one or more of the client devices 100 in a manner that is not based on network addressing (e.g., names assigned to operators of one or more of these devices and/or to the devices, themselves).

In some embodiments, the testing component 545 may employ such specified network addresses and/or ranges of network addresses to control the extent of the testing performed, such as limiting network addresses that are tested in a specific test to a range of network addresses specified in the configuration data 430. In such testing, the testing component 545 may retrieve identifiers from devices that may be found at specified network addresses, and may compare the retrieved identifiers to identifiers specified in the configuration data 430 to determine the network addresses at which one or more of the client devices 100, and/or one or more of the nodes 300b-d and/or 300y-z may be contacted.

Alternatively or additionally, the testing component 545 may broadcast, multicast or otherwise transmit requests for devices having specified identifiers to respond to the testing component 545 to enable discovery of those devices by the testing component 545 and/or to enable being assigned network addresses by the testing component 545. As previously discussed, in embodiments in which IP addressing is used on one or both of the interconnects 199 and 599a, the N-module 500 of at least the node 300a may serve as a DHCP server that assigns IP addresses to at least components of one or more of the nodes 300b-d and/or 300y-z. In so doing, the testing component 545 may determine which ones of the nodes 300b-d and/or 300y-z, and/or what components of one or more of the nodes 300b-d and/or 300y-z are able to be communicated with via the interconnects 199 and/or 599a.

During such testing and/or assignment of network addresses, the testing component 545 may query other devices on one or both of the interconnects 199 and 599a for information concerning their network addresses on other interconnects to which the N-module 500 is not coupled through the interface 590. By way of example, the testing component 545 may request that a D-module 600 of another node (or of the node 300a) provide information concerning network addresses of devices on the inter-cluster interconnect 399, on one or more of the HA interconnects 699ab, 699cd or 699yz, and/or on one or more of the storage interconnects 899ab, 899cd or 899yz (including network addresses of the D-modules 600, themselves). By way of another example, the testing component 545 may request that a N-module 500 of another node provide information concerning network addresses of devices on another intra-cluster interconnect to which the interface 590 of the N-module 500 of the node 300a is not coupled (e.g., the intra-cluster interconnect 599z). Further, the testing components 545 of the N-modules of two or more of the nodes 300a-d and/or 300y-z may exchange information that each has obtained concerning network addresses of devices on various interconnects to which one or more of those N-modules are not coupled.

As the testing component 545 performs such tests and/or assigns network addresses, the testing component 545 may store test data 530 made up of indications of the results of such tests within the memory 560. Further as the testing component 545 performs such tests and/or subsequent to performing such tests, the testing component 545 may operate the interface 590 to transmit at least a portion of the test data 530 to the D-module 600 as a portion of metadata. As will shortly be explained in greater detail, the test data 530 (or a portion thereof) may be employed as a portion of metadata to be combined with one or more other portions of metadata to generate the metadata 630ab.

Turning to FIG. 8C, as depicted, the control routine 640 within the D-modules 600 of each of the nodes 300a-b and 300y-z may incorporate one or more of a generation component 641, a partnering component 645 and an access component 648. In executing the control routine 640, the processor component 650 of each of these D-modules 600 may execute one or more of the components 641, 645 or 648 of the control routine 640. As previously discussed, as a result of the node 300a being active to engage in communications with one or more of the client devices 100 and the node 300b not being active to do so, the processor components 650 of the D-modules 600 of the node 300a and 300b may be active to execute different portions of the control routine 640 (as indicated with the N-module 500 of the node 300a being drawn with solid lines). More specifically, the processor component 650 of the D-module 600 of the active node 300a may execute one or more of the components 641, 645 and 648 (drawn with solid lines), while the processor component 650 of the D-module 600 of the inactive node 300b may refrain from executing one or both of the components 641 and 648 (drawn with dotted lines). However, if the node 300b takes over for the node 300a, then the components 641 and 648 of the control routine 640 within the node 300b may begin to be executed, while the components 641 and 648 of the control routine 640 within the node 300a may cease to be executed.

Within the D-module 600 of at least the active node 300a, the generation component 641 may generate versions of the metadata 630ab from at least the configuration data 430 and/or the test data 530 received from the M-module 400 and/or the N-module 500 of the node 300a as has been described. As has also been described, the metadata 630ab may include both immutable metadata 631ab and mutable metadata 632ab. Again, the information selected for inclusion in the metadata 630ab as mutable metadata 632ab may be deemed likely to change more frequently than the information selected for inclusion within the metadata 630ab as immutable metadata 631ab. Thus, the mutable metadata 632ab may include indications of addresses at which one or more of the nodes 300a-d and/or 300y-z (or at which various components thereof) may be accessible on one or more of the interconnects 199, 399, 599a, 599z, 699ab, 699cd, 699yz, 899ab, 899cd and 899yz. The immutable metadata 631ab may include indications of which of the nodes 300a-d and/or 300y-z are partnered into HA groups (e.g., one of the HA groups 1600ab, 1600cd or 1600yz), or which of the nodes 300a-d and/or 300y-z belong to which of one or more clusters (e.g., one of the clusters 1300a or 1300z). Alternatively or additionally, the immutable metadata 631ab may include indications of what RAID level and/or what file system is used in storing data (e.g., client device data 130) within one or more of the sets of storage devices 800ab, 800cd or 800yz, and/or an order of succession by which each inactive node takes over in a HA group made up of more than two nodes.

Figure 9:
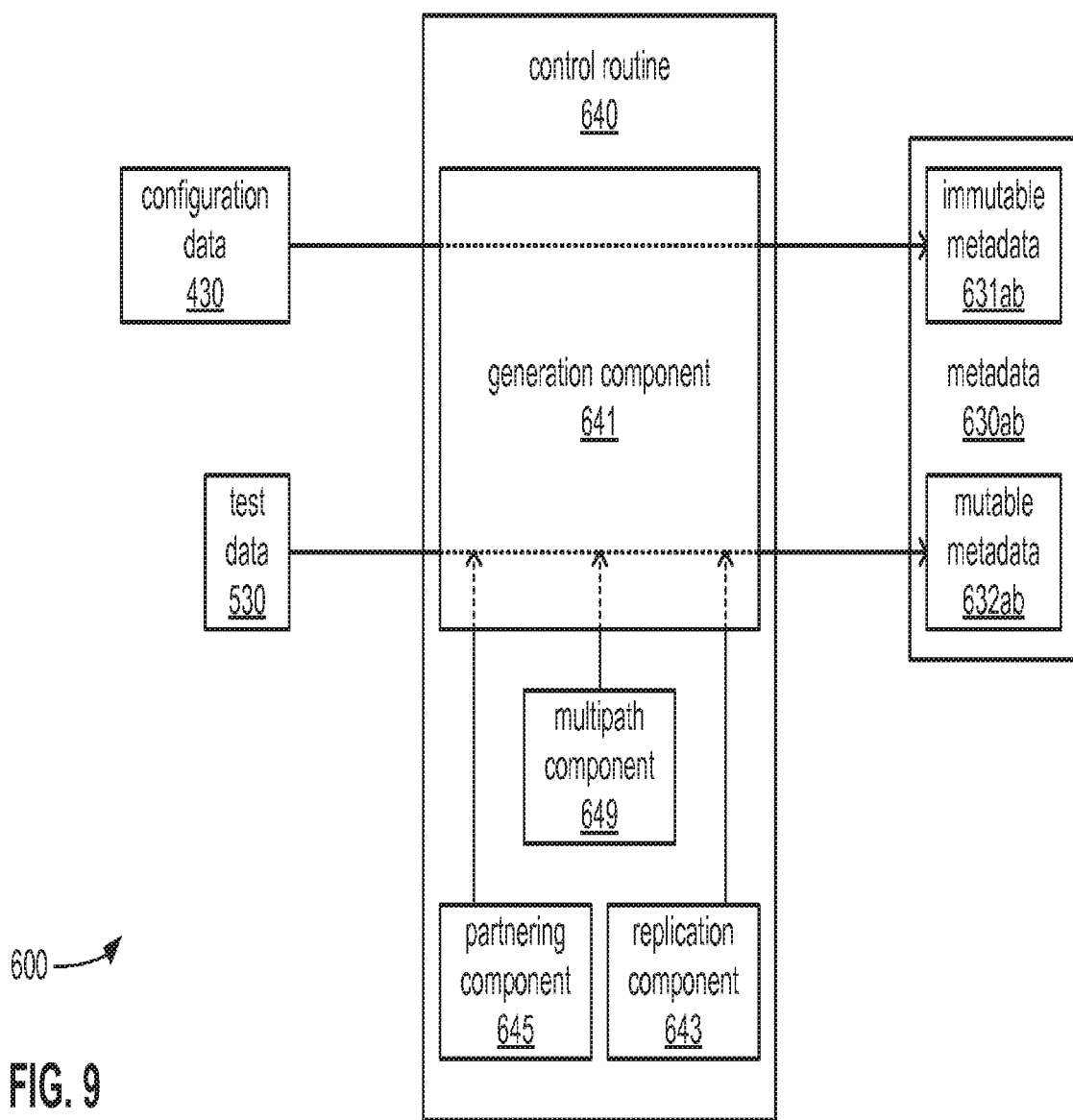
FIG. 9 illustrates an example embodiment of generation of metadata.

As depicted in FIG. 9, in at least some embodiments, there may be a relatively high degree of correlation between what information is included within the configuration data 430 and the test data 530, and what information is included within the immutable metadata 631ab and the mutable metadata 632ab, respectively. As recognizable to those skilled in the art, it may be deemed desirable to isolate persons operating the client devices 100 from aspects of operation of the storage cluster system 1000 that may be apt to change more frequently than others. For example, and as will be explained in greater detail, which nodes are active at any given time to perform data access commands and/or replicas of data access commands may change in response to occurrences of errors, changes made as part of effecting upgrades and/or maintenance, events such as power failures or failures in access to the Internet, etc. Also, such changes may bring about changes in network addresses at which nodes or components of nodes may be reached on one or more interconnects. Further, such changes in which nodes are active at any given time may be made automatically (instead of requiring the intervention of personnel) so as to enable such changes to be made quickly to minimize interruptions in the provision of storage services. It is this relatively dynamic nature of changes in such aspects of operation that may result in it being deemed more appropriate for testing by the testing component 545 to be used to discover such aspects of operation, and for the results being stored as part of the test data 530, which may serve as a portion of mutable metadata from which the mutable metadata 632ab may be generated.

In contrast, and as recognizable to those skilled in the art, aspects of operation of the storage cluster system 1000 such as how many HA groups are used, how many nodes and/or which nodes are to be included in each HA group, how client device data 130 is to be organized within a set of storage devices, etc. may be less apt to changing frequently. Also, changes in such aspects of operation may tend to be associated more with decisions made by personnel, (e.g., budgetary or service contract decisions) that tend to change less frequently. Thus, it may be deemed more appropriate for such relatively infrequently changing aspects to be made selectable by persons operating one or more of the client devices 100 and/or by persons entrusted with direct oversight of one or more of the nodes of the storage cluster system 1000. Thus, it may be deemed more appropriate for such relatively infrequently changing aspects to be specified within the configuration data 430, which may serve as a portion of immutable data from which the immutable data 631*ab* may be generated.

Although the portions of metadata received and combined by the generation component 641 may tend to be treated relatively separately, there may be some degree of interaction therebetween in some embodiments. By way of example, an aspect of operation of the cluster storage system 1000 may be specified in the configuration data 430 and may be regarded as immutable data, but may also be subject to being overridden by a contradictory indication concerning that same aspect in the test data 530 and may be regarded as mutable data. By way of example, a network address or identifier for a node or a component of a node may be specified in the configuration data 430, but may be discovered to have changed by testing performed by the testing component 545 such that the test data 530 contains a contrary indication of a network address or identifier. Given that the results of such testing reflect a situation discovered to exist versus a specification in the configuration 430 of what is supposed to be the situation, the indication in the test data 530 may be accepted in place of the specification in the configuration data 430 that the indication contradicts. Stated differently, a specification of an aspect of operation in the configuration data 430 may be treated as a default that can be subsequently overridden.

Returning to FIG. 8C, within the D-module 600 of at least the active node 300*a*, the access component 648 may operate the storage controller 665 to perform various data access operations on client device data 130 stored within the set of storage devices 800*ab*. Within the active node 300*a*, which may be active to engage in communications with one or more of the client devices 100, the access component 648 may be active to execute data access commands translated by the N-module 500 of the node 300*a* from storage service requests received from the one or more client devices 100. However, within the inactive node 300*b*, the access component 648 may not be active. Again, the access component 648 within the node 300*b* may become active and the access component 648 within the node 300*a* may become inactive if the node 300*b* takes over for node 300*a*.

In addition to performing data access commands, the access component 648 of the D-module 600 of the node 300*a* may also store the metadata 630*ab* generated by the generation component 641 (as well as updates thereto) within the set of storage devices 800*ab*. As previously discussed, the metadata 630*ab* (and updates thereto) may be stored within the set of storage devices 800*ab* in a manner that shares a portion of a storage space within the set of storage devices 800*ab* within which at least a portion of client device data 130 may also be stored. As has been previously explained, storage of the metadata 630*ab* at least within a set of storage devices within which at client device data 130 is also stored and/or within a portion of a set of storage devices within which at least a portion of client device data 130 is also stored enables a copy of the metadata 630*ab* to be kept together with client device data 130 (rather than becoming separated therefrom) and thereby retrieved alongside client device data 130. This enables the metadata 630*ab* to accompany the client device data 130 as such a set of storage devices may be caused to be accessible to a node to which control of such a set of storage devices may be transferred as part of a takeover from another node that may have malfunctioned.

Thus, with the metadata 630*ab* stored within the set of storage devices 800*ab*, a D-module 600 of whichever one of the nodes 300*a* or 300*b* that is given control over the set of storage devices 800*ab* is able to independently retrieve the metadata 630*ab* for use in commencing communications with other devices following being powered up and/or reset such that a copy of the metadata 630*ab* that may have previously stored within the memory 660 of that D-module 600 may have been lost. More precisely, following a powering up and/or a reset of at least the D-module of whichever one of the nodes 300*a* or 300*b* is active, the access component 648 within that active node may operate the storage controller 665 to retrieve the metadata 630*ab* from the set of storage devices 800*ab* and store a copy within the memory 660. As has been discussed, following a powering up and/or reset of the entirety of one of the nodes 300*a-d* and/or 300*y-z*, it may be that a D-module 600 is able to boot more quickly than one or more both of the M-module 400 and the N-module 500 such that reliance on one or both of the M-module 400 and the N-module 500 to provide portions of metadata from which to regenerate the metadata 630*ab* may take more time than is deemed desirable. Further, the processes employed by each of the M-module 400 and the N-module 500 to obtain those portions of metadata (e.g., the various tests performed by the N-module 500) may add a further delay. Still further, it may be that one or both of the M-module 400 and the N-module 500 are unable to boot as a result of a failure or other condition such that reliance on one or both of the M-module 400 and the N-module 500 to provide portions of metadata from which to regenerate the metadata 630*ab* may result in an inability of the D-module 600 to boot, at all. Thus, an independent ability to retrieve the metadata 630*ab* without reliance on either of the M-module 400 or the N-module 500 may enable the D-module 600 to boot more quickly and/or to boot at all.

Within the D-module 600 of at least the partnered nodes 300*a-b*, the partnering component 645 within the D-module 600 of each may cooperate with its counterpart within the D-module 600 of the other to monitor the status of the partner one of the nodes 300*a-b* to which the other belongs and to effect a takeover of at least an active partner in response to a failure. More specifically, while the active node 300*a* engages in communications with client devices 100 and with the active node 300*y*, the partnering components 645 within the active node 300*a* and the inactive node 300*b* cooperate to enable at least the status of the node 300*a* to be recurringly monitored for an indication of failure within the node 300*a* that may trigger a takeover by the node 300*b*. Similarly, and though not specifically depicted, while the active node 300*y* engages in communications with the active node 300*a*, the partnering components 645 within the active node 300*y* and the inactive node 300*z* cooperate to enable at least the status of the node 300*y* to be recurringly monitored for an indication of failure within the node 300*y* that may trigger a takeover by the node 300*z*.

Such monitoring between the partnering components 645 of the D-modules 600 of the nodes 300*a* and 300*b* may entail operating the interfaces 690 of each to exchange any of a variety of signals indicative of status of each of the nodes 300*a-b* to the other via the HA interconnect 699*ab*, as has been discussed. Again, the signals exchanged may be relatively simple so-called "heartbeat" signals that each of the partnering components 645 expects to receive from the other within on a recurring period of time such that the lack of receipt of such a signal by the partner component 645 of one of the nodes 300*a-b* within one of the instances of that recurring period of time may be taken as an indication of failure of the other of the nodes 300*a-b*. Alternatively or additionally, the signals exchanged may be messages that explicitly indicate the status of one or more of the components of whichever one of the nodes 300a-b transmits them, and a failure within one of the nodes 300a-b may be expressly indicated in such a message received by the other of the nodes 300a-b.

As yet another alternative, the signals exchanged may include at least a portion of metadata, such as indications of network addresses at which each of the D-modules 600 of the nodes of a HA group are accessible on an intra-cluster interconnect (e.g., the intra-cluster interconnect 599a or 599z), on a HA interconnect (e.g., the HA interconnect 699ab or 699yz) and/or on the inter-cluster interconnect 399. The partnering component 645 within at least an active node of a HA group may convey such received indications and/or updates to the generation component 641 within that node for use in generating and/or updating the metadata 630ab. Such an exchange of indications of network addresses of at least D-modules 600 may be in addition to or in lieu of the retrieval of network addresses as part of the tests performed by the testing component 545 within the N-module 500. Thus, as depicted in FIG. 9, such indications of such network addresses received by the partnering component 645 within the D-module 600 of the node 300a may become an input that the generation component 641 may employ in generating and/or updating at least the mutable metadata 632ab.

Beyond monitoring the status of another node and/or exchanging some amount of network address information or other information from which metadata may be derived, the partnering components 645 within the D-modules 600 of the nodes 300a and 300b may cooperate to distribute the metadata 630ab (or updates thereto) between the nodes 300a and 300b. More specifically, the partnering components 645 within the nodes 300a and 300b may cooperate to convey a copy of the metadata 630ab from the active node 300a to the inactive node 300b following generation by the generating component 641 within the D-module 600 of the active node 300a. As previously discussed, such a distribution of the metadata 630ab may be performed through use of the sync caches 639a and 639b maintained by at least the partnering components 645 within the D-modules 600 of the nodes 300a and 300b, respectively. As has also been previously discussed, such a direct distribution of the metadata 630ab from the active node 300a to the inactive node 300b may be performed to ensure that the inactive node 300b is more speedily provided with an up to date copy of the metadata 630ab that is maintained within the memory 660 within the node 300b for immediate use if the node 300b is caused to take over for the node 300a as a result of a failure occurring within the node 300a.

Turning to FIG. 8D, again, the control routine 640 within the D-modules 600 of each of the nodes 300a-b and 300y-z may incorporate one or more of a generation component 641, a partnering component 645 and an access component 648. Further, as was the case in FIG. 8C, the processor component 650 of each of these D-modules 600 may execute different one(s) of the components 641, 645 or 648 of the control routine 640 as a result of the node 300a being active to engage in communications with one or more of the client devices 100 and the node 300b not being active to do so.

Within the D-module 600 of the active node 300a following a powering up or a resetting of at least the D-module 600 of the active node 300a, a copy of the metadata 630ab that may have been maintained with the memory 660 may have been lost as a result of the lack of power preceding the powering up or as a result of the resetting of at least the D-module 600. In response to the lack of a version of the metadata 630ab stored within the memory 660, the access component 648 may retrieve a copy of the metadata 630ab from the set of storage devices 800ab and may store that retrieved copy of the metadata 630ab within the memory 660, as previously discussed. With a version of the metadata 630ab now stored within the memory 660, one or more components of the D-module 600 may attempt to use the information contained within the metadata 630ab to commence communications with one or more of the nodes 300b-d and/or 300y-z and/or to commence communications with one or more of the client devices 100. Again, use of the copy of the metadata 630ab retrieved from the set of storage devices 800ab, instead of regenerating the metadata 630ab from portions of metadata from the M-module 400 and/or the N-module 500, may be deemed desirable since retrieving the metadata 630ab from the set of storage devices 800ab may require less time waiting for one or both of the M-module 400 and the N-module 500 to finish booting and to perform their aforedescribed functions (e.g., performing tests on one or more interconnects) to obtain portions of metadata to provide to the D-module 600.

If an attempt by one or more components of the D-module 600 to employ information in the metadata 630ab to communicate with other components of the node 300a, with components of others of the nodes 300b-d and/or 300y-z, and/or with one or more of the client devices 100 is unsuccessful, then such components may signal the generation component 641 to provide a new version of the metadata 630ab. In response, the generation component 641 may operate the interface 690 to transmit a request to the M-module 400 and/or the N-module 500 via the intra-cluster interconnect 599a for metadata portions that include updated versions of the information included in the mutable metadata 632ab. Depending on whether the M-module 400 and/or the N-module 500 are also rebooting, there may be a delay in responding to this request.

In response to receiving the request, the components of the M-module 400 and/or of the N-module 500 may be caused by execution of the control routines 440 and/or 540 to operate the interfaces 490 and/or 590, respectively, to transmit such updated metadata portions to the D-module 600 via the intra-cluster interconnect 599a. As earlier discussed, given what may be a high degree of correlation between the mutable metadata 632ab and what may be the mutable nature of much of the information conveyed in the test data 530, it may be the testing component 545 of the N-module 500 that provides at least the majority of the mutable metadata requested by the generation component 641. Regardless of whether it is one or both of the M-module 400 or the N-module 500 that provides the requested mutable metadata, the generation component 641 uses the newly provided mutable metadata to regenerate at least the mutable metadata 632ab making up the metadata 630ab, if not the entirety of the metadata 630ab.

The same one or more components may then again attempt to employ the metadata 630ab, with the now updated mutable metadata 632ab, to communicate with other components of the node 300a, with components of others of the nodes 300b-d and/or 300y-z, and/or with one or more of the client devices 100. In some embodiments, if this new attempt to communicate using this updated version of the metadata 630ab is also unsuccessful, then the same one or more components may again signal the generation component 641 to provide a new version of the metadata 630ab. In response to this renewed request for an updated version of the metadata 630ab, the generation component 641 may operate the interface 690 to transmit a request to the M-module 400 and/or the N-module 500 via the intra-cluster interconnect 599a for metadata portions that include updated versions of the information included in the immutable metadata 631ab.

In response to receiving this next request, the components of the M-module 400 and/or of the N-module 500 may be caused by execution of the control routines 440 and/or 540 to operate the interfaces 490 and/or 590, respectively, to transmit such updated metadata portions to the D-module 600 via the intra-cluster interconnect 599a. As earlier discussed, given what may be a high degree of correlation between the immutable metadata 631ab and what may be the immutable nature of much of the information conveyed in the configuration data 430, it may be the configuration component 441 and the UI component 442 of the M-module 400 that provides at least the majority of the immutable metadata requested by the generation component 641. Regardless of whether it is one or both of the M-module 400 or the N-module 500 that provides the requested immutable metadata, the generation component 641 uses the newly provided immutable metadata to regenerate at least the immutable metadata 631ab making up the metadata 630ab, if not the entirety of the metadata 630ab. The same one or more components may then yet again attempt to employ the metadata 630ab, with the now updated immutable metadata 631ab, to communicate with other components of the node 300a, with components of others of the nodes 300b-d and/or 300y-z, and/or with one or more of the client devices 100.

Figure 10:
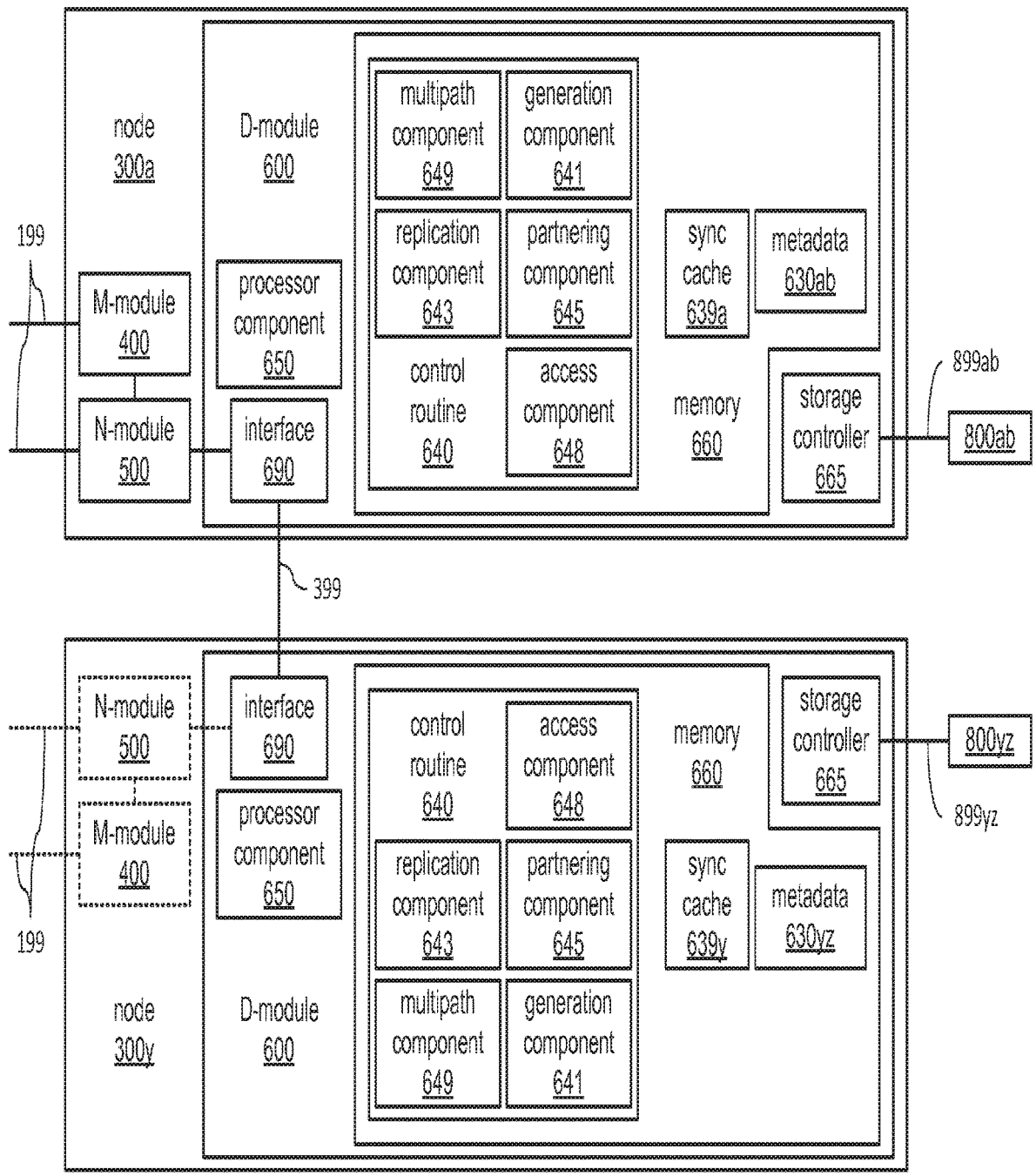
FIG. 10 illustrates an example embodiment of updating metadata in response to failures in the partially parallel performance of data access commands by active nodes.

FIG. 10 illustrates an example embodiment of the nodes 300a and 300y of the storage cluster system 1000 in greater detail. More specifically, FIG. 10 depicts components of the D-modules 600 of the nodes 300a and 300y in greater detail, along with aspects of updating the metadata 630ab based on results of employing communications sessions through the inter-cluster interconnect 399 and performing data access commands in parallel. It should noted that nodes 300a and 300y are each depicted as the active nodes within their respective HA groups 1600ab and 1600yz, with the node 300a in communication with one or more of the client devices 100 to perform data access commands and the node 300y in communication with the node 300a to perform replica data access commands. As a result, it may be the M-module 400 and the N-module 500 of the node 300a that engage in communications with one or more of the client devices 100 via the client interconnect 199, and not the M-module 400 or the N-module 500 of the node 300y. This is depicted in FIG. 10 by the M-module 400 and the N-module 500 of the node 300a being drawn with solid lines, while the M-module 400 and the N-module 500 of the node 300y are drawn with dotted lines.

The control routine 640 may include a replication component 643 that may be executable by the processor component 650 within one active node to both control performance of and replicate data access commands received by a D-module 600 of from a N-module 500, and to transmit those replica data access commands to a D-module 600 of another active node of a different HA group and/or different cluster. Within the other active node, the replication component 643 may be executable by the processor component 650 to receive and control performance of the replica data access commands to cause such performance to occur at least partly in parallel with the performance of the data access commands. Thus, the replication components 643 of D-modules 600 of two active nodes, one of which may be in communication with one of the client devices 100, cooperate via the inter-cluster interconnect 399 to coordinate replication and at least partial parallel performance of data access commands between those two D-modules 600.

Again, as depicted in FIG. 10, it is the node 300a that is active within one HA group to engage in communications with client devices 100 such that the D-module 600 of the node 300a receives data access commands therefrom to perform, while it is the D-module 600 of node 300y that is active within another HA group to receive the replica data access commands to perform. Thus, it is the replication component 643 of the D-module 600 of the node 300a that replicates data access commands received from the N-module 500 of the node 300a and transmits the replica data access commands to the D-module 600 of the node 300y via the inter-cluster interconnect 399, while also relaying those data access commands to the access component 648 within the D-module 600 of the node 300a to be performed. In contrast, the replication component 643 of the D-module 600 of the node 300y does not perform such replication, and instead, relays the replica data access commands received from the D-module 600 of the node 300a to the access component 648 within the D-module 600 of the node 300y to be performed at least partly in parallel with the performance of the data access commands by the access component 648 within the node 300a.

The access component 648 within each of the nodes 300a-d and 300y-z may perform various tests of corresponding ones of the sets of storage devices 800ab, 800cd and 800yz and/or may monitor the results of the performance of data access commands (or replicas thereof) to determine whether an error condition precluding the performance of subsequent data access commands (or replicas thereof) exists. Further, in response to receiving subsequent data access commands (or replicas thereof) to perform from a corresponding one of the replication components 643, each of the data access components 648 may provide that corresponding one of the replication components 643 with an indication of successful acceptance of the subsequent data access commands (or replicas thereof) or an indication of an error. Thus, after relaying a data access command to the access component 648 of the D-module 600 of the node 300a and after transmitting a replica of that data access command to the D-module 600 of the node 300y via the inter-cluster interconnect 399, the replication component 643 of the node 300a may await receipt of indications of success and/or errors from each. Further, after relaying the replica data access command to the access component 648 of the D-module 600 of the node 300y, the replication component 643 of the D-module 600 of the node 300y may await receipt of an indication of success and/or errors therefrom.

Each data access component 648 may condition the provision of an indication of successful acceptance of a data access command (or replica thereof) on whether commencement of performance of that data access command (or replica thereof) proves to be possible without errors. Thus, the replication component 643 of the D-module 600 of the node 300y may receive an indication of successful acceptance of the replica data access command from the access component 648 of the D-module 600 of the node 300y, and may take such an indication as an assurance that the replica data access command will be successfully performed. The replication component 643 of the D-module 600 of the node 300y may then relay the indication of successful acceptance of the replica data access command back to the replication component 643 of the D-module 600 of the node 300a via the inter-cluster interconnect 399. In turn, the replication component 643 of the D-module 600 of the node 300a may receive both the indication of successful acceptance of the replica data access command from the node 300y and an indication of successful acceptance of the data access command from the access component 648 of the D-module 600 of the node 300a, and may take the pair of such indications as an assurance that the data access command will be successfully performed at least partly in parallel within both of the nodes 300a and 300y.

In replicating data access commands, the replication component 643 of the D-module 600 of the node 300a may store copies and/or indications of what the replica data access commands are as part of replication data 633a within the synchronization cache 639a, and may do so along with pieces of client device data 130 that may accompany the replica data access commands. Correspondingly, the replication component 643 of the D-module 600 of the node 300y may store copies and/or indications of the replica data access commands received from the node 300a via the inter-cluster interconnect 399 as part of replication data 633y within the synchronization cache 639y, and may also do so along with pieces of client device data 130 that may accompany the replica data access commands. Further, the replication component 643 of the D-module 600 of the node 300y may buffer indications of the status of the performance of the replica data access commands by the access component 648 of the D-module 600 of the node 300y as part of the replication data 633y before transmitting those indications to the node 300a via the inter-cluster interconnect 399. Correspondingly, the replication component 643 of the D-module 600 of the node 300a may maintain indications of the status of the performance of the replica data access commands by the access component 648 of the D-module 600 of the node 300y as part of the replication data 633a.

Unfortunately, errors may occur in such partially parallel performances of data access commands. Such errors may include unavailability of an active node to which replica data access commands are to be transmitted, failure of a component within an active node, and/or unavailability of access to a set of storage devices coupled to a node.

In one example of an error, the replication component 643 of the D-module 600 of the node 300a may attempt to relay the data access command to the access component 648 of the node 300a to be performed through the storage controller 665 on the set of storage devices 800ab, and may further attempt to both replicate the data access command and transmit the resulting replica data access command to the node 300y. However, the access component 648 of the node 300a may provide the replication component 648 of the node 300a with an indication of an error preventing the performance of the data access command with the set of storage devices 800ab such that the access component 648 is not yet able to accept the data access command. The replication component 643 of the node 300a may analyze the indication and determine that the error is a short-term error that will resolve relatively soon. Such an indication of a short-term error may be an indication that the storage controller 665 of the node 300a is already busy performing another operation involving the set of storage devices 800ab. Stated differently, such a short-term error may arise from a condition that the access component 648 and/or the storage controller 665 are able to address without intervention on the part of maintenance personnel and/or are able to address within a relatively short period of time (e.g., within a fraction of a second and/or within less than a minute). In response to determining that the error is such a short-term error, the replication component 643 may proceed with transmitting the replica data access command to the node 300y, and may await a predetermined retry time period before again attempting to relay the data access command to the access component 648 in a retry of the data access command within the node 300a. If the attempt at retrying the data access command within the node 300a is successful such that the access component 648 responds with an indication of successful acceptance of data access command to the replication component 643.

However, if one or more attempts at retrying the data access command is unsuccessful, or if the replication component 643 of the D-module 600 of the node 300a determines that the error is a long-term error (e.g., an error requiring the intervention of maintenance personnel to address such that substantially more than a short period of time may elapse before the error is corrected), then the replication component 643 may signal the partnering component 645 with an indication that the inactive node 300b is to take over for the node 300a. In other words, the node 300b may need to take over the functions performed by the node 300a. In some embodiments, the replication component 648 of the node 300a may provide an indication of such a takeover to the generation component 641 of the node 300a to cause the generation component 641 to update the metadata 630ab (e.g., the mutable metadata 632ab) to indicate that the node 300b is now the active node of the HA group 1600ab to engage in communications with one or more of the client devices 100 and to generate and transmit replicas of data access commands to the node 300y. Further, the partnering component 645 of the node 300a may cooperate with the partnering component 645 of the node 300b to convey such an updated metadata 630ab to the node 300b via the HA interconnect 699ab.

In another example of an error, the access component 648 of the D-module 600 of the node 300a may indicate successful acceptance of the data access command to the replication component 643 such that the replication component 643 proceeds with transmitting the replica of the data access command to the node 300y via the inter-cluster interconnect 399. However, the replication component 643 of the D-module 600 of the node 300a may receive a response from the node 300y that includes an indication of an error within the node 300y preventing performance of the replica of the data access command with the set of storage devices 800yz. The replication component 643 of the node 300a may analyze the indication and determine that the error is a short-term error that will be resolved without assistance from maintenance personnel and/or may be resolved within a relatively short period of time (e.g., a fraction of a second and/or less than a minute). Not unlike the above-described short-term error involving the node 300a and the set of storage devices 800ab, such a short-term error involving the node 300y and the set of storage devices 800yz may arise from the set of storage devices 800yz already being busy performing another operation. In response to determining that the error is a short-term error, the replication component 643 of the node 300a may continue to allow the access component 648 of the D-module 600 of the node 300a to proceed with performing the data access command, and may await the predetermined retry time period before again attempting to transmit the replica data access command to the node 300y in a retry of the replica data access command with the node 300y.

However, if one or more attempts at retrying the replica data access command with the node 300y is unsuccessful, or if the replication component 643 of the D-module 600 of the node 300a determines that the error is a long-term error (e.g., an error requiring the intervention of maintenance personnel to address such that substantially more than a short period of time may elapse before the error is corrected), then the replication component 643 of the node 300*a* may retry transmission of the replica data access command to the node 300*z*. In essence, the replication component 643 of the D-module 600 of the node 300*a* may retry the replica data access command with the node 300*z*, instead of retrying it with the node 300*y*. Such a retrial of to the node 300*z*, instead of the node 300*y*, may be part of and/or may trigger a takeover by the node 300*z* of the functions performed by the node 300*y*, and the replication component 648 of the node 300*a* may provide an indication of such a takeover to the generation component 641 to cause the generation component 641 to update the metadata 630*ab* (e.g., the mutable metadata 632*ab*) to indicate that the node 300*z* is now the active node of the HA group 1600*yz* with which the node 300*a* communicates to exchange replicas of data access commands. Such an indication in the metadata 630*ab* may include an address by which the D-module 600 of the node 300*z* is accessible via the inter-cluster interconnect 399.

As these examples illustrate, and as depicted in FIG. 9, such indications from the replication component 643 of a change in what node is active to communicate with the client devices 100, is active to perform data access commands and/or is active to perform replicas of data access commands may become an input that the generation component 641. As depicted, such input may be deemed to be mutable information such that the generation component 641 may employ such information in generating and/or updating at least the mutable metadata 632*ab* within the metadata 630*ab*.

Returning to FIG. 10, the control routine 640 within D-modules 600 of an active node of each of two different HA groups and/or of two different clusters may include a multipath component 649 that may be executable by a processor component 650 in each of those two active nodes to cooperate to form and maintain a mesh of communications sessions among those two nodes and their partners to better support a takeover of one of those two active nodes in response to a failure. As previously discussed, the inter-cluster interconnect 399 may be implemented as a network coupling D-modules of multiple ones of the nodes 300*a-d* and/or 300*y-z* to enable active ones of those D-modules to exchange replica data access commands and/or responses thereto. As also previously discussed, a failure occurring within a node may cause a change in which node of a HA group is the active node that engages in communications and/or performs data access commands (or replicas thereof). As a result, which node of one HA group generates and transmits replica data access commands may change and/or which node of another HA group that receives and performs the replica data access commands may change.

In support of exchanges of replica data access commands between the active nodes 300*a* and 300*y*, the multipath components 649 of the D-modules 600 of each of the nodes 300*a* and 300*y* may cooperate to form an active communications session therebetween through the inter-cluster interconnect 399. In so doing, the multipath component 649 of the node 300*a* may retrieve an indication from the metadata 630*ab* of the node 300*y* currently being the active node to which the node 300*a* is to transmit replica data access commands generated by the replication component 643 of the node 300*a* via the inter-cluster interconnect 399. Correspondingly, the multipath component 649 of the node 300*y* may retrieve an indication from metadata 630*yz* separately generated within the node 300*y* of the node 300*a* currently being the active node from which the replication component 643 of the node 300*y* is to receive those replica access commands via the inter-cluster interconnect 399. In some embodiments, such indications may include addresses at which the D-modules 600 of each of the nodes 300*a* and 300*y* are accessible on the inter-cluster interconnect 399. The multipath component 649 of at least one of the nodes 300*a* and 300*y* may then employ such retrieved information concerning the other to exchange messages with the D-module 600 of the other through the inter-cluster interconnect 399 to request and accept formation of an active communications session therebetween.

With the active communications session thereby formed between the D-modules 600 of the nodes 300*a* and 300*y* through the inter-cluster interconnect 399, the multipath components 649 of each of those D-modules 600 may then exchange indications of addresses of D-modules 600 of other nodes that are partners of the nodes 300*a* and 300*y* through that active communications session. Presuming the partners of nodes 300*a* and 300*y* are the nodes 300*b* and 300*z*, respectively, then the multipath component 649 of the node 300*a* transmits an indication of the address of the D-module 600 of the node 300*b* to the node 300*y*, and the multipath component 649 of the node 300*y* transmits an indication of the address of the D-module 600 of the node 300*z* to the node 300*a*. Once supplied with the address of the D-module 600 of the node 300*z* on the inter-cluster interconnect 399, the multipath component 649 of the node 300*a* may form an inactive communications session between the D-modules 600 of the nodes 300*a* and 300*z* through the inter-cluster interconnect 399. Correspondingly, once supplied with the address of the D-module 600 of the node 300*b* on the inter-cluster interconnect 399, the multipath component 649 of the node 300*y* may form an inactive communications session between the D-modules 600 of the nodes 300*y* and 300*b* through the inter-cluster interconnect 399. The formation of such inactive communications sessions may or may not entail an exchange of messages through the inter-cluster interconnect 399 to request and accept their formation.

With these active and inactive communications sessions formed through the inter-cluster interconnect 399, the multipath components 649 of at least the nodes 300*a* and 300*y* may continue to cooperate to at least monitor the status of each of these communications sessions. Such monitoring may entail exchanges of test signals through at least the active communications session formed between the nodes 300*a* and 300*y*. Such test signals may be exchanged therebetween either in lieu of in addition to exchanges of replica data access commands and responses thereto. The multipath components 649 of the nodes 300*a* and 300*y* may or may not also transmit test signals through the inactive communications sessions between the nodes 300*a* and 300*z*, and between the nodes 300*y* and 300*b* to check the status of those inactive communications sessions. Where at least the active communications session between the nodes 300*a* and 300*y* is lost due to a change in the address at which one of the nodes 300*a* or 300*y* is accessible on the inter-cluster interconnect 399, the multipath component 649 of the other of the nodes 300*a* and 300*y* may provide an indication of such a change to the generation component 641 of that same other one of the nodes 300*a* and 300*y* to cause updating of metadata. More specifically, such a change in the address at which the D-module 600 of the node 300*a* is accessible on the inter-cluster interconnect 399 may cause the multipath component 649 of the node 300*y* to signal the generation component 641 of the node 300*y* to update the metadata 630*yz* with an indication of the new network address of the node 300a on the inter-cluster interconnect 399. Correspondingly, such a change in the address at which the D-module 600 of the node 300y is accessible on the inter-cluster interconnect 399 may cause the multipath component 649 of the node 300a to signal the generation component 641 of the node 300a to update the metadata 630ab with an indication of the new network address of the node 300y on the inter-cluster interconnect 399.

The multipath component 649 of the node 300a and/or 300y (or of the partner node 300b and/or 300z) may change the state of one or more of the communications sessions formed among the nodes 300a-b and 300y-z through the inter-cluster interconnect 399 in response to a failure in one the active nodes 300a or 300y. By way of example, where one of the active nodes 300a or 300y is taken over by one of the partner nodes 300b or 300z, respectively, at least the multipath component 649 of the other of the active nodes 300a and 300y may respond by changing the state of the active communications session between the nodes 300a and 300y to an inactive state. Further, where the node 300a is taken over by the node 300b, the multipath component 649 of the node 300y and/or of the node 300b may act to make the communications session between the nodes 300b and 300y active. Correspondingly, where the node 300y is taken over by the node 300z, the multipath component 649 of the node 300a and/or of the node 300z may act to make the communications session between the nodes 300a and 300z active. The change of an inactive communications session into an active communications session may entail an exchange of messages between the nodes coupled through that inactive communications session to agree to make that inactive communications session active. Where an active node is taken over by an inactive partner of that active node, metadata associated with those two nodes may be updated to indicate the change in which of those two nodes is now the active node.

By way of another example, where the node 300a initially transmits a replica data access command to the node 300y to be performed, but then retries the replica data access command with the node 300z as a result of a failure in the node 300y, the multipath component 649 of the node 300a may change the state of the communications session between the nodes 300a and 300y from active to inactive, and may change the state of the communications session between the nodes 300a and 300z from inactive to active. Such a change in which of the nodes 300y-z is the node to which the node 300a transmits replica data access commands may either trigger or reflect a takeover of the node 300y by the node 300z, and as previously discussed, the metadata 630ab and/or the metadata 630yz may be updated to indicate that the node 300z is now the active node to which replica data access commands are to be transmitted to be performed.

Figure 11A:
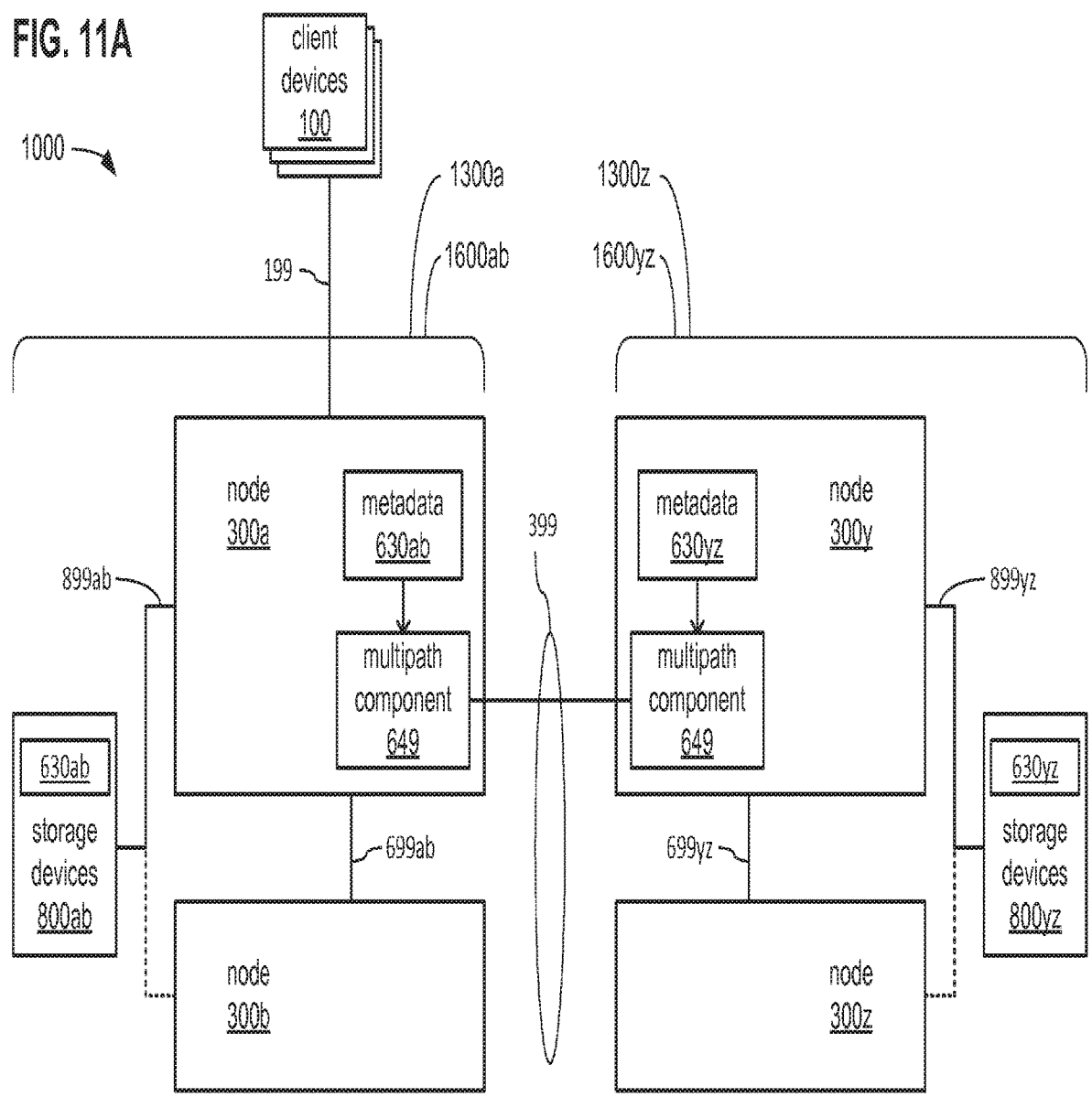
FIGS. 11A, 11B, 11C and 11D, together, illustrate an example embodiment of forming and operating a mesh of communications sessions.
Figure 11B:
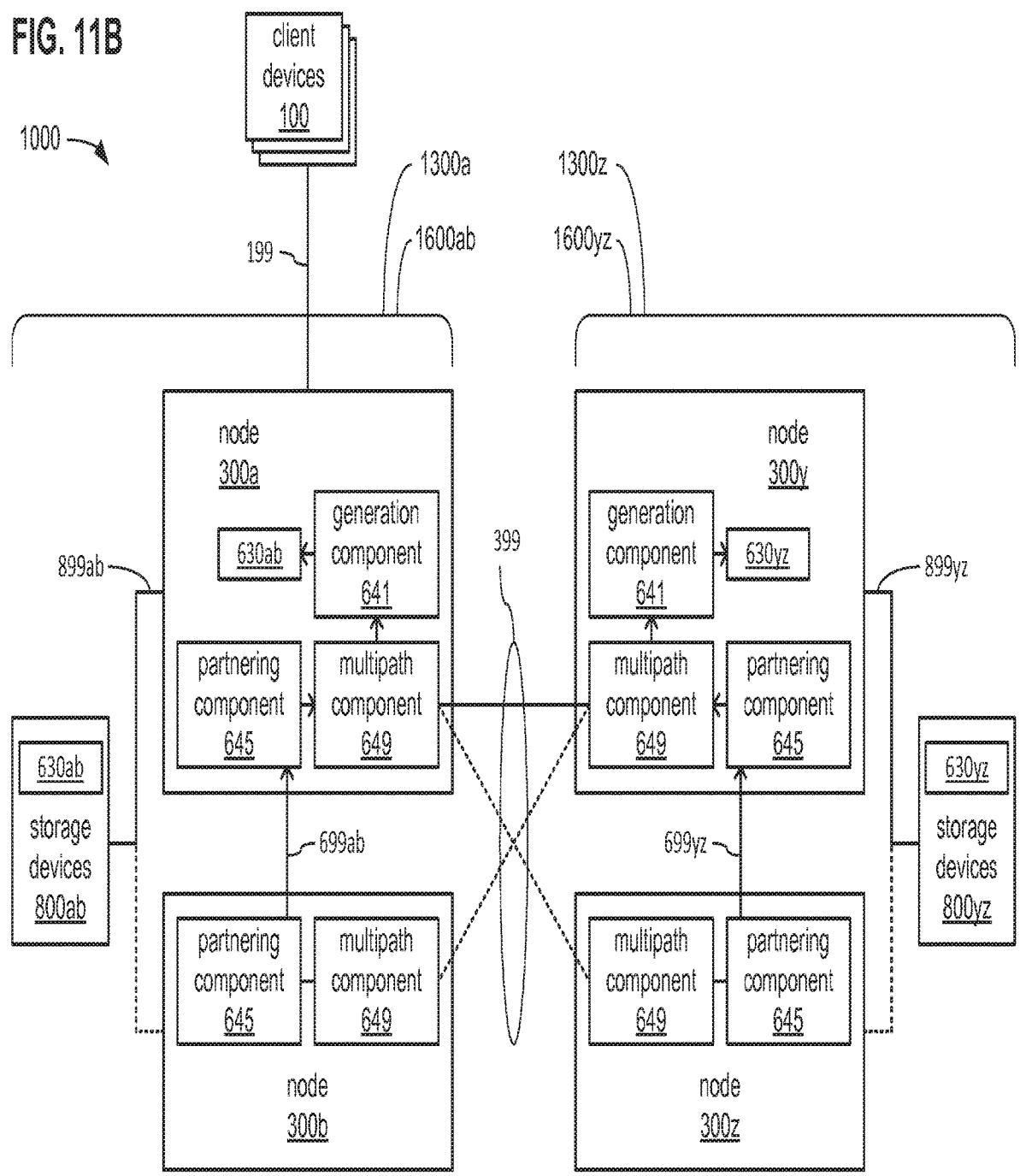
Figure 11C:
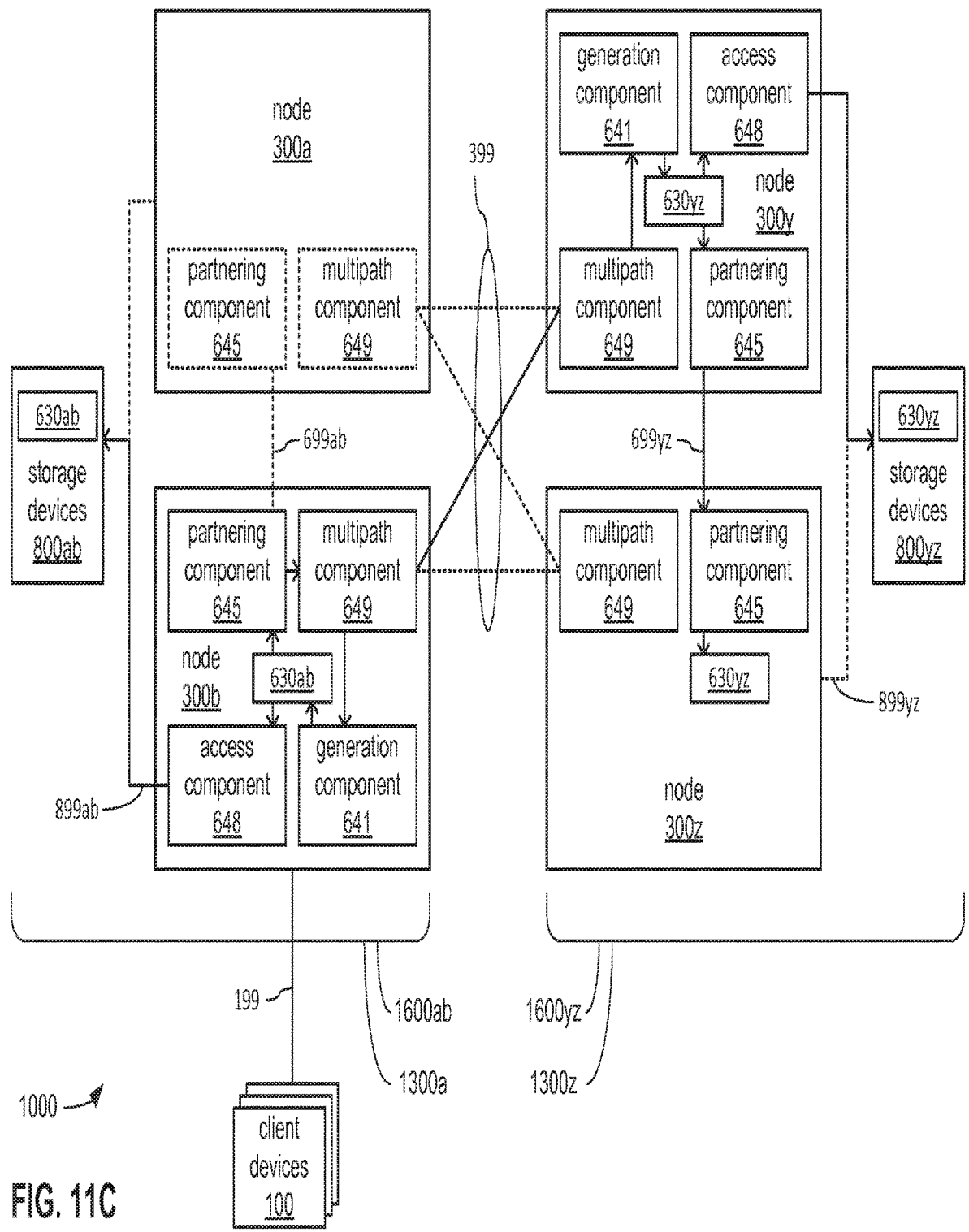
Figure 11D:
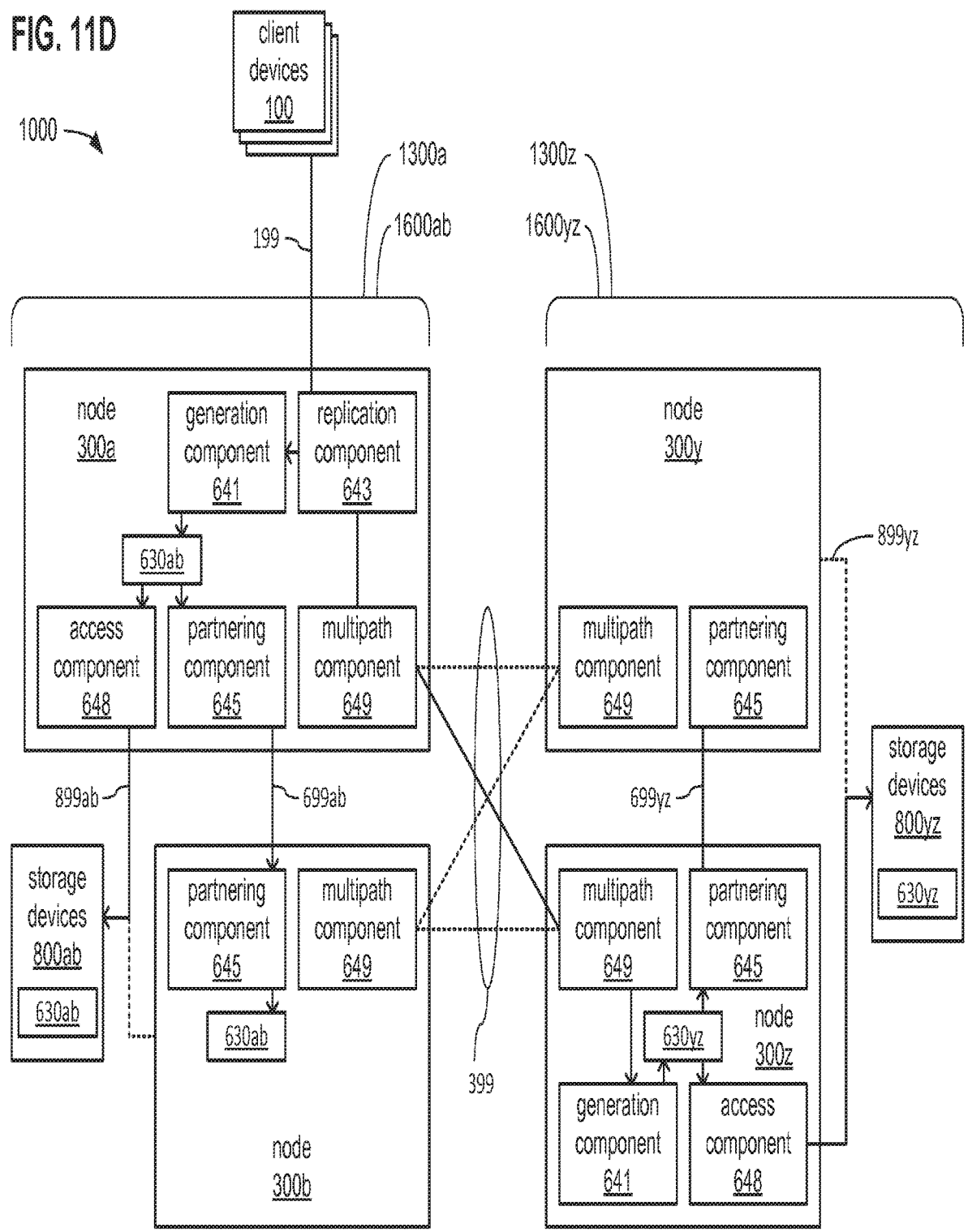

FIGS. 11A through 11D, together, depict an example of formation, maintenance and use of a mesh of active and inactive communications sessions that may arise among the nodes 300a-b of the HA group 1600ab of the cluster 1300a and the nodes 300y-z of the HA group 1600yz of the cluster 1300z in greater detail. FIGS. 11A-D also depict examples of the use and updating of the metadata 630ab and 630yz. More specifically, FIGS. 11A-B depict various aspects of the formation and maintenance of a mesh of active and inactive communications sessions through the inter-cluster interconnect 399, including supporting exchanges of information that both use and add to the metadata 630ab and/or 630yz. FIG. 11C depicts aspects of a change in state among the communications sessions arising from a takeover in an active node in communication with the client devices 100, including an accompanying updating of the metadata 630ab and/or 630yz. FIG. 11D depicts aspects of a change in state among communications sessions arising from a need to retry a replica data access command to a different node, including accompanying updating of the metadata 630ab and/or 630yz.

FIG. 11A depicts an initial configuration of the nodes 300a-b and 300y-z in which the node 300a may be the active node of the HA group 1600ab engaged in communications with the client devices 100 to perform data access commands, and the node 300y may be the active node of the HA group 1600yz engaged in communications with the active node 300a to perform replicas of those data access commands. In support of communications to exchange replica data access commands and responses thereto between the nodes 300a and 300y, the multipath component 649 of the node 300a may retrieve an indication of the node 300y as the other active node in such communications and an indication of an address of the node 300y (specifically, the D-module 600 of the node 300y) on the inter-cluster interconnect 399 from the metadata 630ab. Correspondingly, the multipath component 649 of the node 300y may retrieve an indication of the node 300a as the other active node in such communications and an indication of an address of the node 300a (specifically, the D-module 600 of the node 300a) on the inter-cluster interconnect 399 from the metadata 630yz.

As previously discussed, such information as network addresses at which various devices may be reachable on one or more interconnects, what node(s) may be active to engage in communications with a client device, and/or what node(s) may be active to perform replicas of data access commands may be deemed to be subject to sufficient likelihood of changing as to be deemed mutable metadata (e.g., part of the mutable metadata 632ab). However, in other embodiments, what node is active to either engage in communications with a client device or perform replica data access commands may be deemed less likely to change than network addresses, and may therefore be deemed immutable metadata (e.g., part of the immutable metadata 631ab).

Regardless of how such information may be categorized, the multipath components 649 of the nodes 300a and 300y may use such information to cooperate to form an active communications session (indicated with a solid line) between the nodes 300a and 300y to support exchanges of replica data access commands and responses thereto. More specifically, the node 300a may use this active communications session formed through the inter-cluster interconnect 399 to transmit replicas of data access commands to the node 300y, and the node 300y may use this active communications session to transmit responses thereto to the node 300a, including indications of success or failure in performing the replica data access commands.

Following formation of the active communications session between the nodes 300a and 300y through the inter-cluster interconnect 399, the multipath components 649 of the nodes 300a and 300y may engage in a recurring exchange of signals therethrough to monitor the status of the active communications session. Such test signals that may include test messages and/or test data that may be transmitted by the multipath component 649 of one of the nodes 300a and 300y to the multipath component 649 of the other on a recurring interval of time.

If an exchange of a test signal is attempted, but fails, then the multipath component 649 of one or both of the nodes 300a and 300y may attempt to retrieve an updated indication of a new address on the inter-cluster interconnect 399 to which one of the nodes 300a or 300y may have moved and/or an updated indication of what other active node may have taken over for or otherwise replaced one or the other of the nodes 300*a* or 300*y*. Such an updated indication may be retrieved from an updated version of one of the metadata 630*ab* or 630*yz* that may have been generated by the generation component 641 of the node 300*a* or 300*y*, respectively, in response to receiving updated information (e.g., an updated version of the test data 530 or other updated portion of metadata). Again, a network address may be changed as a result of any of a variety of events, including replacement and/or maintenance of devices, occurrences of failures or power outages, etc., and the testing component 545 of the N-module 500 of one of the nodes 300*a* or 300*y* may have performed new tests resulting in the discovery of one or more changed network addresses and an updated version of the test data 530. Upon retrieving such an updated indication, the multipath component 649 of one or both of the nodes 300*a* and 300*y* may attempt to again form the active communications session.

FIG. 11B depicts initial preparations for the possibility that one of the nodes 300*a* or 300*y* may be taken over by one of the nodes 300*b* or 300*z*, respectively, such that one of the nodes 300*a* or 300*y* may cease to be an active node. More precisely, and as previously discussed, a failure in an active node may trigger a takeover by an inactive partner of that active node belonging to the same HA group to which the failing active node belongs. As also previously discussed, such a takeover may be accompanied by a change in configuration of communications sessions in which an active communications session between two active nodes is changed to an inactive state, while an inactive communications session extending between what becomes the two active nodes is changed to an active state.

In preparing for such possibilities, the multipath components 649 of the nodes 300*a* and 300*y* may exchange indications of the addresses of the nodes 300*b* and 300*z* (specifically, the D-modules 600 of the nodes 300*b* and 300*z*) on the inter-cluster interconnect 399. The multipath components 649 of the nodes 300*a* and 300*y* may perform this exchange through the active node formed between the nodes 300*a* and 300*y*. The multipath component 649 of the node 300*a* may retrieve an indication of this address of the node 300*b* from the metadata 630*ab* or 830*ab*, and the multipath component 649 of the node 300*y* may retrieve an indication of this address of the node 300*z* from the metadata 630*yz* or 830*yz*. Again, in some embodiments, these addresses may be deemed more apt to change and more frequently than other information concerning operation of the storage cluster system 1000 such that these addresses may be stored among the mutable metadata 630*ab* and 630*yz*.

In some embodiments, indications of the addresses of the nodes 300*b* and 300*z* on the inter-cluster interconnect 399 may be received by the nodes 300*a* and 300*y* from the nodes 300*b* and 300*z* through the HA interconnects 699*ab* and 699*yz*, respectively. More specifically, the signals exchanged between the partnering components 645 of the nodes 300*a* and 300*b* through the HA interconnect 699*ab* to monitor for failures within each of the nodes 300*a* and 300*b* may include indications of addresses of the D-modules 600 of the nodes 300*a* and/or 300*b* on the inter-cluster interconnect 399. Correspondingly, the signals exchanged between the partnering components 645 of the nodes 300*y* and 300*z* through the HA interconnect 699*yz* to monitor for failures within each of the nodes 300*y* and 300*z* may include indications of addresses of the D-modules 600 of the nodes 300*y* and/or 300*z* on the inter-cluster interconnect 399. Upon receipt of the addresses of the D-modules 600 of the nodes 300*b* and 300*z* on the interconnect 399 through the HA interconnects 699*ab* and 699*yz*, respectively, the partnering components 645 of the nodes 300*a* and 300*y* may cooperate with corresponding ones of the generation components 641 to include those addresses of the nodes 300*b* and 300*y* in generating a version of the metadata 630*ab* and 630*yz*, respectively.

Regardless of the exact manner in which addresses of the nodes 300*b* and 300*z* are obtained, the multipath components 649 of the nodes 300*a* and 300*y* may then use the addresses of the nodes 300*b* and 300*z* to form an inactive communications session (indicated with dotted lines) between the nodes 300*a* and 300*z*, and between the nodes 300*y* and 300*b* through the inter-cluster interconnect 399. With these inactive nodes so formed, less time may be required to recommence exchanges of replica data access commands and responses thereto following a takeover of one of the active nodes 300*a* or 300*y* by one of their partners 300*b* or 300*z*, respectively.

FIG. 11C depicts aspects of a change in configuration of the mesh of communications sessions formed throughout FIGS. 11A-B as a result of the node 300*b* taking over for the node 300*a*. As previously discussed, the partnering components 645 of partnered nodes in a HA group may recurringly exchange signals to monitor the status of the nodes of which each is a part, and a partnering component 645 of an inactive node may signal other components of that node to take over for an active partner in response to an indication of a failure occurring within that active partner. Thus, in FIG. 11C, the partnering component 645 of the node 300*b* may have received an indication of a failure occurring within the node 300*a* and may respond by triggering a takeover of the node 300*a* by the node 300*b* such that the node 300*b* becomes the new active node of the HA group 1600*ab* that engages in communications with the client devices 100 and exchanges replica data access commands with the node 300*y*.

As previously discussed, among the actions the partnering component 645 of the node 300*b* may take to effect such a takeover may be to signal the multipath component 649 of the node 300*b* to change the state of the inactive communications session between the nodes 300*b* and 300*y* to an active state. In some embodiments, the multipath component 649 of the node 300*b* may effect this change in state by signaling the multipath component 649 of the node 300*y* through the inactive communications session therebetween that the node 300*b* is taking over for the node 300*a*, and therefore, the inactive communications session between the nodes 300*b* and 300*y* is to become active. In response, the multipath component 649 of the node 300*y* may change the active communications session between the nodes 300*a* and 300*y* to an inactive state, and may cooperate with the multipath component 649 of the node 300*b* in changing the inactive communications session between the nodes 300*b* and 300*y* to an active state. With these changes in state of these two communications sessions, the nodes 300*b* and 300*y* may be prepared to exchange replica data access commands and responses thereto in the manner in which the nodes 300*a* and 300*y* previously did so.

Following these changes in state of these two communications sessions, the multipath component 649 of the now active node 300*b* may cooperate with the generation component 641 of the node 300*b* to update the metadata 630*ab* with an indication that the node 300*b* is now the active node of the HA group 1600*ab* that engages in communications with the client devices 100 and transmits replica data access commands to the node 300*y*. The access component 648 of the node 300*b* may then store the now updated metadata 630*ab* and/or 830*ab* within the set of storage devices 800*ab*. Correspondingly, the generation component 641 of the node 300*y* may update the metadata 630*yz* with an indication that the node 300*b* is now the active node from which the node 300*y* receives replica data access commands and/or with an indication of the address of the node 300*b* (specifically, the address of the D-module 600 of the node 300*b*). The access component 648 of the node 300*y* may then store the now updated metadata 630*yz* within the set of storage devices 800*yz*. Further, the partnering component 645 of the node 300*y* may transmit a duplicate of the now updated metadata 630*yz* to the node 300*z* via the HA interconnect 699*yz* to better enable the node 300*z* to later take over for the node 300*y* if the need to do so should arise.

Depending on the nature of the failure occurring within the node 300*a*, the multipath component 649 and/or the partnering component 645 of the node 300*a* may not be capable of responding to signals conveyed through either or both of the interconnects 399 and 699*ab*. As a result, the multipath component 649 of the node 300*y* may make the aforedescribed change in state of the communications session between the nodes 300*a* and 300*y* to an inactive state without seeking cooperation in doing so from the multipath component 649 of the node 300*a*. Also, the partnering component 645 of the node 300*b* may attempt to transmit the now updated metadata 630*ab* to the node 300*a* via the HA interconnect 699*ab*, but the partnering component 645 of the node 300*a* may or may not be able to accept such metadata.

FIG. 11D depicts aspects of a change in configuration of the mesh of communications sessions formed throughout FIGS. 11A-B as a result of the node 300*z* taking over for the node 300*y*. As previously discussed, the replication component 643 of an active node that generates replica data access commands may retry transmission of a replica data access command to a partner of another active node if the other active node provides an indication of a failure that precludes it from performing the replica data access command. Thus, in FIG. 11D, the replication component 643 of the node 300*a* may have attempted to transmit a replica data access command to the node 300*y* and may have received an indication of a failure from the node 300*y* that precludes the node 300*y* from performing that replica data access command. In response, the replication component 643 of the node 300*a* may retry transmission of the replica data access command to the node 300*z*, which may trigger a takeover of the node 300*y* by the node 300*z* such that the node 300*z* becomes the new active node of the HA group 1600*yz* that exchanges replica data access commands with the node 300*a* and performs those replica data access commands.

As previously discussed, among the actions the replication component 643 of the node 300*a* may take to effect such retrying to the node 300*z* may be to signal the multipath component 649 of the node 300*a* to change the state of the inactive communications session between the nodes 300*a* and 300*z* to an active state. In some embodiments, the multipath component 649 of the node 300*a* may effect this change in state by signaling the multipath component 649 of the node 300*z* through the inactive communications session therebetween that the node 300*z* is to receive a retrial of transmission of a replica data access command, and therefore, the inactive communications session between the nodes 300*a* and 300*z* is to become active. Given that the node 300*y* may be unresponsive, depending on the nature of the failure occurring within the node 300*y*, the multipath component 649 of the node 300*a* may change the state of the communications session between the nodes 300*a* and 300*y* from active to inactive without coordination with the multipath component 649 of the node 300*y*. With these changes in state of these two communications sessions, the nodes 300*a* and 300*z* may be prepared to exchange replica data access commands and responses thereto in the manner in which the nodes 300*a* and 300*y* previously did so.

This retrial of a replica data access command to the node 300*z* and/or these changes in state of these two communications sessions may be taken as an indication and/or a trigger of the node 300*z* taking over for the node 300*y*. Thus, one or both of the replication component 643 and the multipath component 649 may cooperate with the generation component 641 of the node 300*a* to update the metadata 630*ab* with an indication that the node 300*z* is now the active node of the HA group 1600*yz* to which the node 300*a* transmits replica data access commands and/or with an indication of the address of the node 300*z* (specifically, the address of the D-module 600 of the node 300*z*). The access component 648 of the node 300*a* may then store the now updated metadata 630*ab* within the set of storage devices 800*ab*. Further, the partnering component 645 of the node 300*a* may transmit a duplicate of the now updated metadata 630*ab* to the node 300*b* via the HA interconnect 699*ab*. Correspondingly, the generation component 641 of the node 300*z* may update the metadata 630*yz* with an indication that the node 300*z* is now the active node that receives replica data access commands from the node 300*a*. The access component 648 of the node 300*z* may then store the now updated metadata 630*yz* within the set of storage devices 800*yz*.

Depending on the nature of the failure occurring within the node 300*y*, the multipath component 649 and/or the partnering component 645 of the node 300*y* may not be capable of responding to signals conveyed through either of the interconnects 399 and 699*yz*. Thus, the partnering component 645 of the node 300*z* may attempt to transmit a duplicate of the now updated metadata 630*yz* to the node 300*y* via the HA interconnect 699*yz*, but the partnering component 645 of the node 300*y* may or may not be able to receive that duplicate.

Figure 12:
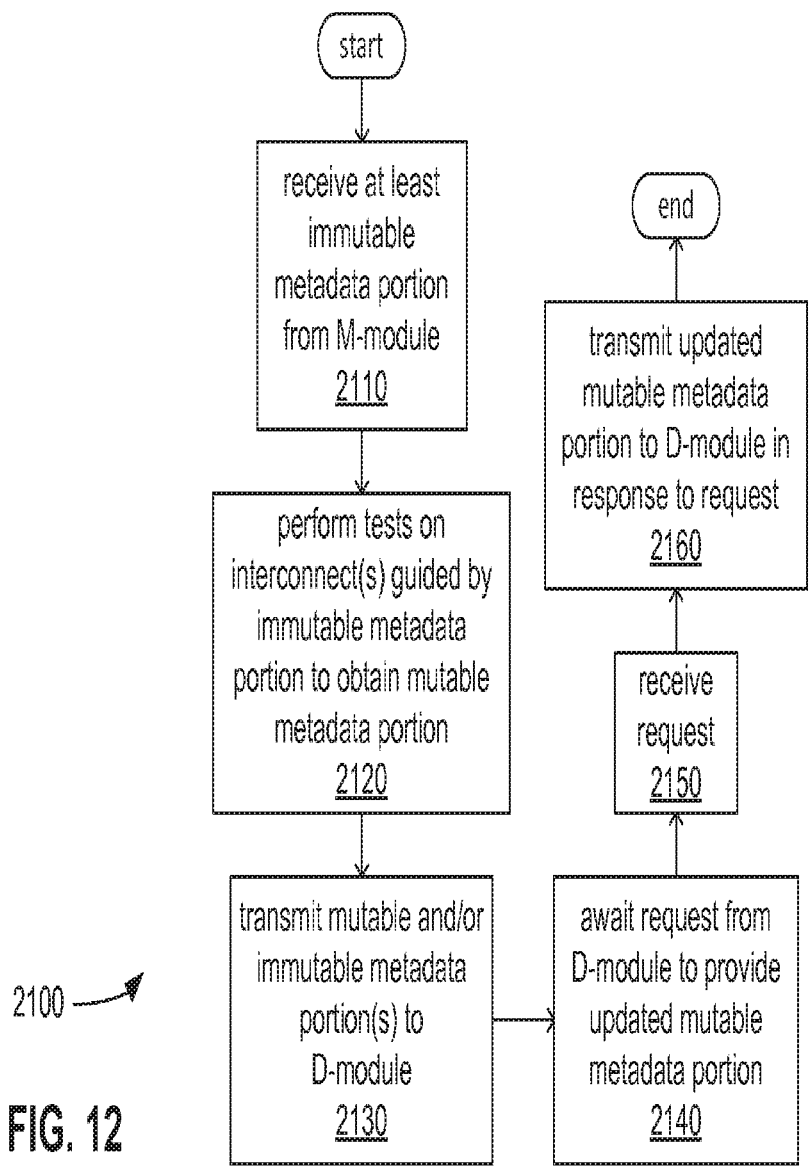
FIG. 12 illustrates a logic flow according to an embodiment.

FIG. 12 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the control routine 540, and/or performed by other component(s) of the network protocol module (N-module) 500.

At 2110, a processor component of a N-module of a node of a storage cluster system (e.g., the processor component 550 of the N-module 500 of one of the nodes 300*a-d* or 300*y-z* of the storage cluster system 1000) may receive at least a portion of immutable metadata from a M-module of the same node (e.g., the configuration data 430 from the M-module 400 of the same one of the nodes 300*a-d* or 300*y-z*). As previously discussed, the portion of metadata received from the M-module may be deemed immutable metadata accepted from personnel through a locally provided user interface and/or remotely (e.g., through a web page).

At 2120, the tests may be performed on one or more interconnects to which the N-module is coupled to detect one or more devices (e.g., the client interconnect 199 and/or one of the intra-cluster interconnects 599*a* or 599*z*). In performing such tests, some amount of mutable metadata may be obtained, including network addresses and/or other identifiers of nodes and/or components of nodes. As previously discussed, such tests may be guided or in other ways limited by indications of network addresses or ranges of network addresses, etc., included in the immutable metadata portion received from the M-module.

At 2130, at least a mutable metadata portion that includes results of the tests performed may be transmitted to a D-module of the same node (e.g., at least the test data 530 transmitted to the D-module 600 of the same one of the nodes 300a-d or 300y-z). As has been discussed, the N-module may relay the immutable metadata portion received from the M-module, or the M-module separately may provide the immutable metadata portion directly to the D-module.

At 2140, the processor component of the N-module then awaits a request from the D-module to provide an updated version of the mutable metadata portion. As has been discussed, the mutable metadata is referred to as such as a result of being deemed likely to change more frequently than the immutable metadata over time.

At 2150, a request to provide an updated version of the mutable metadata portion is received. At 2160, in response to the receipt of the request, an updated version of the mutable metadata portion is transmitted to the D-module. As has been discussed, one or more pieces of information included in the mutable metadata portion may have changed since the mutable metadata portion was last transmitted to the D-module.

Figure 13A:
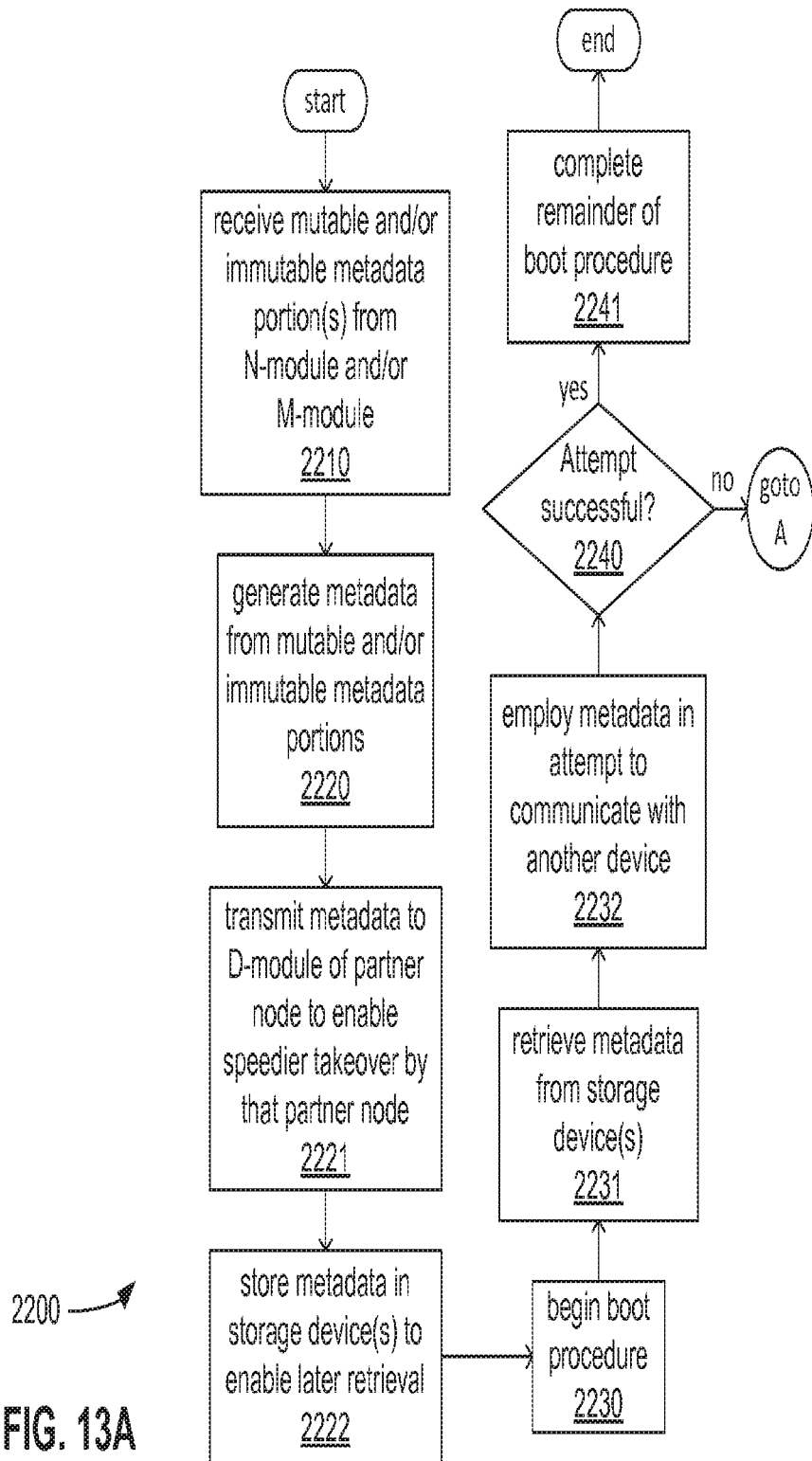

FIG. 13 illustrates one embodiment of a logic flow 2200. The logic flow 2200 may be representative of some or all of the operations executed by one or more embodiments described herein. More specifically, the logic flow 2200 may illustrate operations performed by the processor component 650 in executing at least the control routine 640, and/or performed by other component(s) of the data storage module (D-module) 600.

At 2210, a processor component of a D-module of a node of a storage cluster system (e.g., the processor component 650 of the D-module 600 of one of the nodes 300a-d or 300y-z of the storage cluster system 1000) receives portions of mutable and/or immutable metadata from a N-module and/or a M-module, respectively, of the same node (e.g., the test data 530 from a N-module 500 and/or the configuration data 430 from a M-module 400 of the same one of the nodes 300a-d or 300y-z). As has been discussed, the mutable metadata portion may include indications of results of various tests on one or more interconnects, and the immutable metadata portion may include indications of configuration information provided by personnel.

At 2220, metadata may be generated from the received portions of mutable and/or immutable metadata. As has been discussed, portions of mutable and immutable metadata may be combined in various ways to generate the metadata, including combining in a manner in which an indication of an aspect of operation in a portion of mutable metadata is taken as overriding a contrary indication in a portion of immutable metadata.

At 2221, the newly generated metadata may be transmitted to a partner node (e.g., another one of the nodes 300a-d or 300y-z) in an effort to ensure that the partner node is more speedily provided with a copy of the metadata in order to enable the partner node to more speedily take over for the node in response to a failure developing within the node. At 2222, the newly generated metadata may be stored within one or more storage devices (e.g., individual drives and/or groups of drives designated as LUs) that are coupled to and controlled by the D-module in a manner in which the metadata shares storage space of the one or more storage devices within which is also stored client device data provided to the node by one or more client devices for storage.

At 2230, a boot procedure of at least the D-module of the node may begin. As has been discussed, such booting may result from a powering up of at least the D-module or a resetting of at least the D-module. At 2231, the copy of the metadata earlier stored within the one or more storage devices may be retrieved.

At 2232, information from the metadata just retrieved from the one or more storage devices may be employed in attempting to communicate with another device (e.g., another node of the nodes 300a-d or 300y-z, a component of one of those nodes, a client device 100, etc.) via one of the interconnects to which the node is coupled (e.g., one of the interconnects 199, 399, 599a, 599z, 699ab, 699cd, 699yz, 899ab, 899cd and 899yz). As has been discussed, such information may include an address or other identifier of another device (e.g., an IP address of a D-module 600 of one of the nodes 300a-d or 300y-z via one of the interconnects 399, 699ab, 399cd or 699yz). As has also been discussed, such communications may include forming communications sessions, exchanging status signals, exchanging storage service requests and/or responses thereto, exchanging data access requests and/or replicas thereof, exchanging client device data, etc.

At 2240, a check is made as to whether this attempt at communication is successful. If so, then the remainder of the boot procedure may be completed at 2241.

However, then a request for an updated version of a portion of mutable metadata from which the metadata was earlier generated may be transmitted to the N-module (and/or the M-module) at 2250. Receipt of that updated version of that mutable metadata portion may occur at 2251. At 2260, updated metadata may be generated at least from the newly received portion of updated mutable metadata. At 2261, information from the now updated metadata may be employed in again attempting to communicate with another device via one of the interconnects to which the node is coupled.

At 2270, a check is made as to whether this attempt at communication is successful. If so, then the remainder of the boot procedure may be completed at 2271.

However, then a request for an updated version of a portion of mutable metadata from which the metadata was earlier generated may be transmitted to the M-module (and/or the N-module) at 2280. Receipt of that updated version of that immutable metadata portion may occur at 2281. At 2290, updated metadata may be generated at least from the newly received portion of updated immutable metadata. At 2291, information from the again updated metadata may be employed in communicating with another device via one of the interconnects to which the node is coupled, before the remainder of the boot procedure is completed at 2271.

Figure 14:
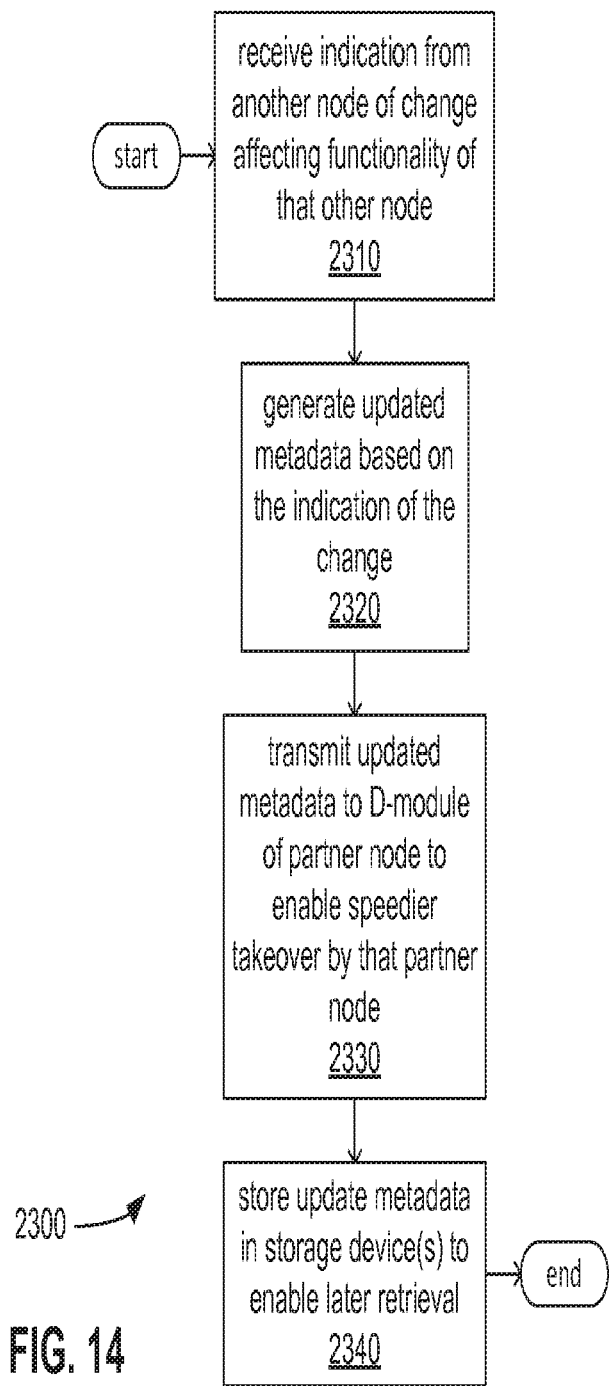
FIG. 14 illustrates a logic flow according to an embodiment.

FIG. 14 illustrates one embodiment of a logic flow 2300. The logic flow 2300 may be representative of some or all of the operations executed by one or more embodiments described herein. More specifically, the logic flow 2300 may illustrate operations performed by the processor component 650 in executing at least the control routine 640, and/or performed by other component(s) of the data storage module (D-module) 600.

At 2310, a processor component of a D-module of a node of a storage cluster system (e.g., the processor component 650 of the D-module 600 of one of the nodes 300a-d or 300y-z of the storage cluster system 1000) receives an indication of a change affecting the functionality of another node of the storage cluster system via one of the interconnects of the storage cluster system (e.g., one of the interconnects 399, 599*a*, 599*z*, 699*ab*, 699*cd* and 699*yz*). At 2320, updated metadata may be generated based at least on the received indication of that change.

At 2330, the newly generated metadata may be transmitted to a partner node (e.g., another one of the nodes 300*a-d* or 300*y-z*) in an effort to ensure that the partner node is more speedily provided with a copy of the metadata in order to enable the partner node to more speedily take over for the node in response to a failure developing within the node. At 2340, the newly generated metadata may be stored within one or more storage devices (e.g., individual drives and/or groups of drives designated as LUs) that are coupled to and controlled by the D-module in a manner in which the metadata shares storage space of the one or more storage devices within which is also stored client device data provided to the node by one or more client devices for storage.

FIG. 15 illustrates an embodiment of an exemplary processing architecture 3000 suitable for implementing various embodiments as previously described. More specifically, the processing architecture 3000 (or variants thereof) may be implemented as part of one or more of the client devices 100, the M-modules 400, the N-modules 500, the D-modules 600 or the sets of storage devices 800*ab*, 800*cd* or 800*yz*. It should be noted that components of the processing architecture 3000 are given reference numbers in which the last two digits correspond to the last two digits of reference numbers of at least some of the components earlier depicted and described as part of the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450, 550 and 650) may include any of a wide variety of commercially available processors, employing any of a wide variety of technologies and implemented with one or more cores physically combined in any of a number of ways.

As previously discussed, the internal storage 960 (corresponding to the memories 460, 560 and 660) may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. A method comprising:
   creating metadata to indicate that a second node is an active node to which data access commands executed by a first node are to be replicated as replica data access commands and that a third node is an inactive node;
   replicating the metadata to a plurality of nodes comprising the first node, the second node, and the third node;
   in response to identifying a trigger that changes states of communication sessions between the first node and second node and between the first node and the third node, updating the metadata to create updated metadata indicating that the third node is the inactive node and the second node is the active node; and
   replicating the updated metadata to the plurality of nodes.

2. The method of claim 1, comprising:
   testing an interconnect to identify a mutable metadata portion to include within the metadata.

3. The method of claim 1, comprising:
   evaluating configuration information to identify an immutable metadata portion to include within the metadata.

4. The method of claim 1, where replicating the metadata comprises:
   transmitting the metadata from the first node to the second node.

5. The method of claim 1, where replicating the metadata comprises:
   storing the metadata within a storage device accessible to the second node.

6. The method of claim 1, wherein the trigger indicates that a communication session between the first node and the second node has become inactive based upon a failure of the second node.

7. The method of claim 1, wherein the trigger indicates that a communication session between the first node and the third node has become active based upon a failure of the second node.

8. The method of claim 1, comprising:
   during reboot of the first node, evaluating the updated metadata to identify the third node as the active node to which incoming data access commands are to be replicated.

9. The method of claim 1, comprising:
   during reboot of the first node, performing a test over an interconnect to verify whether the third node is the active node based upon the updated metadata specifying that the third node is the active node for the first node.

10. A non-transitory machine-readable storage medium comprising instructions that when executed by a machine, causes the machine to:
    replicate metadata, indicating that a second node is an active node to which data access commands executed by a first node are to be replicated as replica data access commands and that a third node is an inactive node, to a plurality of nodes comprising the first node, the second node, and the third node;
    in response to identifying a trigger that changes states of communication sessions between the first node and second node and between the first node and the third node, update the metadata to create updated metadata indicating that the third node is the inactive node and the second node is the active node; and
    replicate the updated metadata to the plurality of nodes.

11. The non-transitory machine-readable storage medium of claim 10, wherein the instructions cause the machine to:

execute, by the first node, a data access command in parallel with replicating the data access command as a replica data access command to the active node.

12. The non-transitory machine-readable storage medium of claim 10, wherein the instructions cause the machine to:
in response to determining that a replica data access command failed to be successfully executed by the active node, retry the replica data access command.

13. The non-transitory machine-readable storage medium of claim 10, wherein the instructions cause the machine to:
in response to determining that a replica data access command failed to be successfully executed by the active node, retry the replica data access command to the inactive node.

14. The non-transitory machine-readable storage medium of claim 10, wherein the instructions cause the machine to:
in response to determining that a replica data access command failed to be successfully executed by the active node, perform a failover from the active node to the inactive node to cause the inactive node to become a new active node.

15. A computing device comprising:
a memory comprising machine executable code for performing a method; and
a processor coupled to the memory, the processor configured to execute the machine executable code to cause the processor to:
create metadata to indicate that a second node is an active node to which data access commands executed by a first node are to be replicated as replica data access commands and that a third node is an inactive node;
replicate the metadata to a plurality of nodes comprising the first node, the second node, and the third node; and
utilize the metadata to identify the active node and the inactive node.

16. The computing device of claim 15, wherein the machine executable code causes the processor to:
perform a protocol translation of a data access command to create a replica data access command.

17. The computing device of claim 15, wherein the machine executable code causes the processor to:
utilize a synchronization cache to buffer versions of the metadata.

18. The computing device of claim 15, wherein the machine executable code causes the processor to:
form an inactive communication session between the first node and the inactive node.

19. The computing device of claim 15, wherein the machine executable code causes the processor to:
form an active communication session between the first node and the active node.

20. The computing device of claim 15, wherein the machine executable code causes the processor to:
determine whether a failure to replicate a data access command to the active node is a long term error or a short term error.

* * * * *